US012634986B2

(12) United States Patent
Jang et al.

(10) Patent No.: US 12,634,986 B2
(45) Date of Patent: May 19, 2026

(54) MULTI-LINK AGGREGATION

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Suhwook Kim, Seoul (KR); Namyeong Kim, Seoul (KR); Sungjin Park, Seoul (KR); Taewon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 818 days.

(21) Appl. No.: 17/796,223

(22) PCT Filed: Jan. 29, 2021

(86) PCT No.: PCT/KR2021/001217
§ 371 (c)(1),
(2) Date: Jul. 28, 2022

(87) PCT Pub. No.: WO2021/154033
PCT Pub. Date: Aug. 5, 2021

(65) Prior Publication Data
US 2023/0120236 A1 Apr. 20, 2023

(30) Foreign Application Priority Data

| | | | |
|---|---|---|---|
| Jan. 30, 2020 | (KR) | .......................... | 10-2020-0011378 |
| Feb. 26, 2020 | (KR) | .......................... | 10-2020-0023860 |
| Mar. 4, 2020 | (KR) | .......................... | 10-2020-0027398 |
| Mar. 24, 2020 | (KR) | .......................... | 10-2020-0035870 |
| Mar. 25, 2020 | (KR) | .......................... | 10-2020-0036469 |

(Continued)

(51) Int. Cl.
*H04W 74/0808* (2024.01)
*H04L 9/40* (2022.01)
(Continued)

(52) U.S. Cl.
CPC ........... *H04W 74/0808* (2013.01); *H04L 9/40* (2022.05); *H04W 74/0816* (2013.01); *H04W 74/085* (2013.01); *H04W 84/12* (2013.01)

(58) Field of Classification Search
CPC ......... H04W 74/0808; H04W 74/0816; H04W 74/08; H04W 84/12; H04W 76/15; H04L 9/40
See application file for complete search history.

(56) References Cited

U.S. PATENT DOCUMENTS

| | | |
|---|---|---|
| 2018/0054847 A1 | 2/2018 | Cariou et al. |
| 2020/0288523 A1* | 9/2020 | Patil et al. ............ H04L 5/0055 |

(Continued)

FOREIGN PATENT DOCUMENTS

KR 10-2019-0064568 A 6/2019

OTHER PUBLICATIONS

Naribole, et al. (2019). "Multi-link TXOP Aggregation Considerations", doc.: IEEE 802.11-19/1505r2, See Slide 5.

(Continued)

*Primary Examiner* — Jeffrey M Rutkowski
(74) *Attorney, Agent, or Firm* — BRYAN CAVE LEIGHTON PAISNER LLP

(57) ABSTRACT

A multi-link device (MLD) in a wireless local area network (WLAN) system is proposed. The MLD may include an access point (AP) MLD. The AP MLD may receive receiving, from a non-simultaneous transmit and receive (Non-STR) station (STA) MLD, a multilink aggregation request signal through a first link. The multilink aggregation request signal may include first information related to a second link for which aggregation is requested and second information related to a transmission opportunity (TXOP) to be set in the second link. The AP MLD may obtain the TXOP based on the second information in the second link. The AP MLD may (Continued)

transmit, to the Non-STR STA MLD, a first multilink aggregation response signal through the first link and a second multilink aggregation response signal through the second link.

12 Claims, 62 Drawing Sheets

(30) Foreign Application Priority Data

| | | |
|---|---|---|
| Mar. 30, 2020 | (KR) | ........................ 10-2020-0038404 |
| May 7, 2020 | (KR) | ........................ 10-2020-0054612 |
| May 14, 2020 | (KR) | ........................ 10-2020-0057913 |
| Jul. 8, 2020 | (KR) | ........................ 10-2020-0084228 |
| Jul. 14, 2020 | (KR) | ........................ 10-2020-0086943 |
| Jan. 19, 2021 | (KR) | ........................ 10-2021-0007632 |

(51) Int. Cl.
   *H04W 74/0816*      (2024.01)
   *H04W 74/0833*      (2024.01)
   *H04W 84/12*        (2009.01)

(56)                References Cited

U.S. PATENT DOCUMENTS

| | | | |
|---|---|---|---|
| 2021/0067285 A1* | 3/2021 | Cariou et al. | ......... H04L 5/0007 |
| 2021/0076398 A1* | 3/2021 | Naribole et al. | .. H04W 74/0808 |
| 2021/0266891 A1* | 8/2021 | Chu et al. | ........... H04W 72/048 |
| 2022/0141785 A1* | 5/2022 | Gan et al. | ........... H04W 28/082 |
| 2022/0322473 A1* | 10/2022 | Hwang et al. | ......... H04L 69/14 |
| 2023/0120236 A1* | 4/2023 | Jang | .................. H04W 74/0816 |
| | | | 370/329 |
| 2024/0215070 A1* | 6/2024 | Jang | .................. H04W 74/0816 |

OTHER PUBLICATIONS

Patil, et al. (2019). "Multi-Link Operation: Design Discussion", doc.: IEEE 802.11-19/0823r2, See Slides 2-7.
Fischer, (2020) "MLO Synchronous Transmission", doc.: IEEE 802.11-20/0081r0, See Slides 2-51.

* cited by examiner (a)

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | ··· | HT-LFT | Data |
|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

| L-LTF | L-STF | L-SIG | RL-SIG | HE-SIG A | HE-SIG B | HE-STF | HE-LTF | ··· | HE-LTF | Data | PE |
|---|---|---|---|---|---|---|---|---|---|---|---|
| 8μs | 8μs | 4μs | 4μs | 8μs | 4μs per symbol | 4μs | | | | | |

Variable durations per HE-LTF symbol

FIG. 18

| L-STF | L-LTF | L-SIG | RL-SIG | U-SIG | EHT-SIG | EHT-STF | EHT-LTF | Data |
|-------|-------|-------|--------|-------|---------|---------|---------|------|

MULTI-LINK AGGREGATION

CROSS-REFERENCE TO RELATED APPLICATIONS

This application is the National Stage filing under 35 U.S.C. § 371 of International Application No. PCT/KR2021/001217, filed on Jan. 29, 2021, which claims the benefit of Korean Patent Application No. 10-2020-0011378, filed on Jan. 30, 2020, Korean Patent Application No. 10-2020-0023860, filed on Feb. 26, 2020, Korean Patent Application No. 10-2020-0027398, filed on Mar. 4, 2020, Korean Patent Application No. 10-2020-0035870 Mar. 24, 2020, Korean Patent Application No. 10-2020-0036469, filed on Mar. 25, 2020, Korean Patent Application No. 10-2020-0038404, filed on Mar. 30, 2020, Korean Patent Application No. 10-2020-0054612, filed on May 7, 2020, Korean Patent Application No. 10-2020-0057913, filed on May 14, 2020, Korean Patent Application No. 10-2020-0084228 Jul. 8, 2020, Korean Patent Application No. 10-2020-0086943, filed on Jul. 14, 2020, and Korean Patent Application No. 10-2021-0007632, filed on Jan. 19, 2021 the contents of which are all hereby incorporated by reference herein in their entirety.

BACKGROUND

Field of the Disclosure

The present specification relates to a method for a multi-link aggregation operation in a wireless local area network (WLAN) system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Solutions

A method performed by a transmitting device in a wireless local area network (WLAN) system according to various embodiments may include technical features related to a method for aggregating a multi-link operation. An access point multi-link device (AP MLD) may receive from a non-simultaneous transmit and receive (Non-STR) station (STA) MLD, a multilink aggregation request signal through a first link. The multilink aggregation request signal may include first information related to a second link for which aggregation is requested and second information related to a transmission opportunity (TXOP) to be set in the second link. The AP MLD may obtain the TXOP based on the second information in the second link. The AP MLD may transmit, to the Non-STR STA MLD, a first multilink aggregation response signal through the first link and a second multilink aggregation response signal through the second link. The AP MLD may receive, from the Non-STR STA MLD, first data through the first link and second data through the second link.

Technical Effects

According to an example of the present specification, an AP MLD operating as an STR may instead obtain a TXOP for multilink aggregation transmission of an STA MLD operating as non-STR. Since it is difficult for the non-STR STA MLD to access a channel on another link when transmitting a signal on one link, the AP MLD acquires a TXOP instead, so that a multi-link aggregation operation may be possible.

According to an example of the present specification, if the TXOP is obtained even though a BC is not 0 through multilink aggregation, fairness problems may occur. Therefore, in order to solve the fairness problem, if the TXOP is obtained even though a BC is not 0, a specific penalty may be received in the next channel access. Therefore, there is an effect that the fairness of the transmission opportunity in the BSS can be guaranteed.

BRIEF DESCRIPTION OF THE DRAWINGS

FIG. 4 illustrates an example of a PPDU used in an IEEE standard.

FIG. 18 illustrates an example of a PPDU used in the present specification.

DETAILED DESCRIPTION

Figure 1:
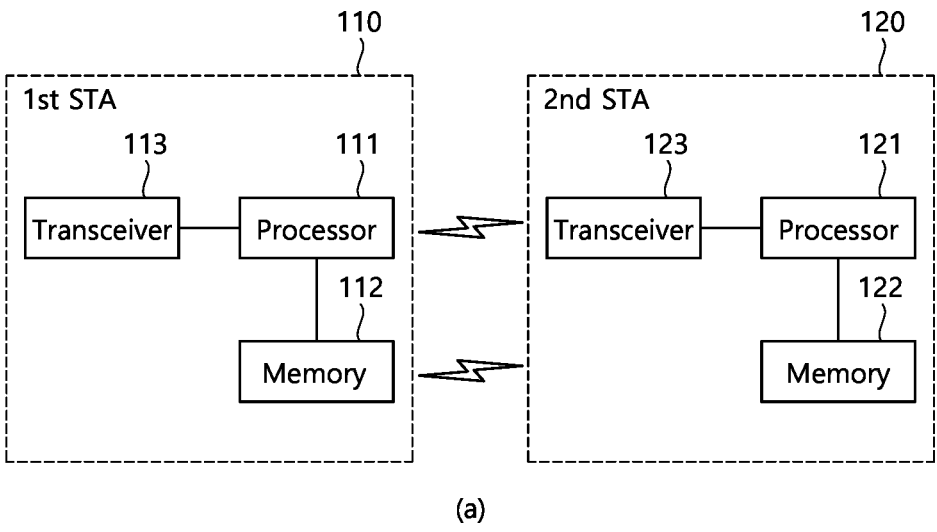
FIG. 1 shows an example of a transmitting apparatus and/or receiving apparatus of the present specification.
Figure 1:
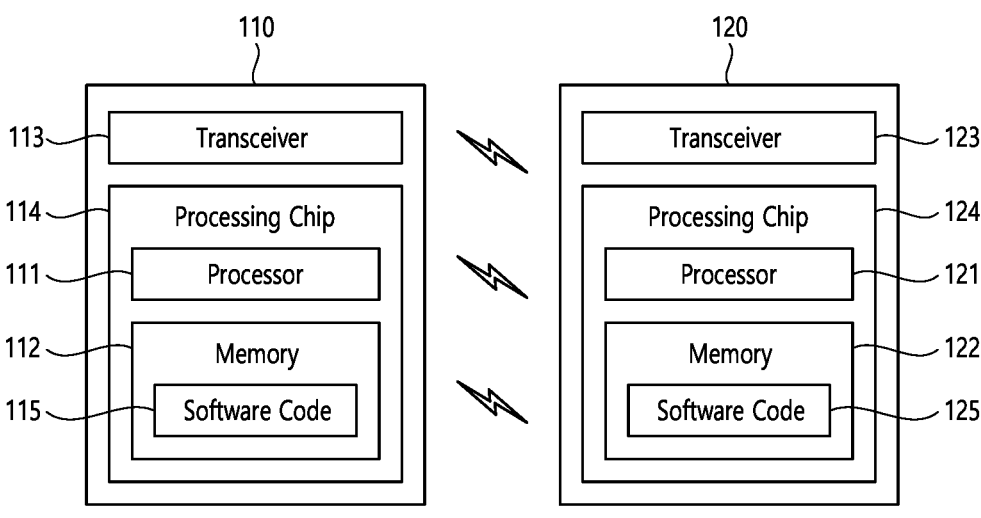

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3$^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
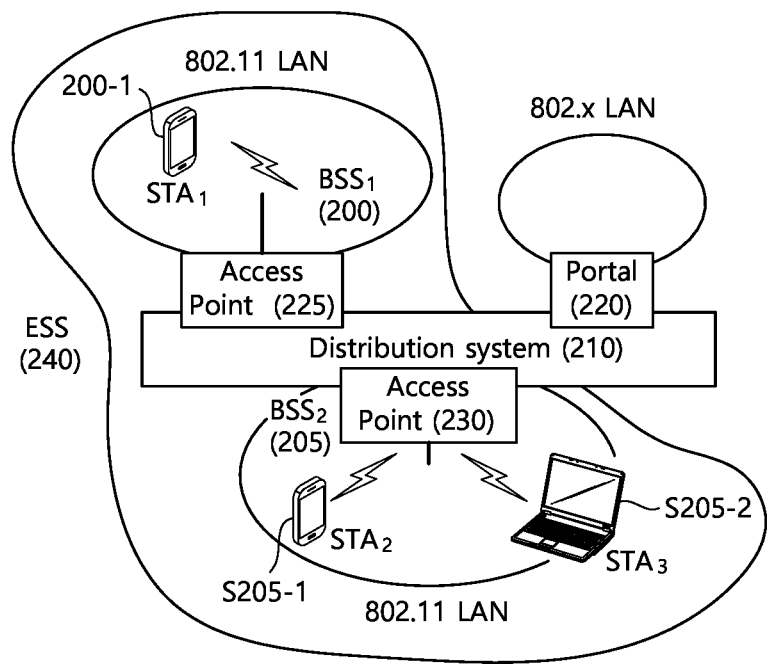
FIG. 2 is a conceptual view illustrating the structure of a wireless local area network (WLAN).
Figure 2:
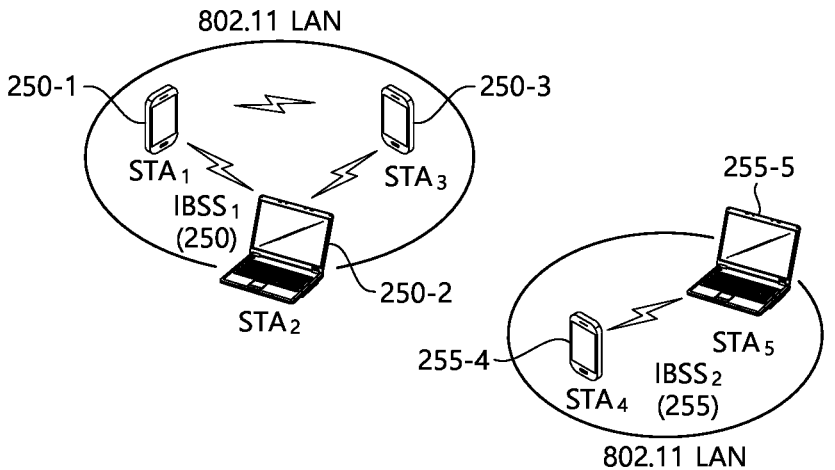

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
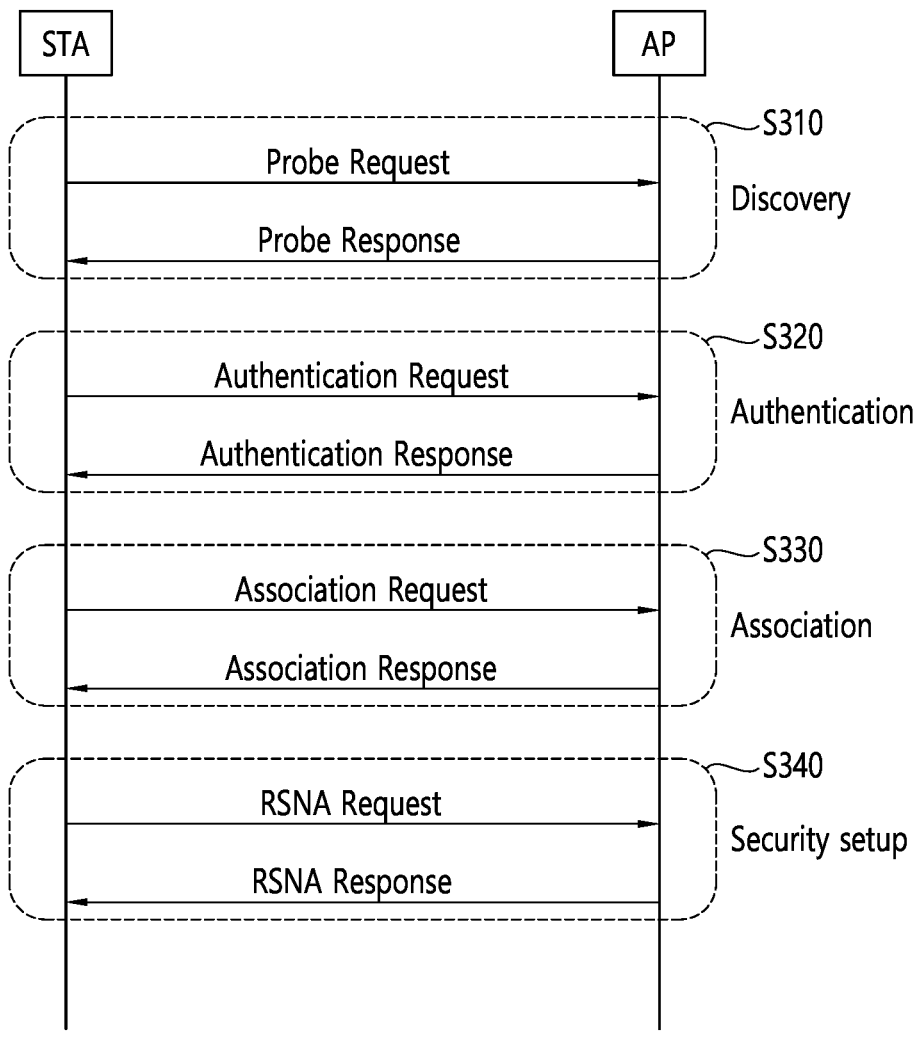
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
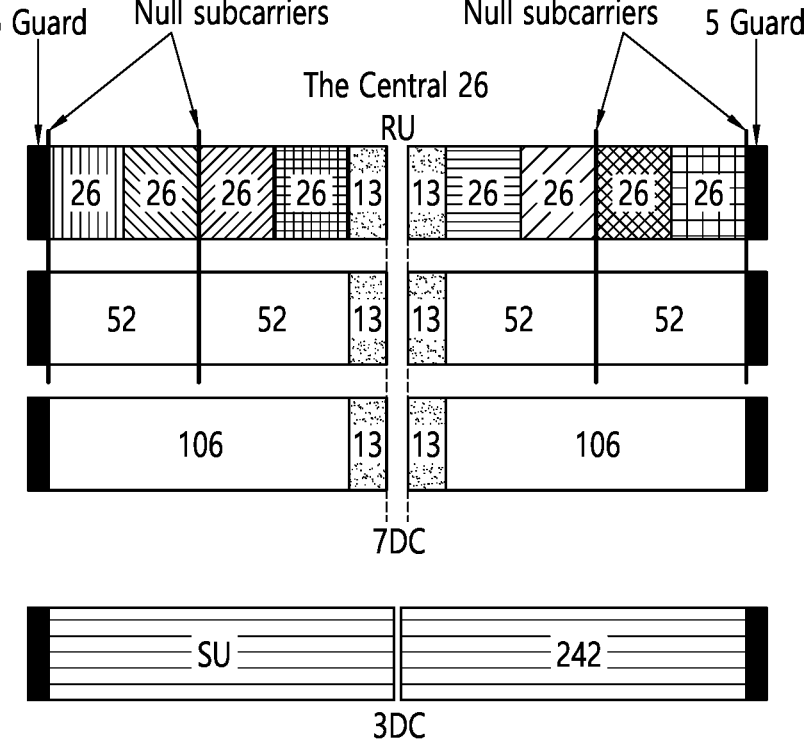
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
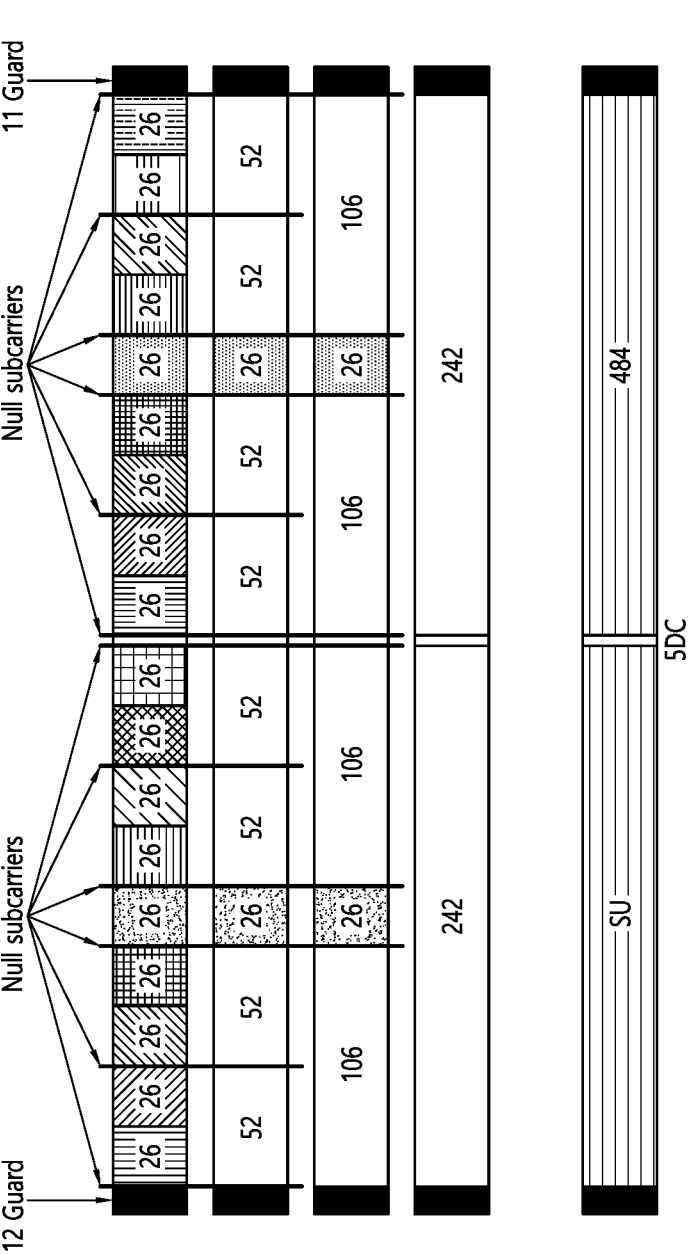
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
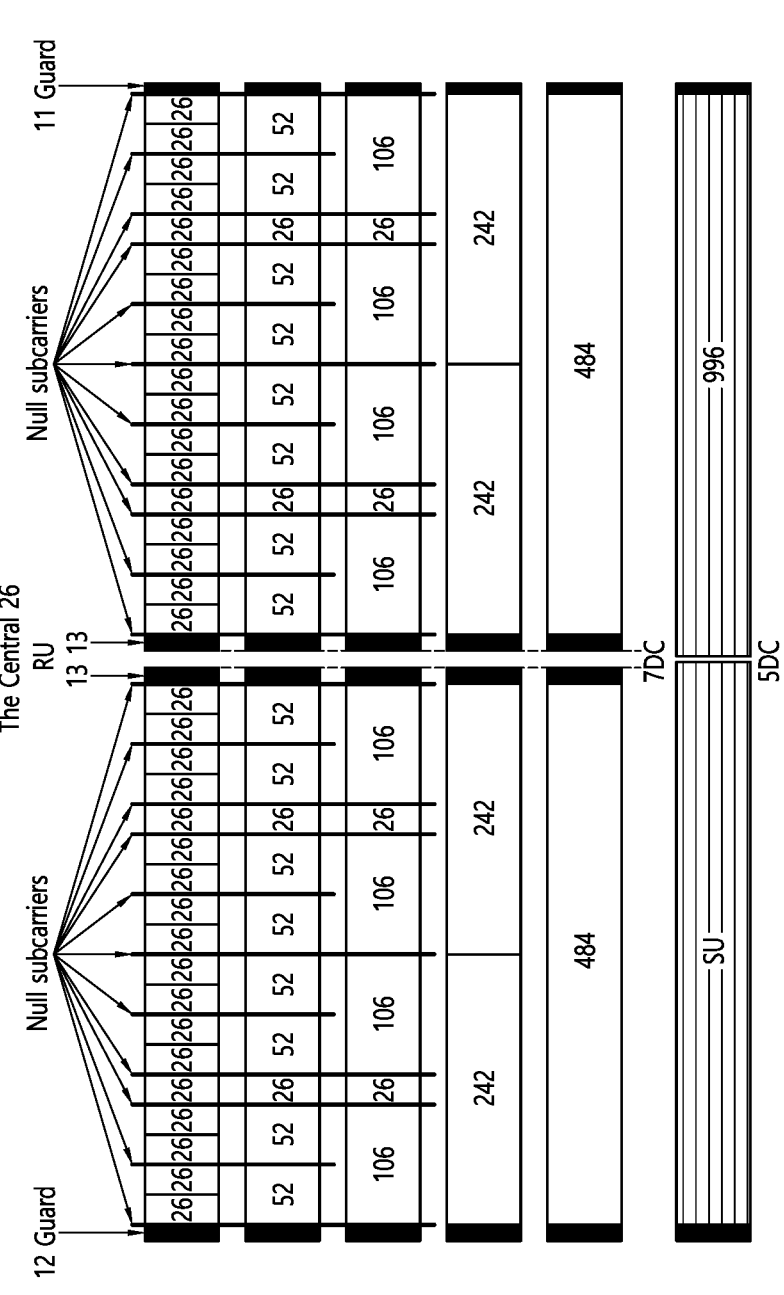
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
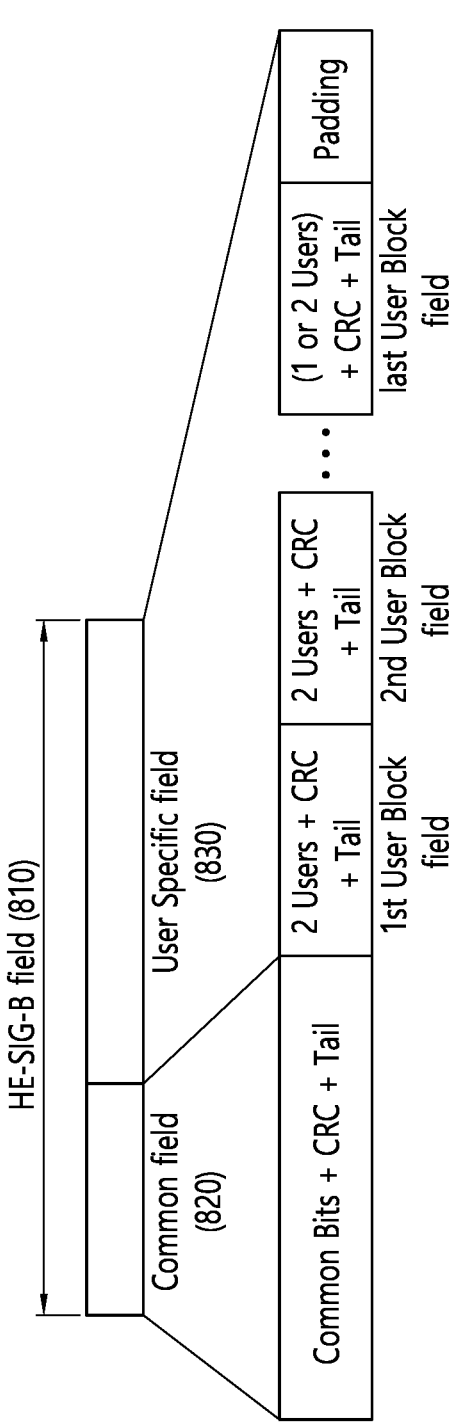
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | | 106 | | | 26 | 26 | 26 | 26 | 26 | 8 |
| $01001y_2y_1y_0$ | | 106 | | | 26 | 26 | 26 | 52 | | 8 |

"$01000y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "$01000y2y1y0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
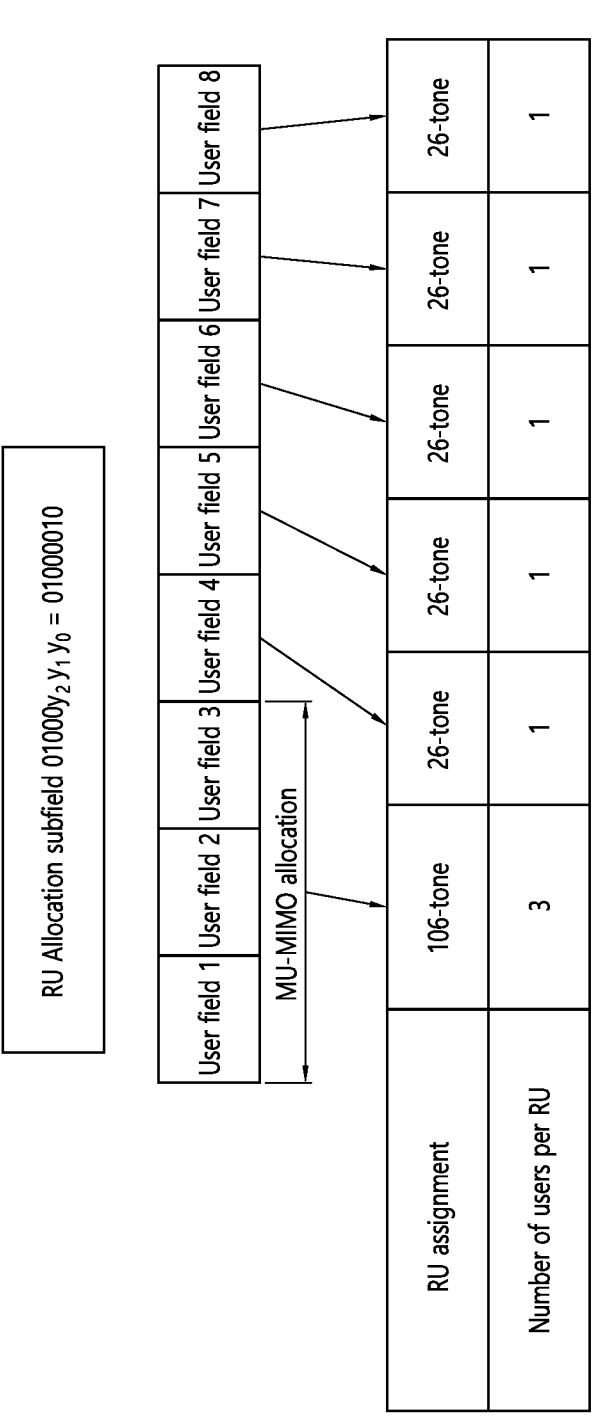
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
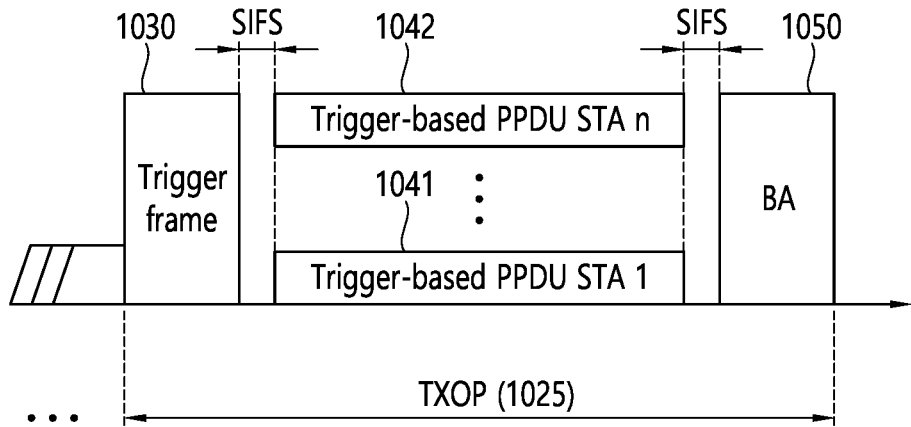
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame 1030, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
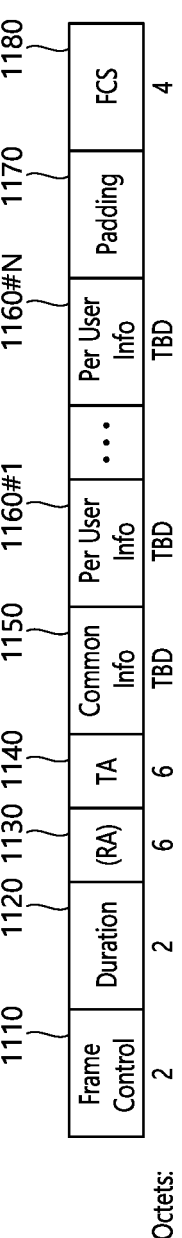
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
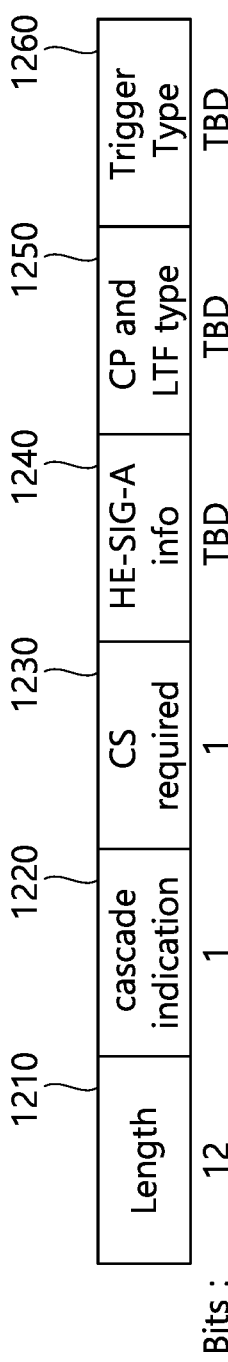
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
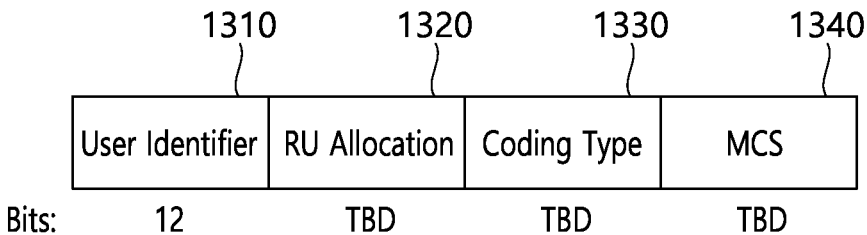
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL 01-DMA-based random access (UORA) scheme will be described.

Figure 14:
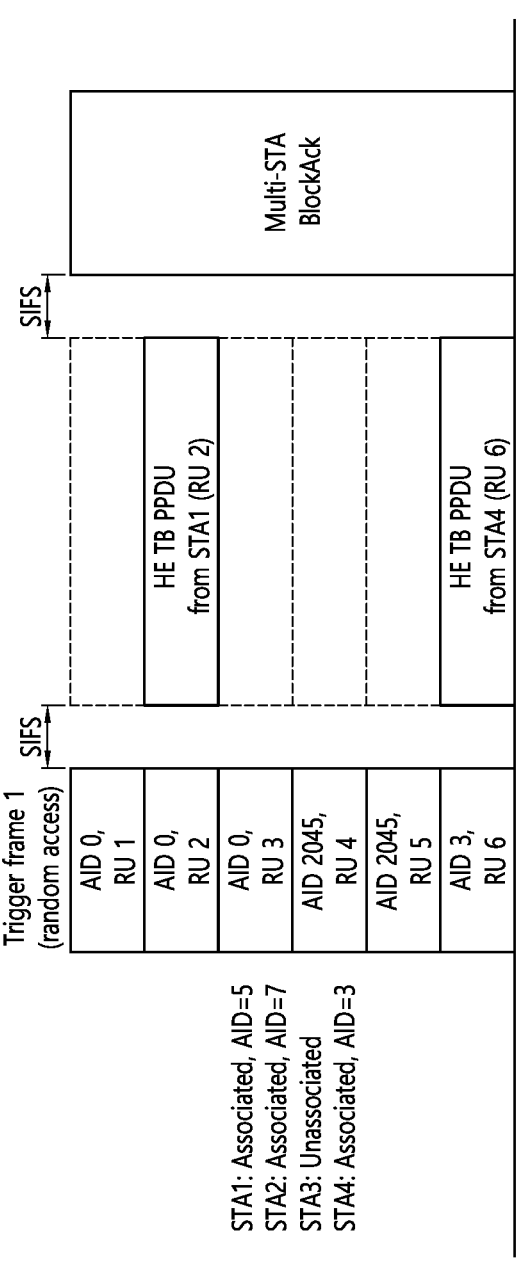
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
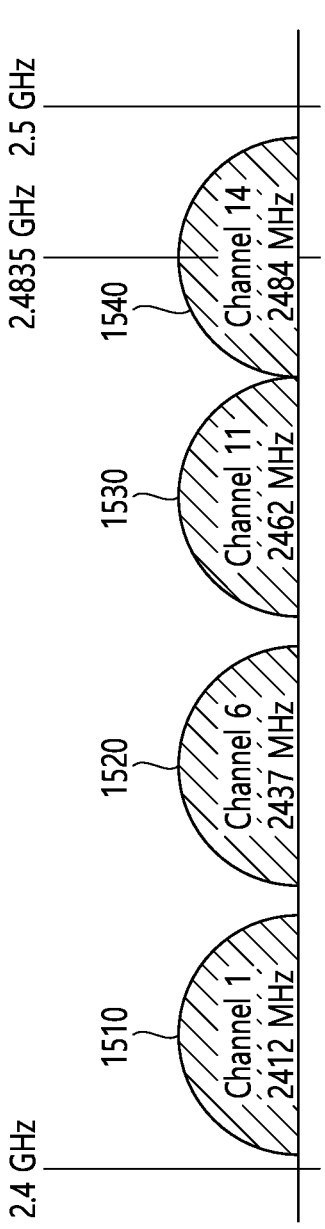
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
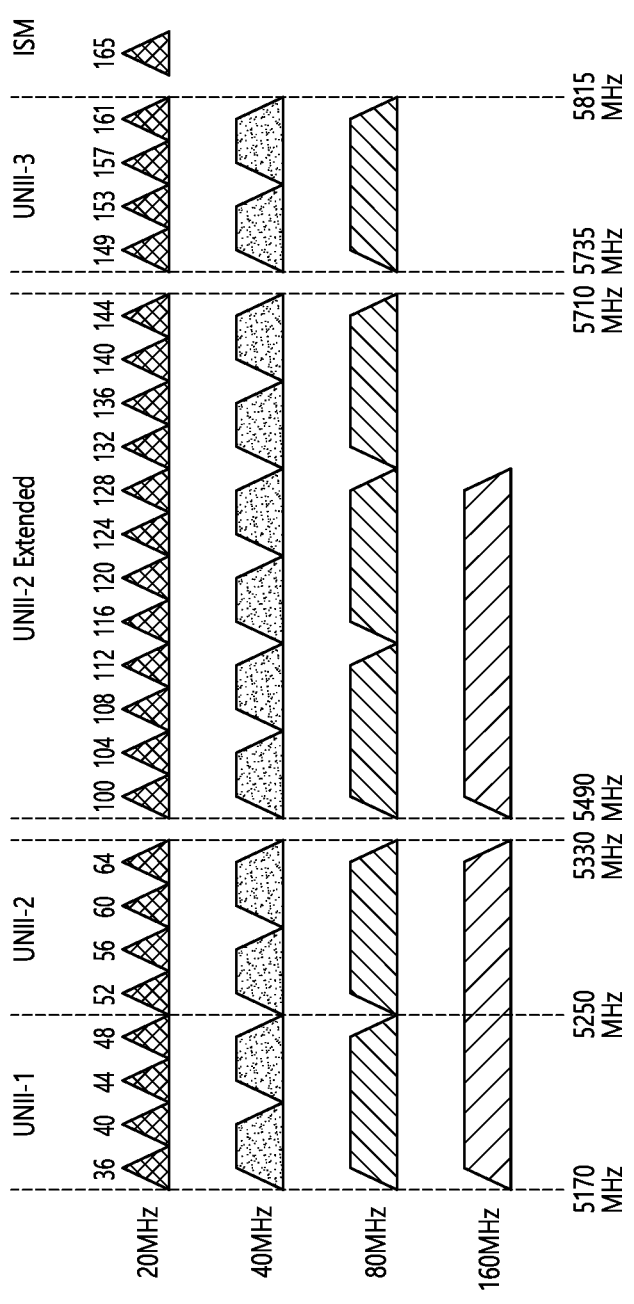
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
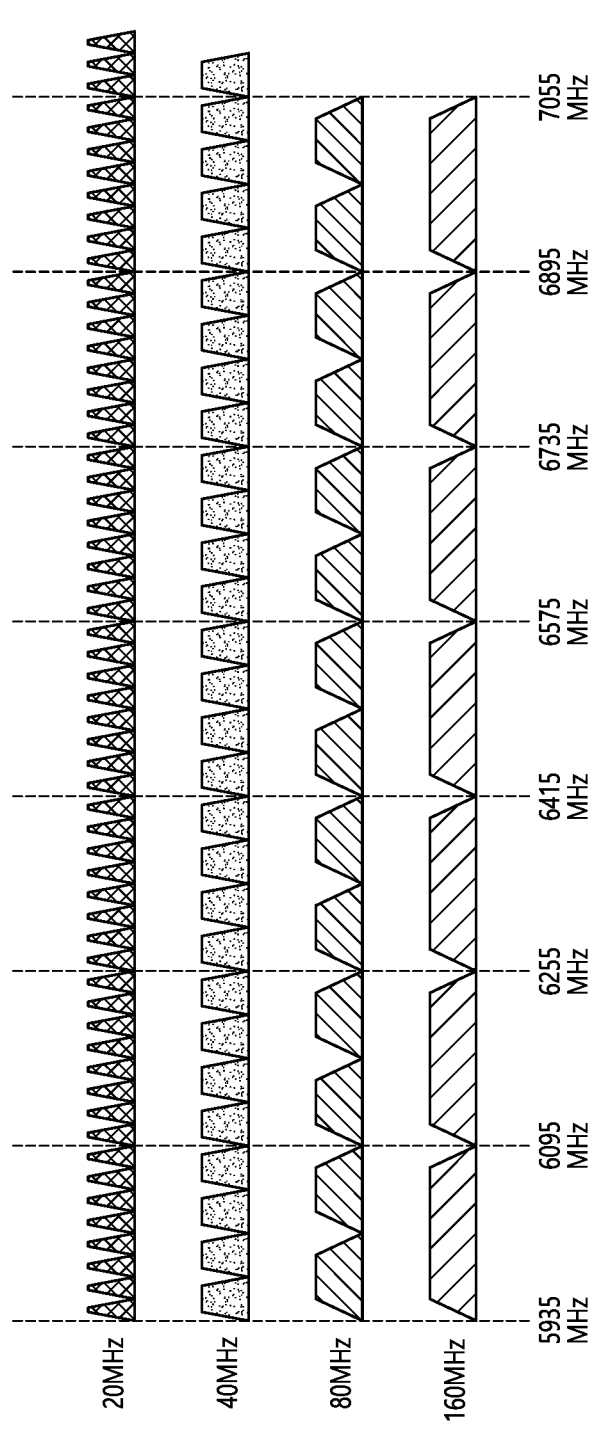
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
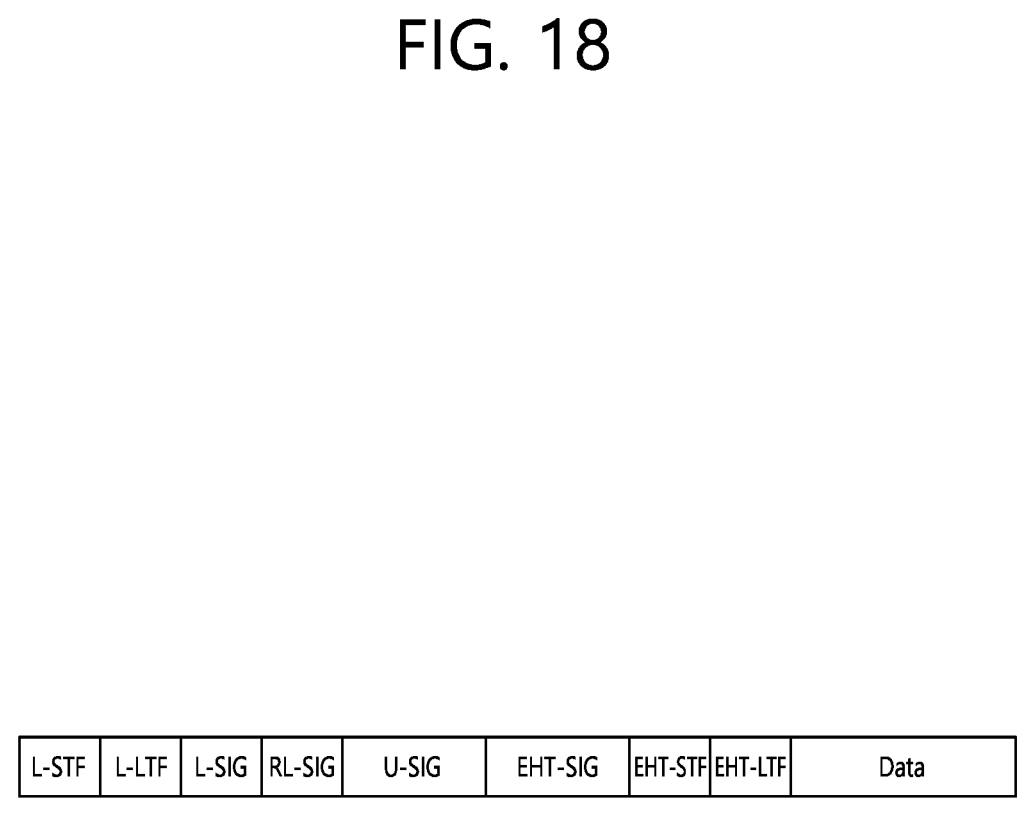

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | 106 | | | | 1 |
| 17 | 26 | 26 | 52 | | 26 | 106 | | | | 1 |
| 18 | 52 | | 26 | 26 | 26 | 106 | | | | 1 |
| 19 | 52 | | 52 | | 26 | 106 | | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | 106 | | | | 26 | 26 | 26 | 26 | 26 | 1 |
| 21 | 106 | | | | 26 | 26 | 26 | 52 | | 1 |
| 22 | 106 | | | | 26 | 52 | | 26 | 26 | 1 |
| 23 | 106 | | | | 26 | 52 | | 52 | | 1 |
| 24 | 52 | | 52 | | — | 52 | | 52 | | 1 |
| 25 | 242-tone RU empty (with zero users) | | | | | | | | | 1 |
| 26 | 106 | | | | 26 | 106 | | | | 1 |
| 27-34 | | | | 242 | | | | | | 8 |
| 35-42 | | | | 484 | | | | | | 8 |
| 43-50 | | | | 996 | | | | | | 8 |
| 51-58 | | | | 2*996 | | | | | | 8 |
| 59 | 26 | 26 | 26 | 26 | 26 | 52 + 26 | | | 26 | 1 |
| 60 | 26 | 26 + 52 | | | 26 | 26 | 26 | 26 | 26 | 1 |
| 61 | 26 | 26 + 52 | | | 26 | 26 | 26 | 52 | | 1 |
| 62 | 26 | 26 + 52 | | | 26 | 52 | | 26 | 26 | 1 |
| 63 | 26 | 26 | 52 | | 26 | 52 + 26 | | | 26 | 1 |
| 64 | 26 | 26 + 52 | | | 26 | 52 + 26 | | | 26 | 1 |
| 65 | 26 | 26 + 52 | | | 26 | 52 | | 52 | | 1 |

TABLE 7

| Indices | #1 | #2 | #3 | #4 | #5 | #6 | #7 | #8 | #9 | Number of entries |
|---|---|---|---|---|---|---|---|---|---|---|
| 66 | 52 | | 26 | 26 | 26 | 52 + 26 | | | 26 | 1 |
| 67 | 52 | | 52 | | 26 | 52 + 26 | | | 26 | 1 |
| 68 | 52 | | 52 + 26 | | | 52 | | 52 | | 1 |
| 69 | 26 | 26 | 26 | 26 | 26 + 106 | | | | | 1 |
| 70 | 26 | 26 + 52 | | | 26 | 106 | | | | 1 |
| 71 | 26 | 26 | 52 | | 26 + 106 | | | | | 1 |
| 72 | 26 | 26 + 52 | | | 26 + 106 | | | | | 1 |
| 73 | 52 | | 26 | 26 | 26 + 106 | | | | | 1 |
| 74 | 52 | | 52 | | 26 + 106 | | | | | 1 |
| 75 | 106 + 26 | | | | | 26 | 26 | 26 | 26 | 1 |
| 76 | 106 + 26 | | | | | 26 | 26 | 52 | | 1 |
| 77 | 106 + 26 | | | | | 52 | | 26 | 26 | 1 |
| 78 | 106 | | | | 26 | 52 + 26 | | | 26 | 1 |
| 79 | 106 + 26 | | | | | 52 + 26 | | | 26 | 1 |
| 80 | 106 + 26 | | | | | 52 | | 52 | | 1 |
| 81 | 106 + 26 | | | | | 106 | | | | 1 |
| 82 | 106 | | | | 26 + 106 | | | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad <\text{Equation 1}>$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112{:}16{:}112)=\{M\}*(1+j)/\text{sqrt}(2)$$

$$\text{EHT-STF}(0)=0 \quad <\text{Equation 2}>$$

The EHT-STF for the 40 MHz PPDU may be configured based on the following equation. The following example may be the first type (i.e., lx STF) sequence.

$$\text{EHT-STF}(-240{:}16{:}240)=\{M,0,-M\}*(1+j)/\text{sqrt}(2) \quad <\text{Equation 3}>$$

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}*(1+j)/\text{sqrt}(2) \quad <\text{Equation 4}>$$

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M,0,-M,-1,M,0,-M,1,-M\}*(1+j)/\text{sqrt}(2) \quad <\text{Equation 5}>$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496{:}16{:}496)=\{-M,-1,M,0,-M,1,-M\}*(1+j)/\text{sqrt}(2) \quad <\text{Equation 6}>$$

Equation 7 to Equation 11 below relate to an example of a second type (i.e., 2×STF) sequence.

$$\text{EHT-STF}(-120{:}8{:}120)=\{M,0,-M\}*(1+j)/\text{sqrt}(2) \quad <\text{Equation 7}>$$

The EHT-STF for the 40 MHz PPDU may be configured based on the following equation.

$$\text{EHT-STF}(-248{:}8{:}248)=\{M,-1,-M,0,M,-1,M\}*(1+j)/\text{sqrt}(2)$$

$$\text{EHT-STF}(-248)=0$$

$$\text{EHT-STF}(248)=0 \quad <\text{Equation 8}>$$

The EHT-STF for the 80 MHz PPDU may be configured based on the following equation.

$$\text{EHT-STF}(-504{:}8{:}504)=\{M,-1,M,-1,-M,-1,M,0,-M,1,M,1,-M,1,-M\}*(1+j)/\text{sqrt}(2) \quad <\text{Equation 9}>$$

The EHT-STF for the 160 MHz PPDU may be configured based on the following equation.

$$\text{EHT-STF}(-1016{:}16{:}1016)=\{M,-1,M,-1,M,-1,M,0,M,1,M,1,M,1,M,0,-M,1,-M,1,M,1,-M,0,-M,1,M,1,-M,1,-M\}*(1+j)/\text{sqrt}(2)$$

$$\text{EHT-STF}(-8)=0,\text{EHT-STF}(8)=0,$$

$$\text{EHT-STF}(-1016)=0,\text{EHT-STF}(1016)=0 \quad <\text{Equation 10}>$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$\text{EHT-STF}(-504{:}8{:}504)=\{-M,1,-M,1,M,1,-M,0,-M,1,M,1,-M,1,-M\}*(1+j)/\text{sqrt}(2)$$

$$\text{EHT-STF}(-504)=0,$$

$$\text{EHT-STF}(504)=0 \quad <\text{Equation 11}>$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
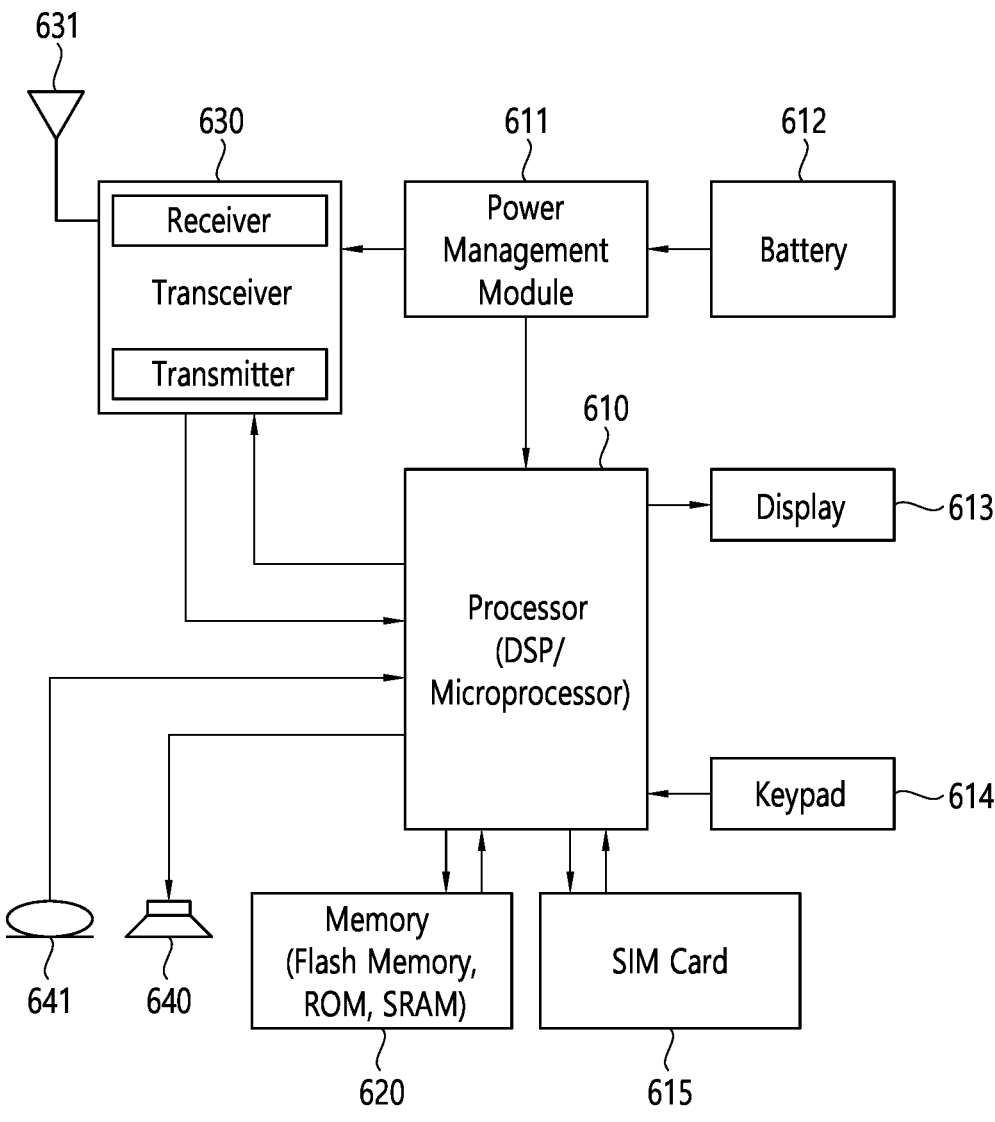
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 20:
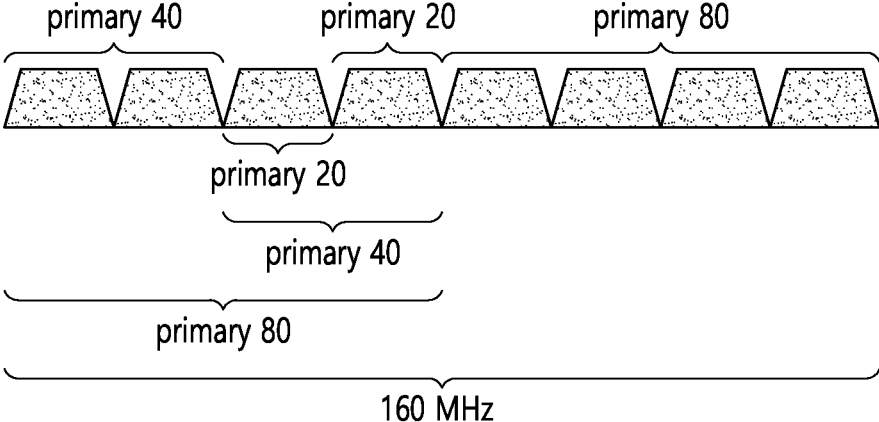
FIG. 20 shows an example of channel bonding.

FIG. 20 shows an example of channel bonding. As shown in FIG. 20, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by a STA in the present disclosure will be described.

For example, in the example of FIG. 20, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink link. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

In extreme high throughput (EHT), a standard being discussed after IEEE802.11ax, the introduction of HARQ is being considered. When HARQ is introduced, coverage can be expanded in a low signal to noise ratio (SNR) environment, that is, in an environment where the distance between the transmitting terminal and the receiving terminal is long, and higher throughput may be obtained in a high SNR environment.

The device described below may be the apparatus of FIGS. 1 and/or 19, and the PPDU may be the PPDU of FIG. 18. A device may be an AP or a non-AP STA. The device described below may be an AP multi-link device (MLD) supporting multi-link or a non-AP STA MLD.

In extremely high throughput (EHT), a standard being discussed after 802.11ax, a multi-link environment using one or more bands at the same time is being considered. When the device supports multi-link or multi-link, the device may use one or more bands (for example, 2.4 GHz, 5 GHz, 6 GHz, 60 GHz, etc.) simultaneously or alternately.

Hereinafter, although described in the form of multi-link, the frequency band may be configured in various other forms. In this specification, terms such as multi-link, multi-link, and the like may be used, however, for the convenience of the description below, some embodiments may be described based on multi-link.

In the following specification, an MLD refers to a multi-link device. The MLD has one or more connected STAs and one MAC service access point (SAP) that connects to an upper link layer (Logical Link Control, LLC). An MLD may mean a physical device or a logical device. Hereinafter, a device may mean an MLD.

In the following specification, a transmitting device and a receiving device may refer to an MLD. The first link of the receiving/transmitting device may be a terminal (for example, STA or AP) that performs signal transmission/reception through the first link included in the receiving/transmitting device. The second link of the receiving/transmitting device may be a terminal (for example, STA or AP) that performs signal transmission/reception through the second link included in the receiving/transmitting device.

IEEE802.11be can support two types of multi-link operations. For example, simultaneous transmit and receive (STR) and non-STR operations may be considered. For example, an STR may be referred to as an asynchronous multi-link operation, and a non-STR may be referred to as a synchronous multi-link operation. A multi-link may include a multi-band. That is, the multi-link may mean links included in several frequency bands, or may mean a plurality of links included in one frequency band.

EHT (11be) may consider multi-link technology, where multi-link may include multi-band. That is, the multi-link may represent links of several bands and at the same time may represent several multi-links within one band. Two types of multi-link operations are being considered. The asynchronous operation that enables simultaneous TX/RX on multiple links and synchronous operation that is not possible are considered. Hereinafter, the capability that enables simultaneous reception and transmission in multiple links is called STR (simultaneous transmit and receive), a STA having STR capability is called a STR MLD (multi-link device), and a STA not having STR capability is called a non-STR MLD.

Figure 21:
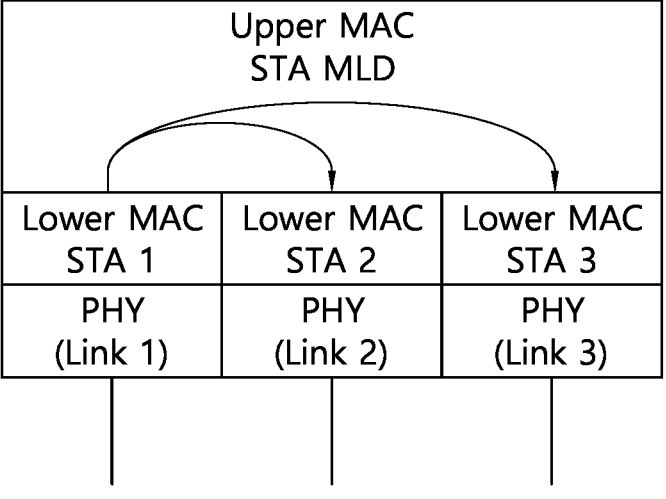
FIG. 21 is a diagram illustrating an embodiment of a device supporting multi-link.

FIG. 21 is a diagram illustrating an embodiment of a device supporting multi-link.

Referring to FIG. 21, an STA multi-link device (MLD) may have three links. Each STA has a lower MAC and a PHY layer, and can be coordinated through an Upper MAC. That is, as shown in FIG. 21, the STA 1 may share various information such as status, operation, and collected data in the link 1 to STAs 2 and 3 through the Upper MAC.

Figure 22:
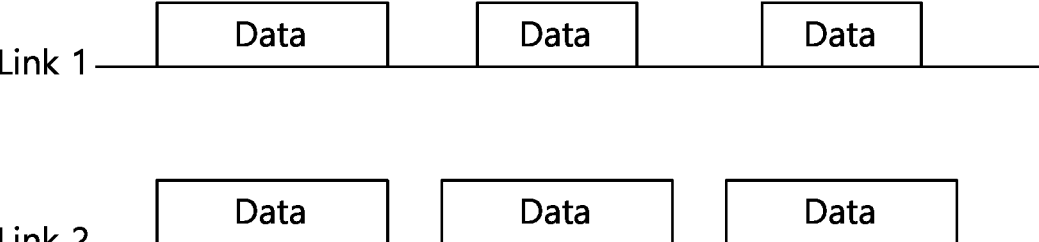
FIG. 22 to FIG. 55 are diagrams illustrating an embodiment of multi-link aggregation.

When considering Non-Simultaneous TX/RX (Non-STR) MLD where simultaneous TX/RX is not possible on multiple links, this MLD is only capable of one of TX/TX (operation) and RX/RX (operation) through Multi-link (ML) Aggregation FIG. 22 is a diagram illustrating an embodiment of multi-link aggregation.

Referring to FIG. 22, for the TX/TX or the RX/RX in each link, the MLD may align the start and/or end of the PPDU of each link or transmit the PPDU with a certain margin (e.g., offset/time-difference). Since the MLD performs random backoff on each link, it may be difficult to align the start of the PPDU with a small margin. In addition, the aggregation method may vary according to the level of coordination that shares information between STAs in each link. In the present specification, an aggregation method according to the coordination level is proposed.

The capability for coordination of each MLD may be transmitted in the form of Element or Field in the ML Setup step/phase (including a Discovery step/phase, an Association step/phase, etc.). Also, even if it is negotiated in the Setup phase, the corresponding coordination level information can be updated through the Control field after the Setup phase.

For immediate ML aggregation, one link (e.g., a STA operating in one link) needs to know the channel state of another link and immediately transmits the PPDU to both links. Therefore, it is necessary to negotiate the capability of whether the channel state can be shared immediately, that is, whether the immediate (ML) aggregation is possible.

Coordination Capability for Aggregation: This may refer to capability information related to whether aggregation between links is possible. In addition, conditions for availability may be attached. For example, the aggregation capability related to conditions, such as whether aggregation is possible in one slot; whether it is possible in SIFS; and/or whether it is possible immediately can be indicated.

Ex 1) 1: Yes, 0: No

Ex 2) Relevant capability may be expressed in terms of time rather than simple availability.

For example, if it is 0, it may indicate that it is immediately possible, and if it is 1, it may indicate that at least one slot of time is required.

The aggregation method according to the coordination capability of the two MLDs is as follows.

1. Embodiments in which the Immediate Aggregation is possible for both Transmit and Receive MLD are explained as shown below.

Figure 23:
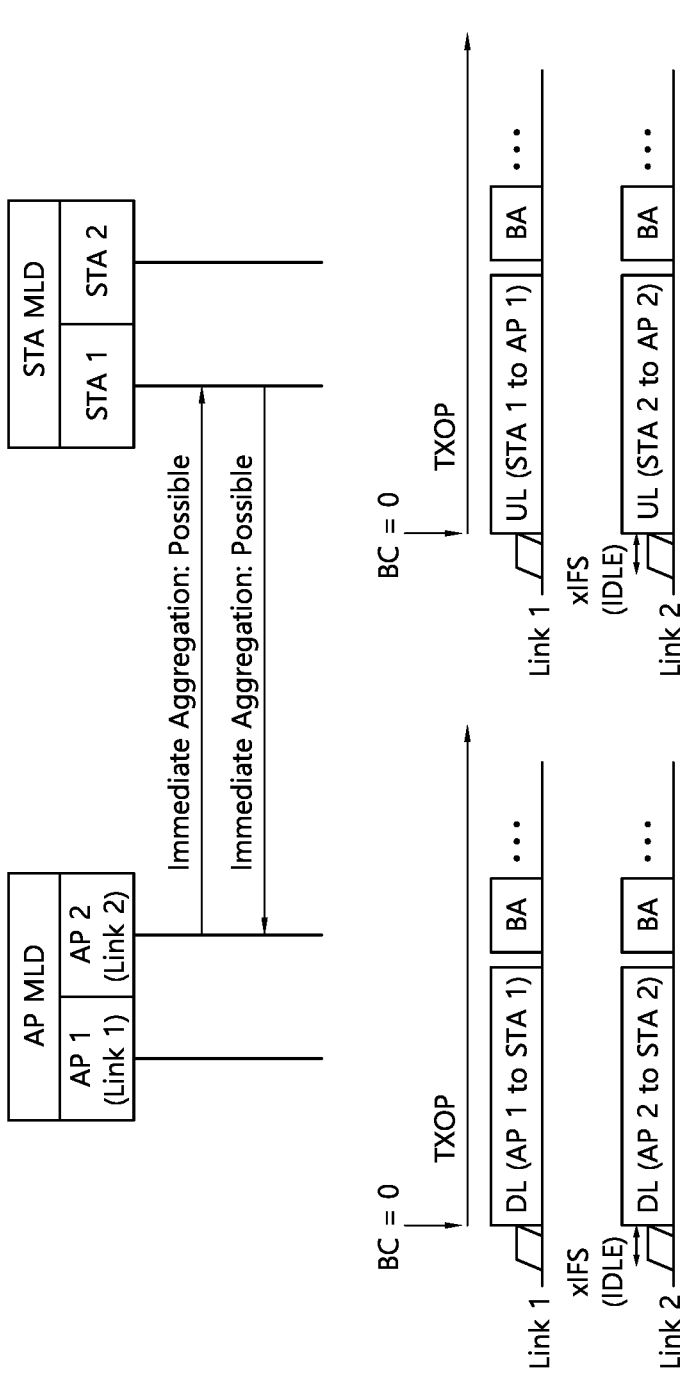

FIG. 23 is a diagram illustrating an embodiment of a multi-link aggregation method.

Referring to FIG. 23, immediate aggregation is possible for both AP MLD and STA MLD. For both DL/UL cases, when Backoff Count (BC)=0 in one link, if the other link (whose BC may be non-zero) has been IDLE for a certain period (e.g., PIFS, AIFS, one slot, etc.) before that, a frame can be transmitted by aggregating the two links. The IDLE of one slot may mean that a back-off count is decreased because it is IDLE during one slot. This can be applied even when the slot boundaries of two links do not match. That is, for the case in which AIFS sensing (described below) is not applied, since the channel is IDLE in the previous slot, even if the moment BC=0 is in the middle of the slot, aggregation is possible if it is IDLE during the previous one slot length duration (or time point when BC=0 from the previous slot boundary). However, if the efficiency is reduced and the rule is simply applied in this case, aggregation may not be performed.

Examples Related to AIFS Sensing or EIFS Sensing in Link(s) where BC is Non-Zero In this case, in AIFS or EIFS (here, the EIFS can be the interval EIFS–DIFS+AIFSN[AC]×aSlotTime+aSIFSTime–aRxTxTurnaroundTime defined in the standard specification), the operation may vary depending on a time point in which BC=0 (in a link where BC=0) and a certain duration for determining IDLE.

1) In order to simply reduce the complexity of the rule, the link may not be aggregated. It can be simply applied without applying any special constraint to the existing rule, but if the duration was IDLE, the transmission opportunity may be missed.

2) To increase efficiency, regardless of the AIFS, if it is idle for a certain duration (e.g., PIFS, AIFS, one slot, etc.) as in the above method, two links can be aggregated to transmit frames. Since this method does not take into account when BC=0 in the sensing duration and the channel medium may be BUSY before AIFS or EIFS, there is a possibility that it will become BUSY depending on where BC=0.

3) In order to increase efficiency, if it has been IDLE until BC=0 in the sensing duration, the two links can be aggregated to transmit the frame. This method can increase the efficiency in some cases compared to the method 2), but it is necessary to change the existing rule in which it should be IDLE during AIFSN[AC]× aSlotTime−aRxTxTurnaroundTime.

Examples Related to BC Control on Link(s) where BC is Non-Zero

Here, a BC of the other link may not be zero. In this case, the current BC is non-zero by may be ignored and transmission is allowed. Accordingly, fairness problems may arise for STAs operating in the corresponding link (hereinafter referred to as non-zero BC link). Therefore, it is necessary to control the current BC for fairness. The BC control method may have the following methods.

1) Examples of Applying the Rule for CW as it is, and Controlling Only BC

That is, the existing rule in which the CW is doubled when transmission succeeds and the CW goes to CWmin when transmission fails is maintained, and only the BC can be controlled.

When aggregation is performed in a non-zero state of BC, the currently remaining BC can be used during the next back-off operation. That is, during the next back-off operation, the BC can be re-picked (or re-drawn) and the existing BCs can be added to the re-picked value.

Figure 24:
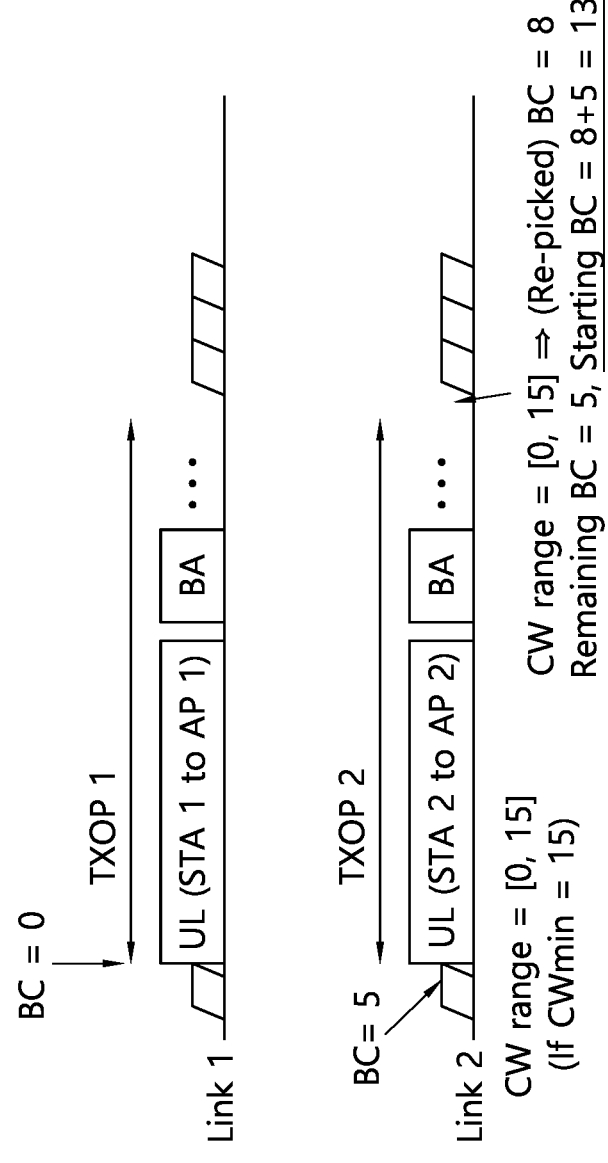

FIG. 24 is a diagram illustrating an embodiment of the BC control method.

Referring to FIG. 24, the current remaining BC is 5, and the re-picked (or re-drawn) BC is 8 during the next back-off operation. The CW range does not change because the previous CW was a min value, and the final BC becomes 13 (=8+5).

1-1) In case of failure, at least twice the remaining BC can be added.

The remaining BC was ignored for transmission, and if transmission fails due to this, additional penalties may be required. Therefore, in case of failure, more penalties may be given by adding more than twice the remaining BC to the next re-picked (re-drawn) BC.

Figure 25:
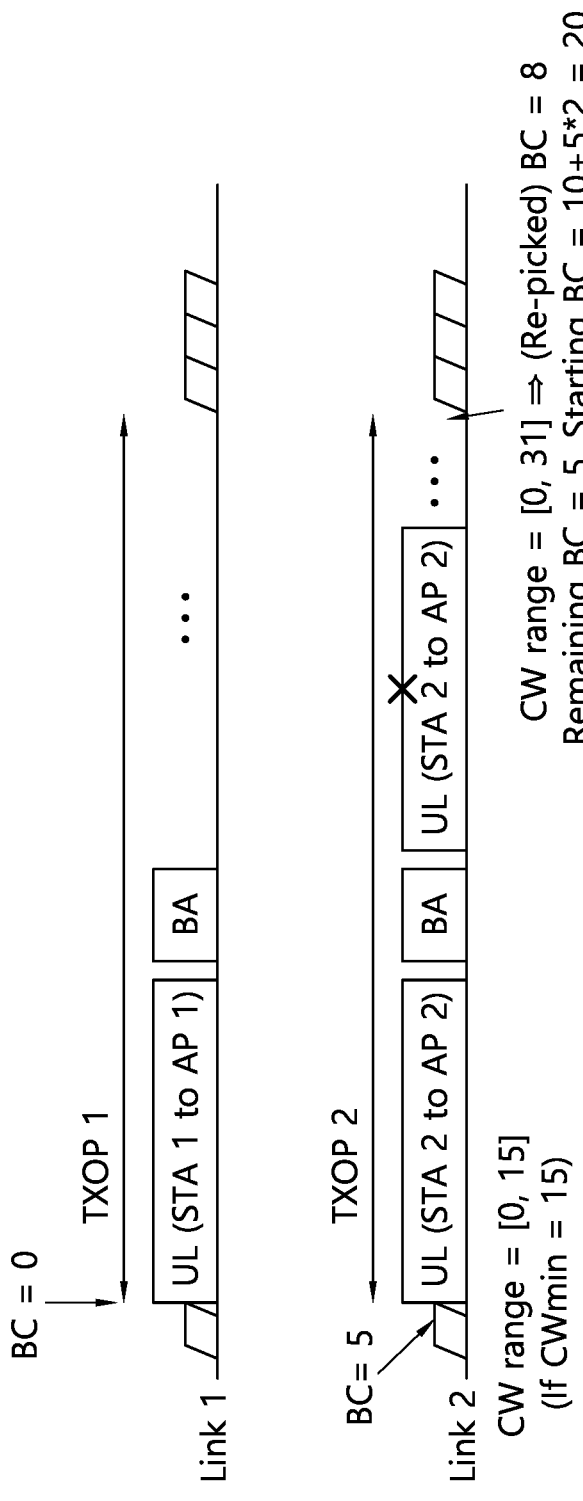

FIG. 25 is a diagram illustrating an embodiment of a BC control method.

Referring to FIG. 25, the current remaining BC is 5, and a re-picked/re-drawn BC can be 10 in the next back-off operation. The CW range is doubled due to the failure, and the remaining BC is doubled and will be added as a penalty for the failure. Therefore, the final BC becomes 20 (=10+ 5*2).

2) Examples of Controlling the CW and Re-Picking a BC in the CW

In the existing wireless LAN, if packet transmission is successful, the CW is set to CWmin, and if transmission fails, the CW is increased as long as it does not exceed CWmax. Therefore, the BC control method may vary depending on success/failure. That is, the method can be different depending on which case is given more penalty. Basically, when aggregation is performed in a state where BC is not 0, the current remaining BC is used for the next back-off operation. That is, the BC can be re-picked/re-drawn during the next back-off operation, or after re-pick, the remaining BC can be added as in the '1) example'. In the following embodiment, only the case of adding BC after re-pick is shown.

2-1) In case of success, the CW does not go to CWmin (e.g., maintaining the existing value, ½ decrease, or 2× increase, etc.). In case of failure, the CW is doubled based on the conventional method and the BC is re-picked.

In this case, more penalty is given in the case of success compared to the '1) example'.

Figure 26:
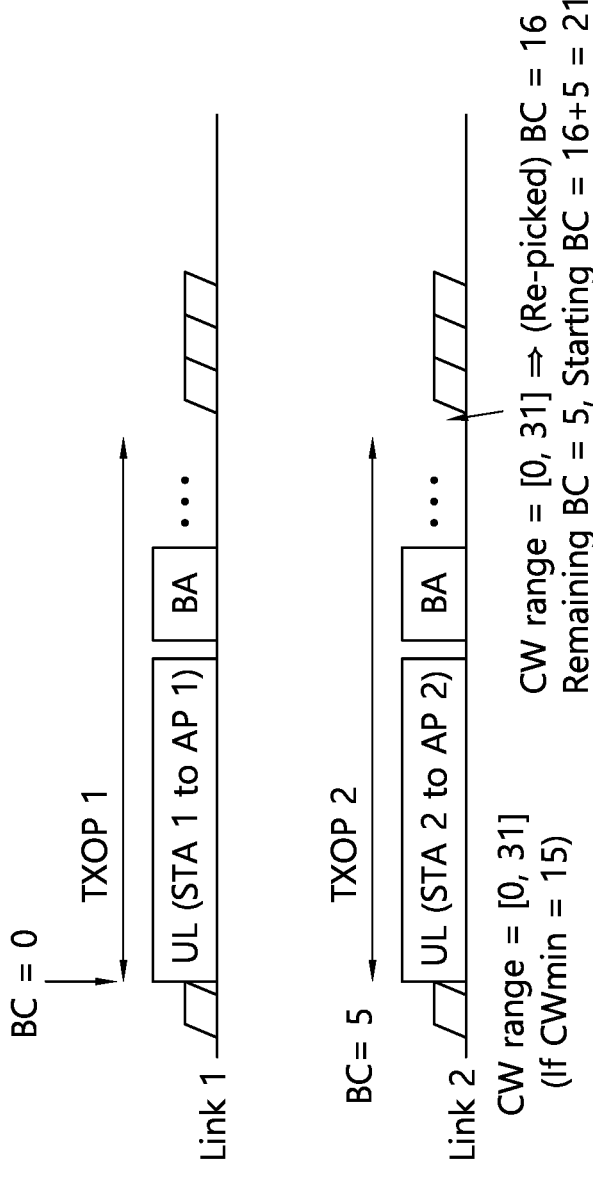

FIG. 26 is a diagram illustrating a BC control method in the 2-1) example.

Referring to FIG. 26, the current remaining BC=5 and CW may be 31. In this method, even if it succeeds, the CW is maintained without decreasing the min value in order to give a penalty. Therefore, it shows the case of BC=16, which is re-drawn again in the next back-off operation while the CW is maintained at 31. The final BC is 16+5=21.

2-2) In case of success, the CW goes to CWmin as in the conventional method, and in case of failure, the CW is increased to more than 2 times (e.g., 4 times) and then BC is re-picked.

In this case, a more penalty is given in case of failure compared to the '1) example'.

Figure 27:
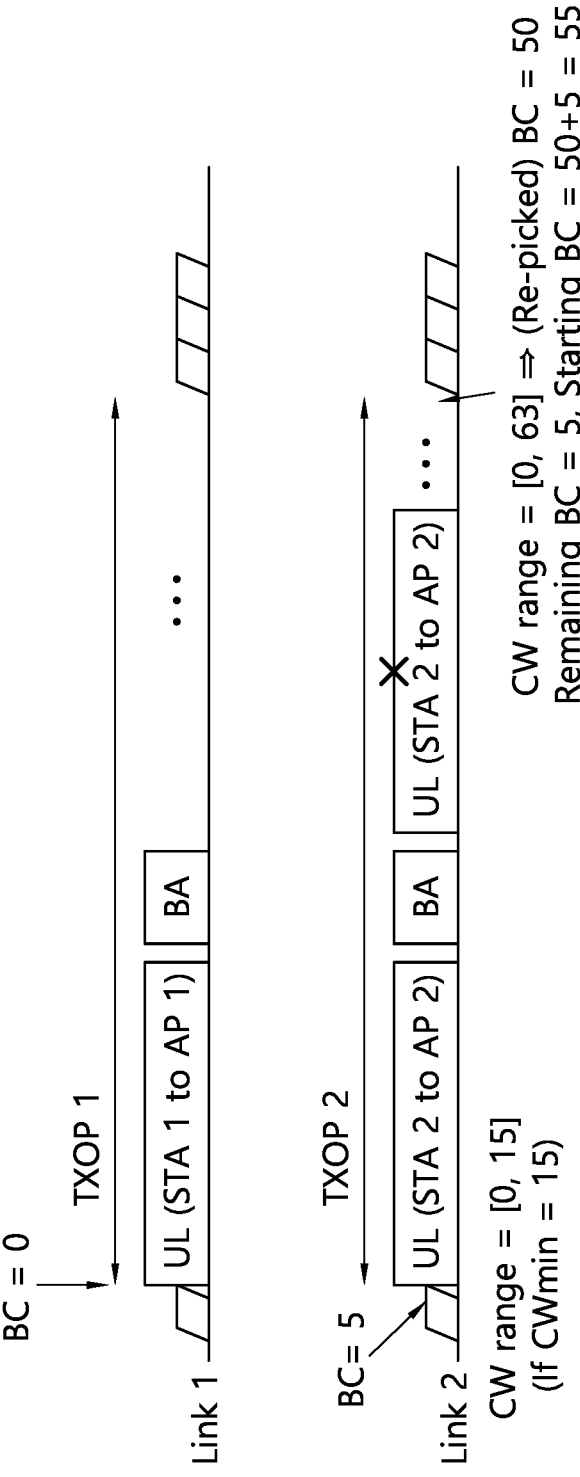

FIG. 27 is a diagram illustrating a BC control method as shown in the 2-2) example.

Referring to FIG. 27, currently remaining BC is 5 and the CW may be 15. In this method, the CW is increased by 4 times instead of 2 times to give more penalty even if there is failure. Therefore, the CW becomes 63, showing the case where a re-picked BC is 50 in the next back-off operation. In the case, the final BC can be 55(=50+5).

2-3) In case of success, the CW is not set to CWmin (e.g., maintaining the existing value, ½ decrease, or 2× increase, etc.) In case of failure, the CW is increased to more than 2 times (e.g., 4 times) and then the BC is re-picked.

In this case, a penalty is given for both success and failure. That is, if this method is applied, the MLD will attempt aggregation only when absolutely necessary.

Examples related to the '2-3) example' can be described as a combination of FIG. 26 (success case) and FIG. 27 (failure case).

The '2) example' only changes the CW rule, as compared to the '1) example', and follow the rule of picking the existing BC. However, since the BC has randomness, if a low BC is picked/drawn, the fairness performance may be lowered. Also, the '1) example' should store the previous back-off count value.

When the above rules are applied, the CW increase can be applied up to CWmax, but in the case of the method of adding the remaining BC, there are cases where it can exceed CWmax. The method to prevent this can be shown as follows.

Examples of not Exceeding CWmax

1) When a BC in a non-zero BC link is ignored and transmission is performed, aggregation may be not performed until BC=0 during the back-off of the next round. That is, once aggregation is performed, it means that the aggregation that ignores the BC is not performed in the next back-off operation.

In particular, the above '1) example' can be extended to N rounds, and BC-ignoring aggregation is not performed during the back-off of the next N rounds.

Figure 28:
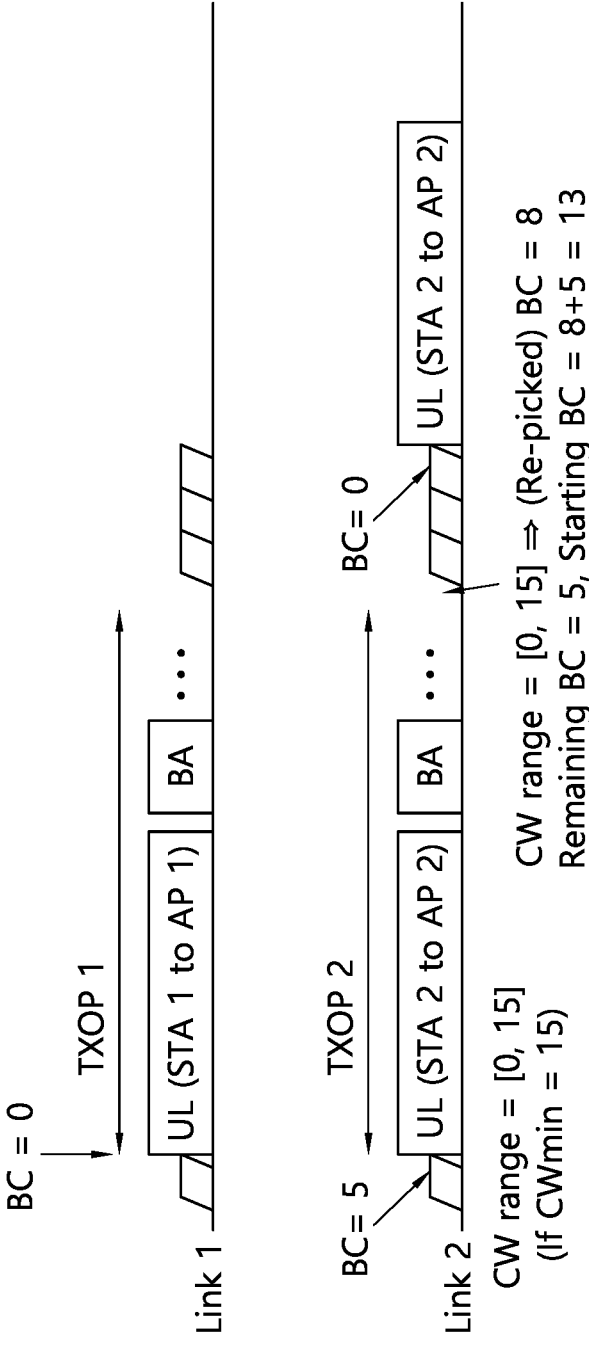

FIG. 28 is a diagram illustrating an embodiment of a CW adjustment method.

Assuming that N rounds are performed, N can be set to 1. Referring to FIG. 28, the currently remaining BC is 5 in the link 2, a re-drawn BC in the next back-off operation is 8. The CW range does not change because the previous CW was a min value, and the final BC becomes 13 (=8+5). Here, in order for the STA 2 to obtain the next TXOP in the link 2, the STA 2 cannot aggregate with link 1 in the middle and should wait until BC=0.

If CWmax is exceeded, there may be the following examples.

1) The BC value can be adjusted to CWmax Similar to the conventional methods, the BC value does not exceed the CWmax. However if the re-picked BC becomes the CWmax, the remaining BC will be ignored, which may be unfair.

2) Exceptionally, a BC value exceeding CWmax can be determined. Compared to the '1) example', it can increase fairness, but additional implementation for excess BC is required.

Examples of Maintaining AIFS[AC] on a Link where BC is Non-Zero

When the remaining BCs are added as in methods 1) and 2) described above, the remaining BCs can be used for higher priority traffic in the next back-off round. Therefore, it may be unfair to a STA that does not use this because it waits until BC=0 for lower priority traffic. Accordingly, even if the AC priority is higher in the next back-off round, fairness can be increased by performing back-off by maintaining the existing AC.

Figure 29:
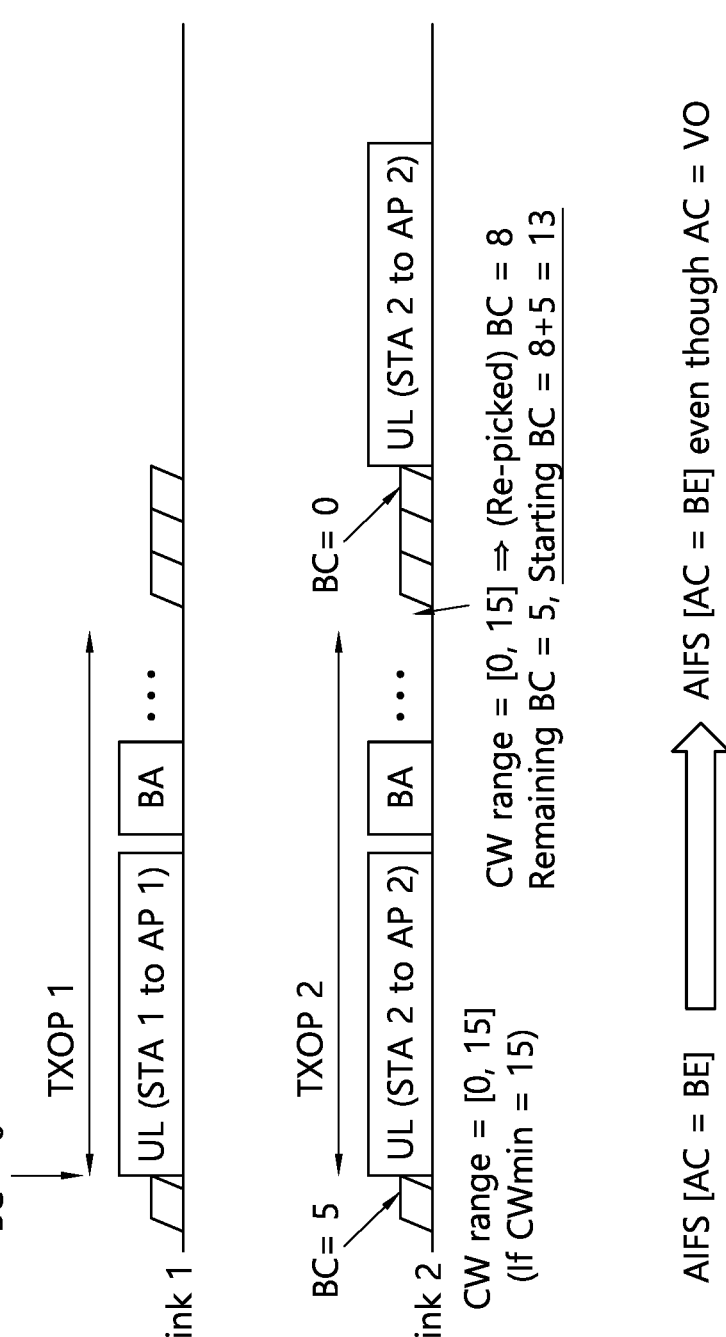

FIG. 29 is a diagram illustrating an embodiment of a method for maintaining AIFS[AC].

Referring to FIG. 29, if the AC of link 2 traffic at the time of aggregation is BE, even if the AC of the next round has a higher priority (e.g., VO), when AIFS sensing, AIFS [AC=BE] can be used to enhance fairness.

In the case of applying the above rule, if back-off is performed for a long time due to channel congestion, etc., it may eventually become a meaningless rule compared to the existing rule. That is, as the time increases, unfairness toward all STAs may be eliminated. In this case, the MLD may additionally announce MaxTime (e.g., PPDUMaxDuration, TXOP Maxduration, Beacon Interval, etc.) to which the above rule is applied. That is, if back-off is performed after the MaxTime, it can return to the existing rule. Also, for example, this time may not be separately defined as Max-Time=0 or the like.

2. Examples where Only One MLD is Capable of Immediate Aggregation

Examples of Using ML-RTS/ML-CTS

Here, the ML RTS/ML CTS means RTS/CTS used in 11be, and the name may be changed.

Figure 30:
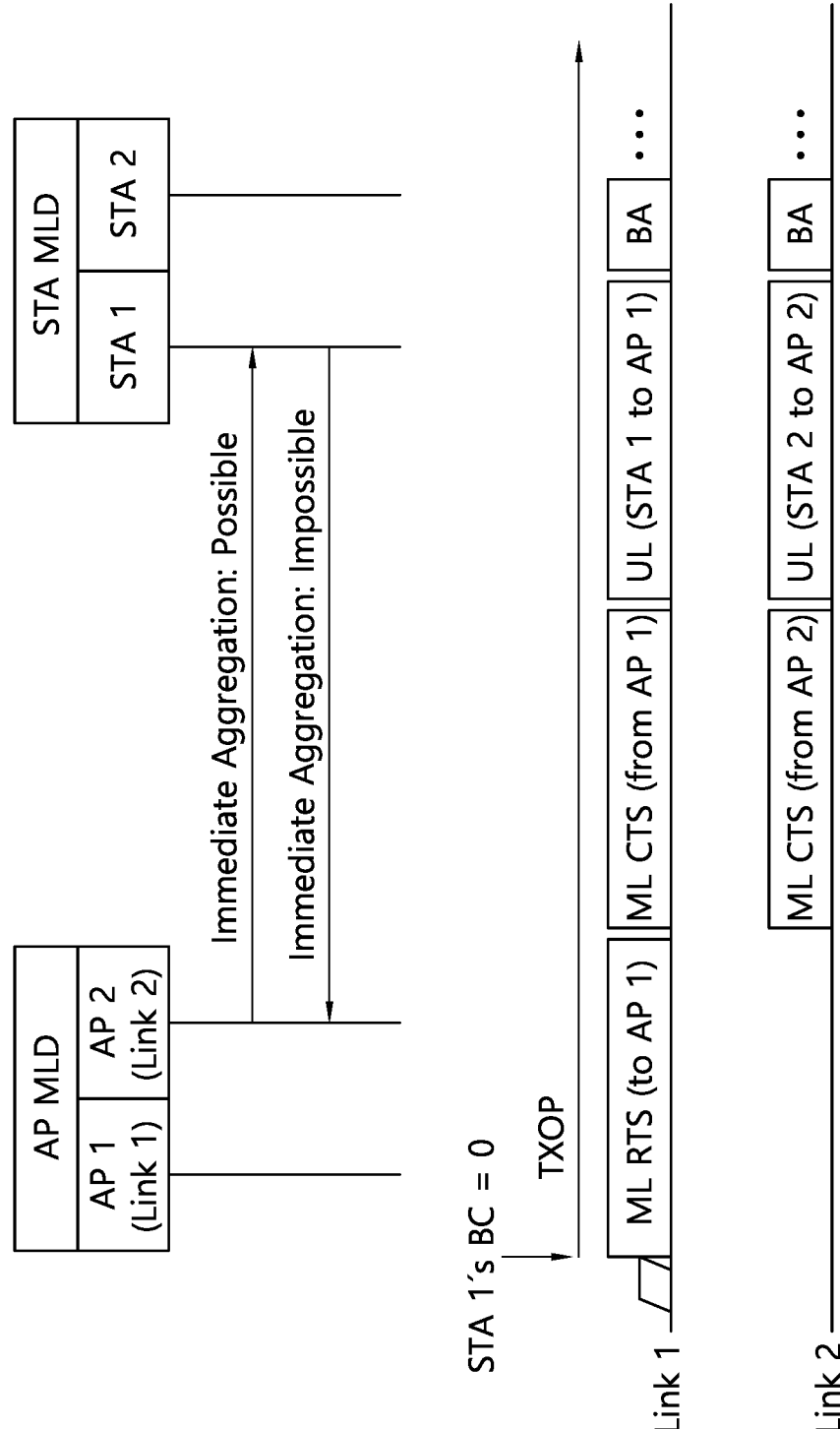

FIG. 30 is a diagram illustrating an embodiment of a multilink aggregation method using the ML-RTS/ML-CTS.

Referring to FIG. 30, the AP MLD may be capable of immediate aggregation, and the STA MLD may not be capable of the immediate aggregation. In the DL case, the aggregation in FIG. 23 is possible. Since the STA MLD does not currently enable the aggregation, the ML RTS may be transmitted in order to use the aggregation capability of the AP MLD. In this example, the ML RTS is transmitted through the link 1, and if the link 2 is IDLE based on information in the ML RTS, the AP MLD may aggregate and transmit the ML CTS to the STA MLD. The STA MLD may transmit UL data through ML aggregation after SIFS in the link where the ML CTS is received. Here, the STA MLD may or may not see the channel state during SIFS when transmitting UL data.

Based on the above example, main contents of ML RTS/CTS and transmission method of the ML CTS can be applied in various ways.

Examples of the contents that can be included in the ML RTS may be as follows, but the present embodiments are not limited thereto.

ML Aggregation: this is related to whether the ML RTS is used for ML Aggregation Ex 1) 1: Aggregation enabled, 2: Aggregation not used That is, when it is set to 0, the MT RTS is used for RTS/CTS purposes in the corresponding link through which the ML RTS is transmitted.

Set of Selected links: this indicates the link to be aggregated

Ex 1) List Number of Link+Link ID

Ex 2) Examples of using Link bitmap: this is set to 1 for a selected link, is set to 0 for an unselected link, and is set to 11 for the above example (Link 1, Link 2)

If the ML RTS is not used for the ML Aggregation, the Set of Selected links may not exist.

Examples of the contents that can be included in the ML CTS may be as follows, but the present embodiments are not limited thereto.

Set of Confirmed links: this indicates an aggregated link, (i.e., indicates links that transmit the ML-CTS in a link requested from the ML RTS)

A case of not being selected from the requested link may include: a case where transmission is not possible due to BUSY, NAV, or frame transmission; and a case where the selection is not made due to issues such as fairness for some links.

Ex 1) Listing Number of Link+Link ID

Ex 2) Examples of using Link bitmap: this is set to 1 for a selected link, is set to 0 for an unselected link, and is set to 11 for the above example (Link 1, Link 2)

The Set of Confirmed links of the ML CTS may be omitted, and the STA may implicitly determine whether the PPDU is received in each link.

Figure 31:
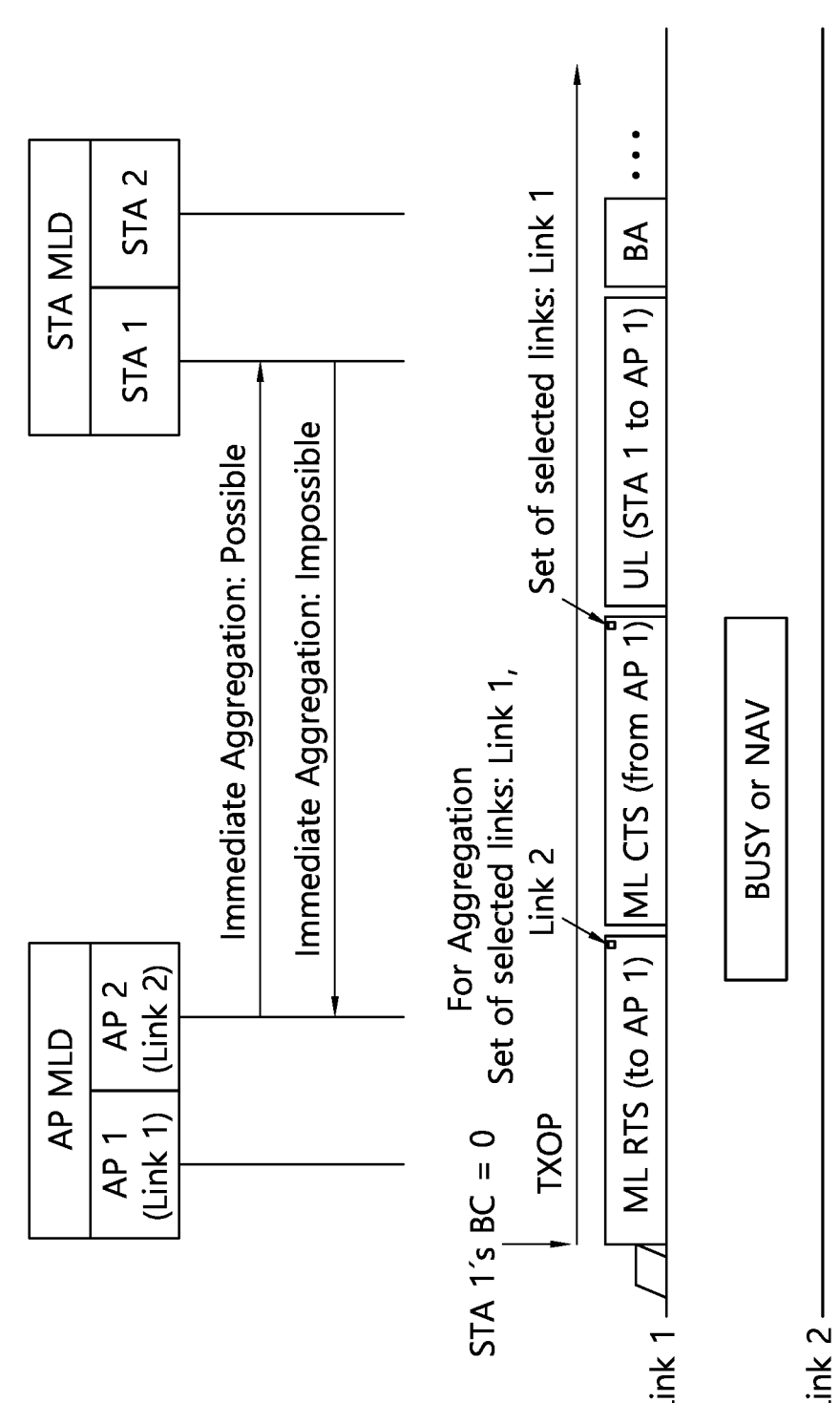

FIG. 31 is a diagram illustrating an embodiment of a multi-link aggregation method.

Referring to FIG. 31, the ML RTS of the link 1 may be used for aggregation. The ML RTS may request aggregation of the Link 1 and the Link 2. The AP MLD attempts to transmit through the Link 2 based on the information in the ML RTS, but the channel is BUSY (or NAV) and the ML CTS is transmitted to the STA MLD only through the Link 1. The STA MLD transmits UL data only on the Link 1 after SIFS. Here, when UL data is transmitted, the channel state may or may not be monitored during SIFS.

A method of transmitting the ML RTS in a link in which the ML RTS is not transmitted (e.g., link 2 in FIG. 30) may be as follows.

1) If the back-off is possible on a link where ML RTS is not transmitted, shorter frame may be transmitted by aligning with the end point of the ML RTS When aligning, a margin can be configured to enable the TX/TX, the RX/RX. Here, the frame may be a short ML RTS frame, or a null frame without data may be transmitted. In the case of short ML RTS, if aligned, information related to the link 2 can be included if data can be sufficiently inserted, but otherwise, the data is not included.

Figure 32:
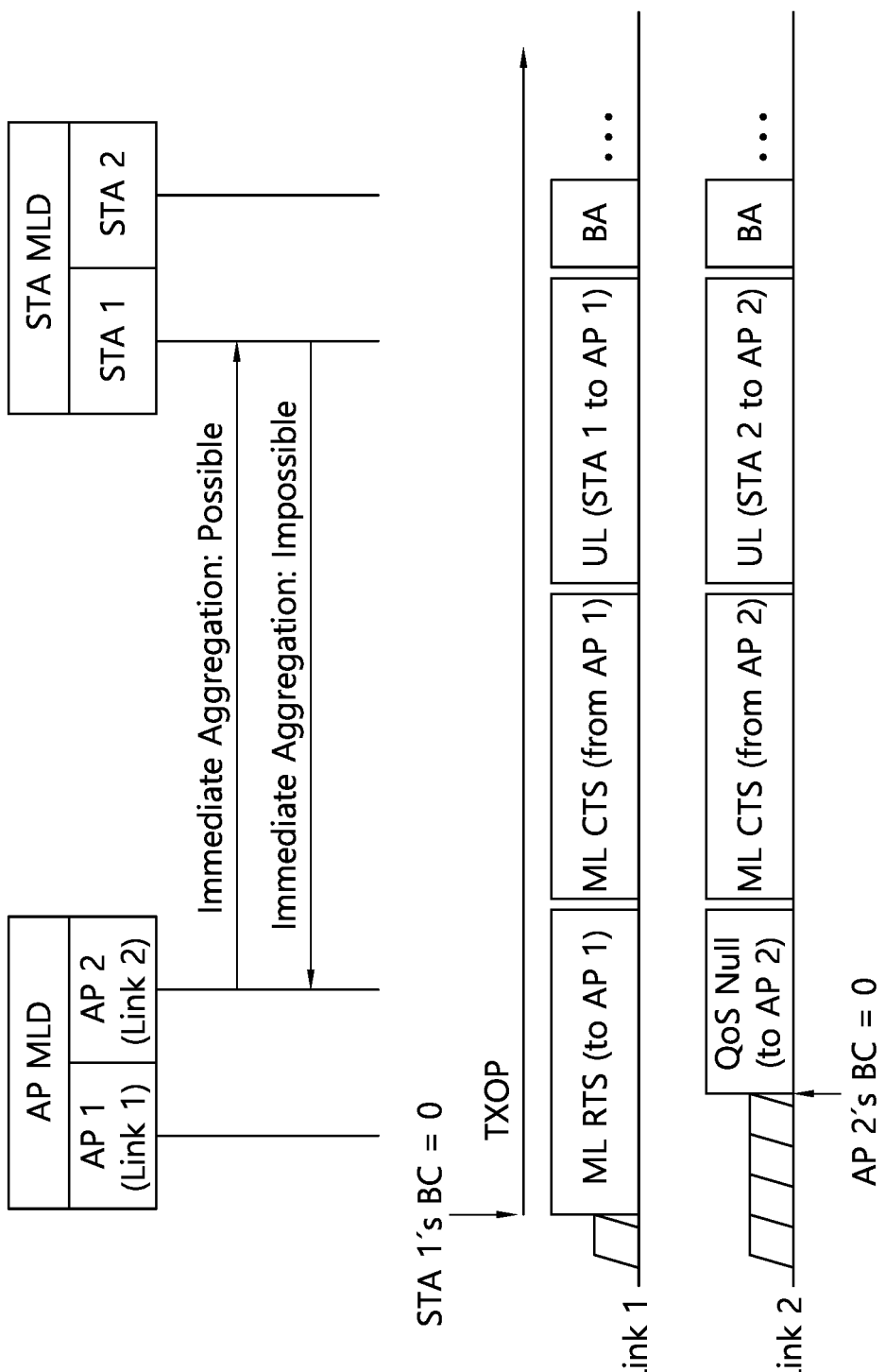

FIG. 32 is a diagram illustrating an embodiment of a multi-link aggregation method.

Referring to FIG. 32, before the ML CTS is transmitted through the Link 1, a BC of the AP 2 in Link 2 may be 0. When aligning the end points of the ML RTS in the Link 1, the STA MLD transmits QoS Null so that the ML CTS can be aggregated and transmitted because the Link 2 cannot contain enough information. In this case, the ML RTS may include information related to the Link 2 as well.

A method of transmitting the ML CTS in a link in which the ML RTS is not received (e.g., the Link 2 in FIG. 30) is as follows. In this specification, these links are referred to as non-RTS links, and a link through which ML RTS is received is referred to as an RTS link.

1) Examples where BC of the STA (AP 2 in FIG. 30) is not 0 Before Transmitting the ML CTS in the RTS Link 1-1) Basically, since the STA transmitting the ML CTS can perform immediate aggregation, as mentioned in 4.1, when the Backoff Count (BC)=0 in the RTS link, if it is determined as IDLE in the non-RTS link during a predetermined period (e.g., PIFS, AIFS, one slot, etc.) before that, a frame is transmitted by aggregating the two links. When aligning the start/end point of the PPDU of each link, a margin may be configured/provided to enable the TX/TX and the RX/RX.

Figure 33:
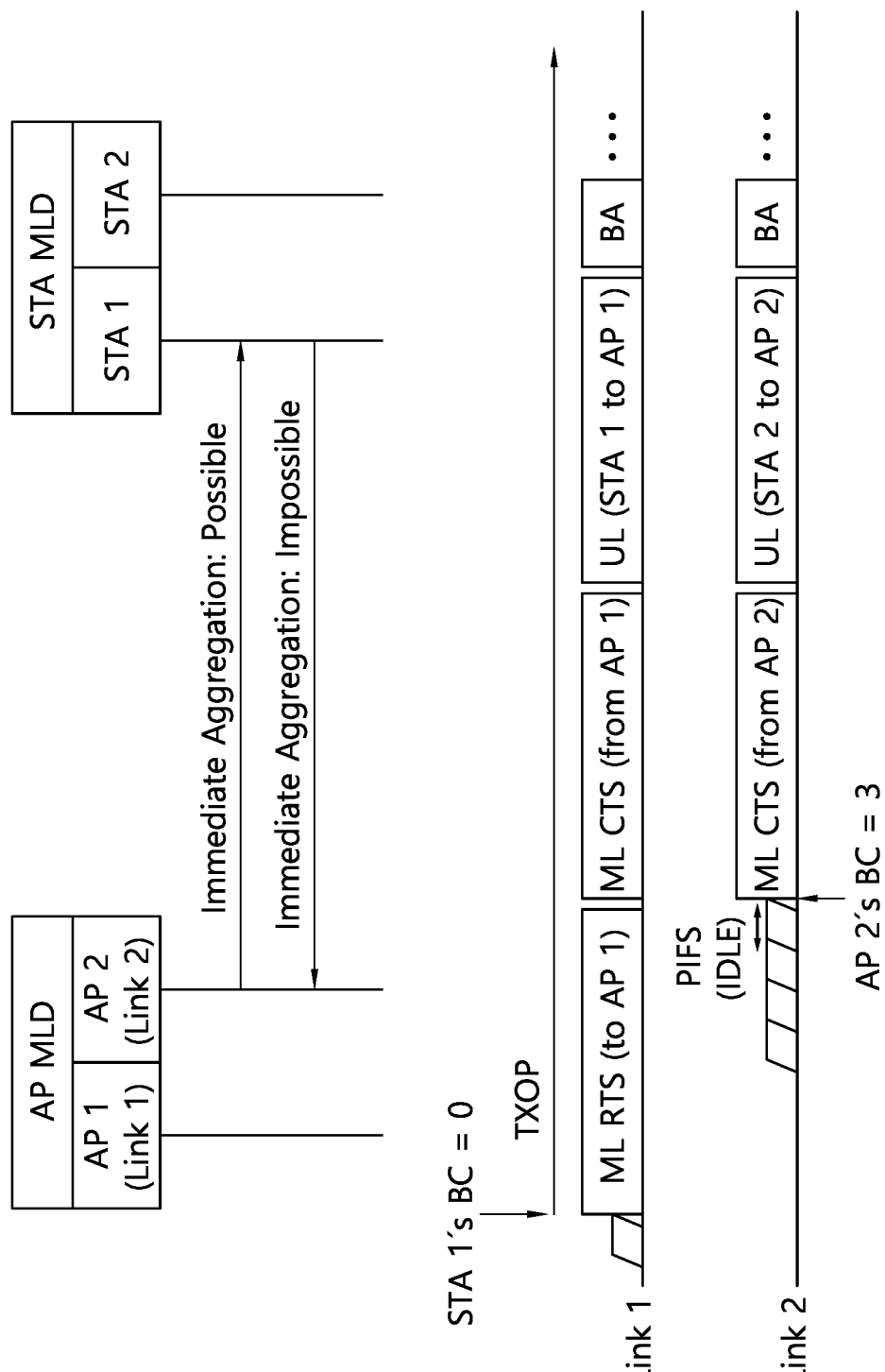

FIG. 33 is a diagram illustrating an embodiment of a multi-link aggregation method.

Referring to FIG. 33, although BC=3 of the Link 2 (non-RTS link), the STA MLD can monitor the channel state during the PIFS period to transmit the ML CTS. If the channel state is IDLE, the STA MLD may transmit the ML CTS in the Link 1 and the Link 2.

1-2) Backoff is performed until BC=0, and when BC=0, a shorter ML CTS is transmitted by aligning with the end point of the ML CTS being transmitted in the RTS link. When aligning, a margin can be configured/provided to enable the TX/TX, the RX/RX.

This method can be used even when the immediate aggregation is not possible in both MLDs.

Figure 34:
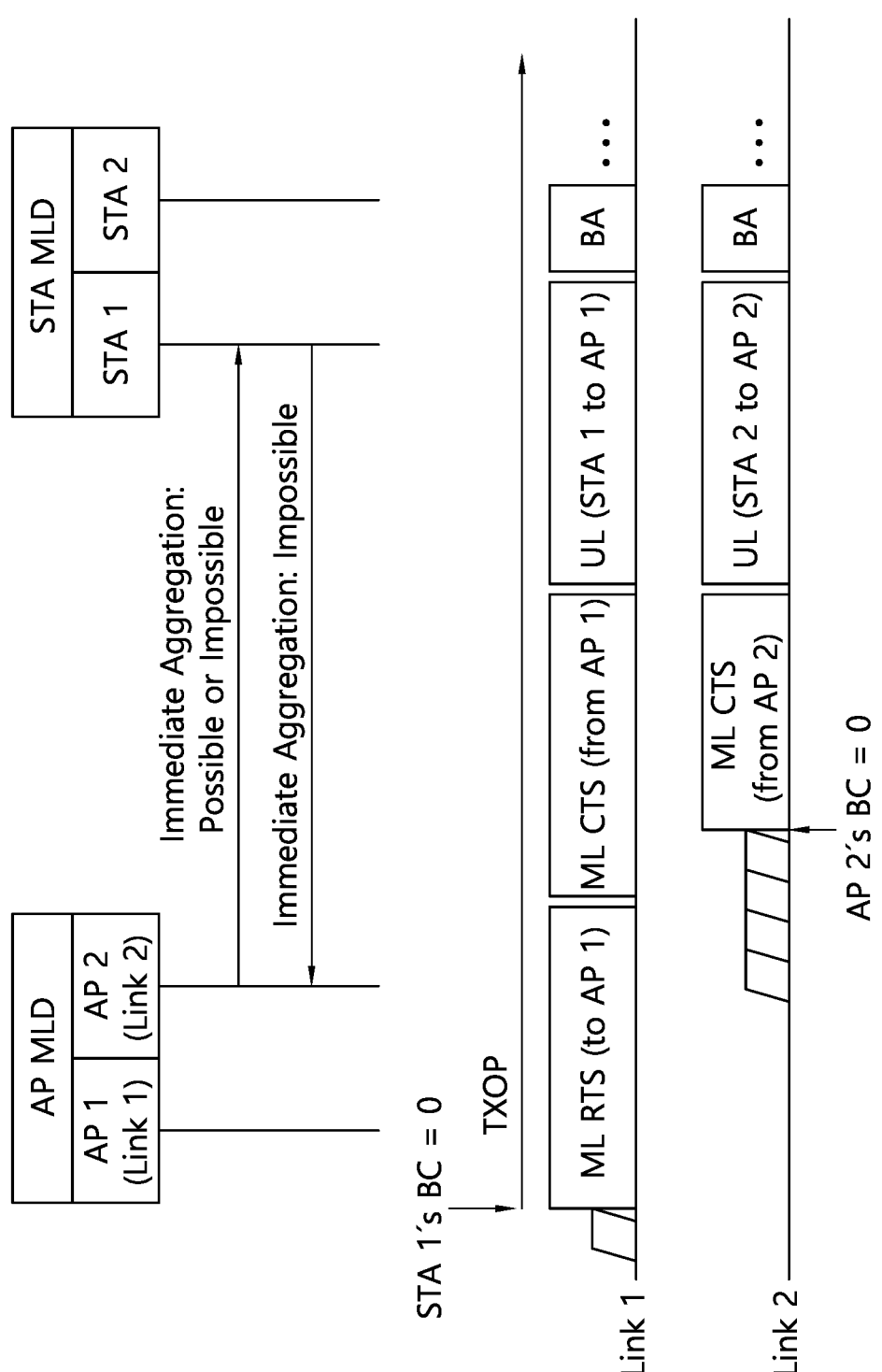

FIG. 34 is a diagram illustrating an embodiment of a multi-link aggregation method.

Referring to FIG. 34, the AP MLD may perform Back-off until BC=0 of the AP 2 of the Link 2 (non-RTS link). When BC=0, the AP 1 is transmitting the ML CTS, but the AP1 may align the Link 2 to the end point of the ML CTS of the Link 1 for transmission.

Here, this example is possible when the AP is capable of an immediate response, or when it is not possible.

2) Examples Whether BC of the STA (e.g., AP 2 in FIG. 30) Becomes 0 Before Transmitting the ML CTS in the RTS Link 2-1) The STA MLD transmits data regardless of whether the ML RTS is being received. However, if reception is not possible on the non-RTS link due to ML RTS transmission, the STA transmitting the ML RTS is excluded from the data transmission target.

This method can be used even when the immediate aggregation is not possible in both MLDs.

Figure 35:
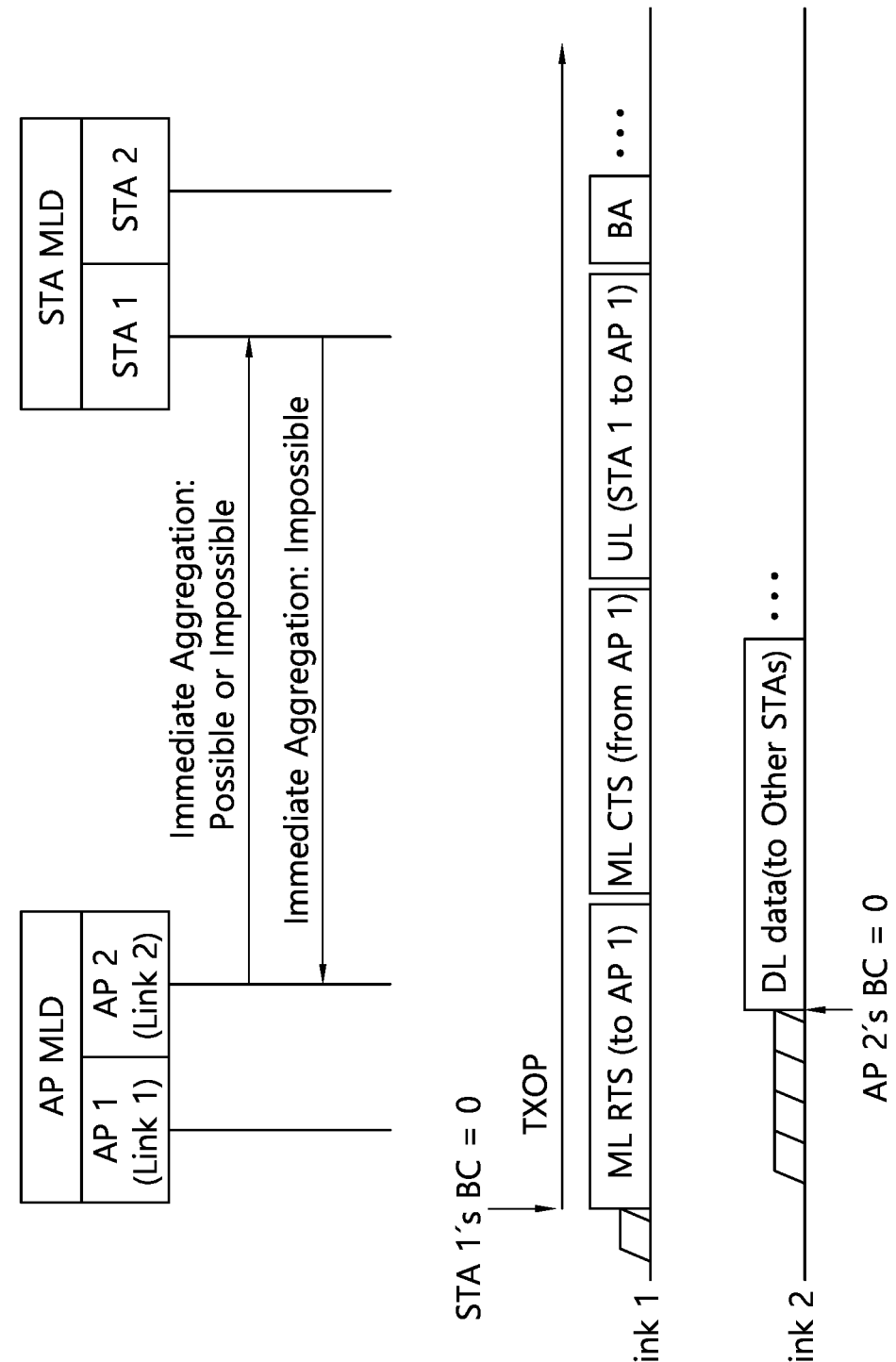

FIG. 35 is a diagram illustrating an embodiment of a multi-link aggregation method.

Referring to FIG. 35, when BC=0 of the AP 2 in the Link 2 (non-RTS link), data is transmitted to other STAs except the STA 2 regardless of whether the ML RTS is received.

Here, this example is possible when the AP is capable of an immediate response, or when it is not possible.

2-2) Examples where reception of the ML RTS is recognized

A. It can be deferred until the ML CTS is transmitted

After the deferment, the channel status is checked for a certain period (e.g., PIFS, AIFS, one slot, etc.) as in the method 1-1), and if it is determined to be IDLE, the ML CTS is transmitted. When BUSY, the channel status is continuously checked for a certain period (e.g., PIFS, AIFS, one slot, etc.), and if it is determined to be IDLE, the ML CTS is transmitted. A shorter ML CTS is transmitted by aligning it with the end point of the ML CTS. When aligning, a margin can be configured/provided to enable the TX/TX, the RX/RX.

Figure 36:
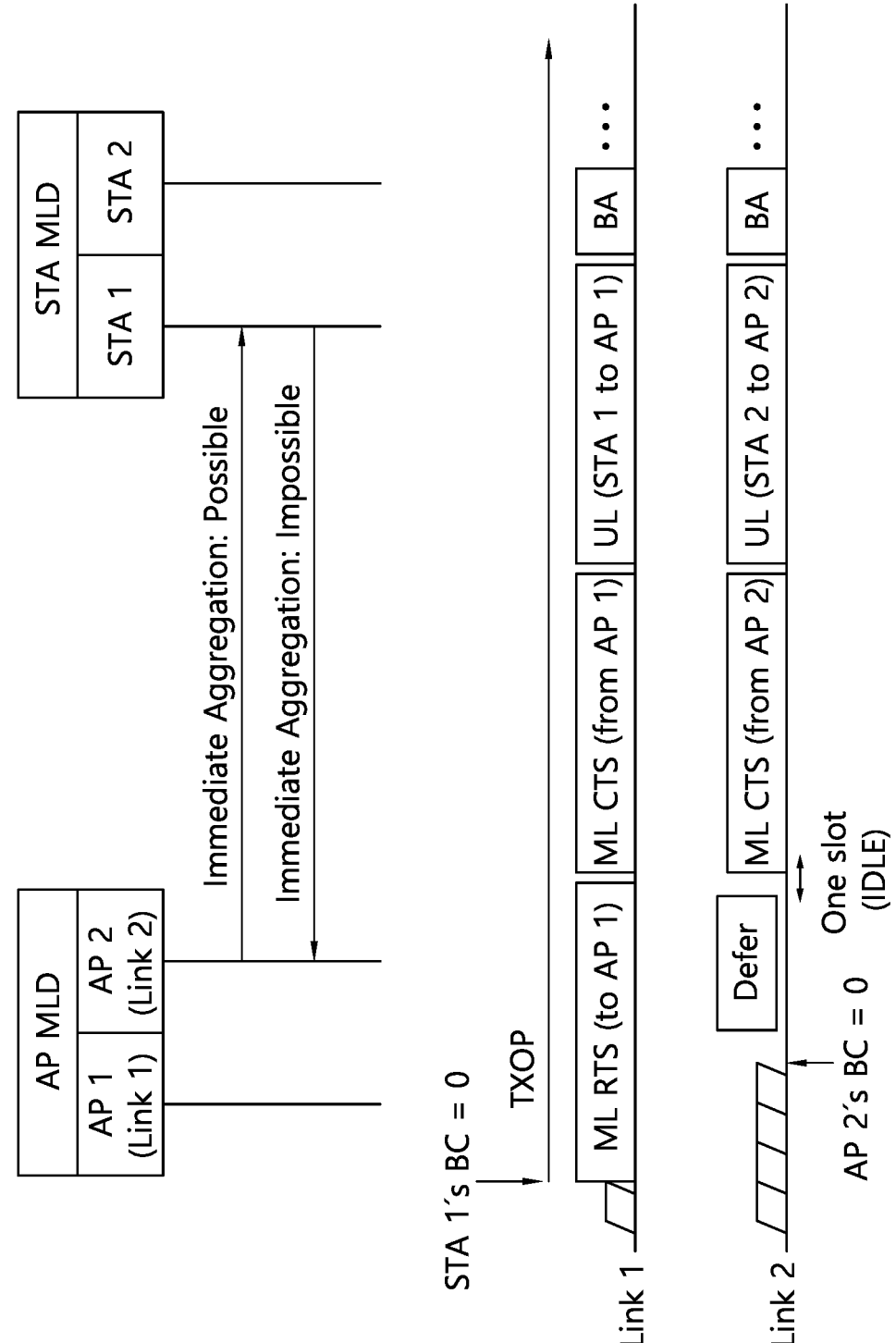

FIG. 36 is a diagram illustrating an embodiment of a multi-link aggregation method.

Referring to FIG. 36, before the time point at which the Link 1 transmits the ML CTS, a BC of the AP 2 in Link 2 may be zero. In this case, the AP MLD can defer transmission until the time of sending the ML CTS, and if the channel is idle for one slot before sending the ML CTS, the ML CTS can be transmitted over two links.

B. A short frame such as the NDP may be transmitted, and back-off may be performed again. When the back-off is performed again, the methods 1-1) and 1-2) can be applied. When applying the method 1-2), this method can be used even when immediate aggregation is not possible for both MLDs.

Figure 37:
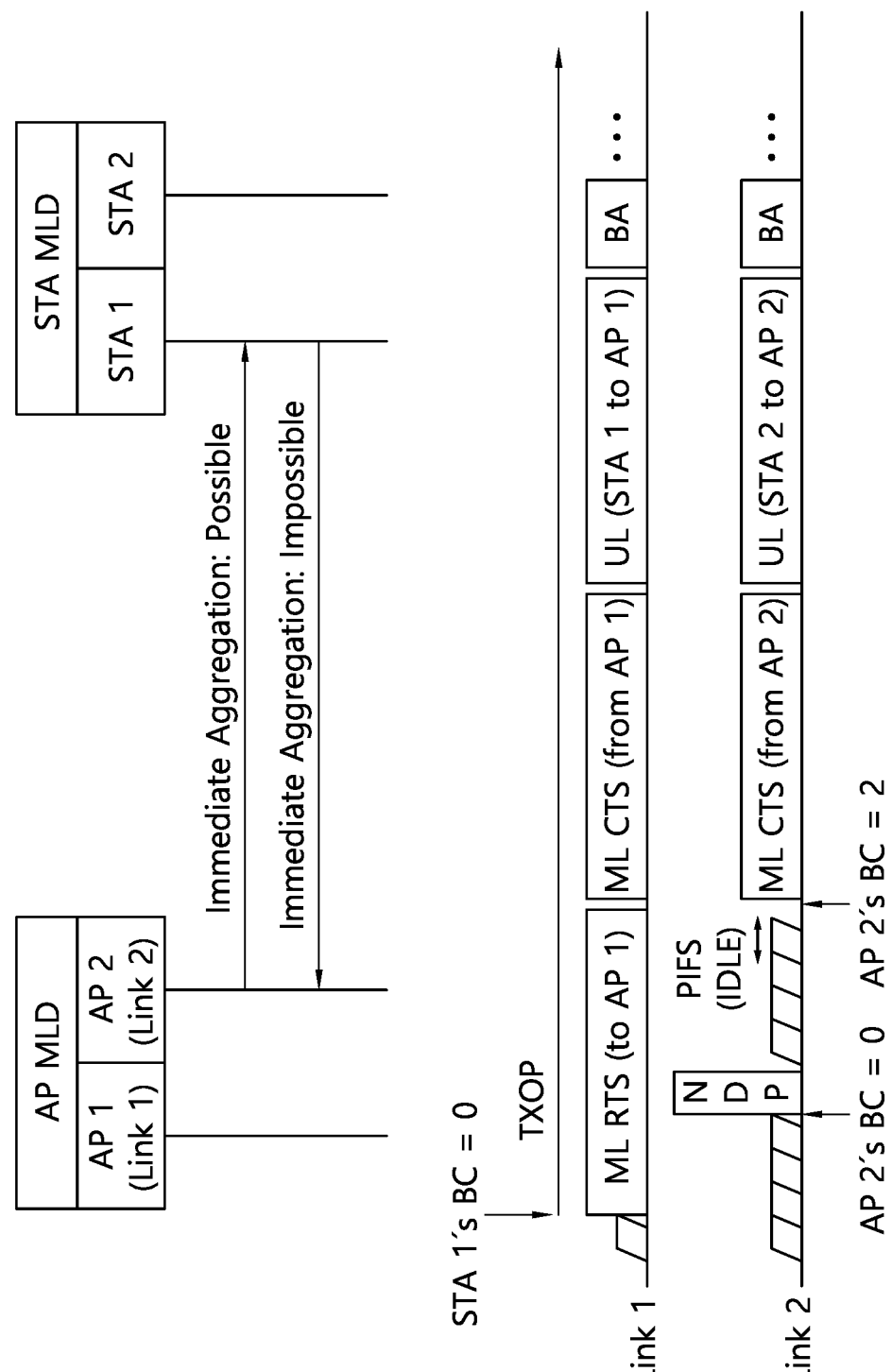

FIG. 37 is a diagram illustrating an embodiment of a multilink aggregation method.

Referring to FIG. 37, a BC of the AP 2 in the Link 2 before the point in time when the Link 1 transmits the ML CTS may be zero. When BC=0, after transmitting a short NDP, the back-off is restarted, and although BC=2 of the Link 2 (non-RTS link), the channel state is checked during the PIFS period to send the ML CTS. If the channel state is IDLE, the ML CTS is transmitted on the Link 1 and the Link 2.

C. The BC can be re-selected and the back-off can be performed again. When the back-off is performed again, the methods 1-1) and 1-2) can be applied. When applying the method 1-2), this method can be used even when immediate aggregation is not possible for both MLDs.

When BC=0, a method of obtaining a faster transmission opportunity (TXOP) may be considered because transmission is not performed and selected again.

C-1) The BC may be selected again between 0 and the current contention window (CW)[AC].

It is the same method as selecting the BC before, and the channel access delay may be longer.

C-2) If the current CW is greater than CWmin[AC] (minimum value of CW[AC] in 802.11), the BC may be selected again between 0 and CW[AC]/2 (i.e., half of CW[AC]).

Although it is possible to obtain a faster transmission opportunity (TXOP) than the method C-1), it may be somewhat unfair to other STAs in a congested environment.

C-3) If the current CW is greater than CWmin[AC] (minimum value of CW[AC] in 802.11), the BC may be selected again between 0 and CWmin[AC].

On average, a faster transmission opportunity (TXOP) can be obtained than method C-2), but in a congested environment, it may be unfair to other STAs.

C-4) The BC may be selected again between 0 and the current contention window (CW)[AC], and the final BC is reduced to BC/2 (if the BC/2 contains a decimal point, it can be rounded up or rounded down)

Here, instead of '½ (i.e., hale', it can be further reduced to '⅓', '¼', etc. The less it is, the faster the transmission opportunity (TXOP) can be obtained.

C-5) If the current CW is greater than CWmin[AC] (the minimum value of CW[AC] in 802.11), the BC may be selected again between 0 and CWmin[AC], and the final BC is reduced to BC/2 (the BC/2 can be rounded up or rounded down).

Here, instead of the value of '½ (i.e., half)', it can be further reduced to '⅓', '¼', etc. The less it is, the faster the transmission opportunity (TXOP) can be obtained.

The method C-5) can get the fastest transmission opportunity (TXOP) on average, but it can give unfairness to other STAs depending on some situations (e.g., crowded situations). However, when BC=0, this may be an applicable method if it is considered as compensation for the part that cannot be transmitted.

Figure 38:
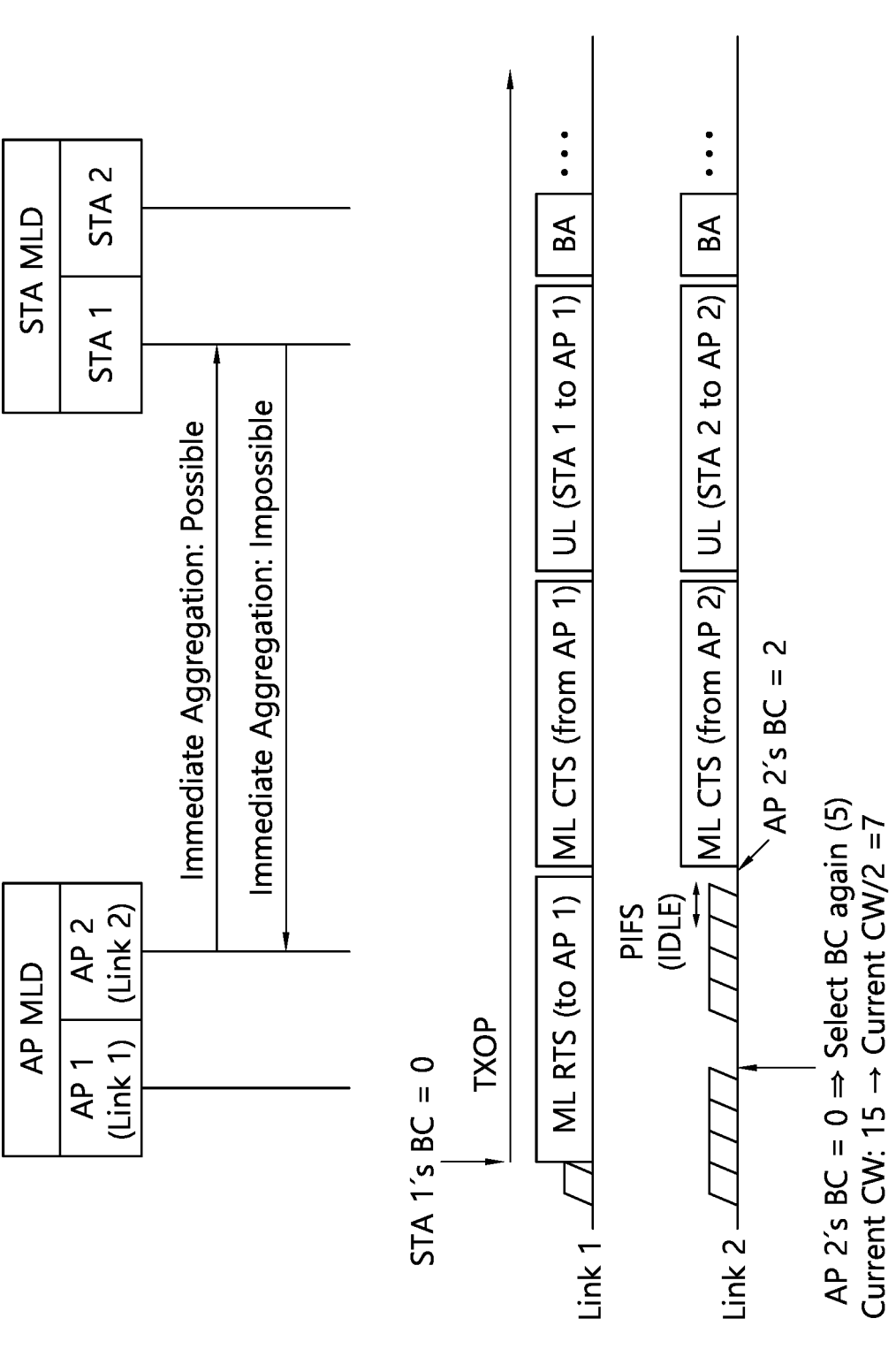

FIG. 38 is a diagram illustrating an embodiment of a multilink aggregation method.

FIG. 38 is an example in which the BC of the AP 2 in the Link 2 becomes zero before the time point when the Link 1 transmits the ML CTS. When BC=0, the current CW is halved and BC is selected again. In this example, the reselected BC is 5, and when the link 1 sends the CTS, the BC of the link 2 (non-RTS link) becomes zero. But in order to send the ML CTS, the channel state is checked during the PIFS period, and if the channel state is IDLE, the ML CTS is transmitted on the Link 1 and the Link 2.

Examples of not Using the ML-RTS/ML-CTS

1) Deferring based Aggregation: It is deferred until the BC of all links to be aggregated becomes 0, and the aggregation is performed if channel is IDLE. The process is as follows.

1-1) The link to be used for aggregation (to be used for frame transmission) may be selected.

If all links enabled by the original multi-link STA are used, this process is not necessarily performed.

There may be a primary link that must always be included, such as performing main BSS functionality.

1-2) If BC=0 of one link, all links selected in the step 1) are deferred until the BC becomes 0.

1-3) When the BC of all links selected in the step 1) becomes 0, the links are aggregated and the frame is transmitted.

When BC=0 of all links, for the deferred link, the channel status can be checked for a certain period (e.g., PIFS, AIFS, one slot, etc.) as in the method 1-1) of section 4.2 again for the deferred link, and data can be transmitted if it is IDLE. If it is BUSY, the channel status is continuously checked for a certain period (e.g., PIFS, AIFS, one slot, etc.), and the determent is continued in each link. After that, if the channel status of all links is IDLE, data is transmitted.

This method can be used even when both MLDs are capable of immediate aggregation.

Figure 39:
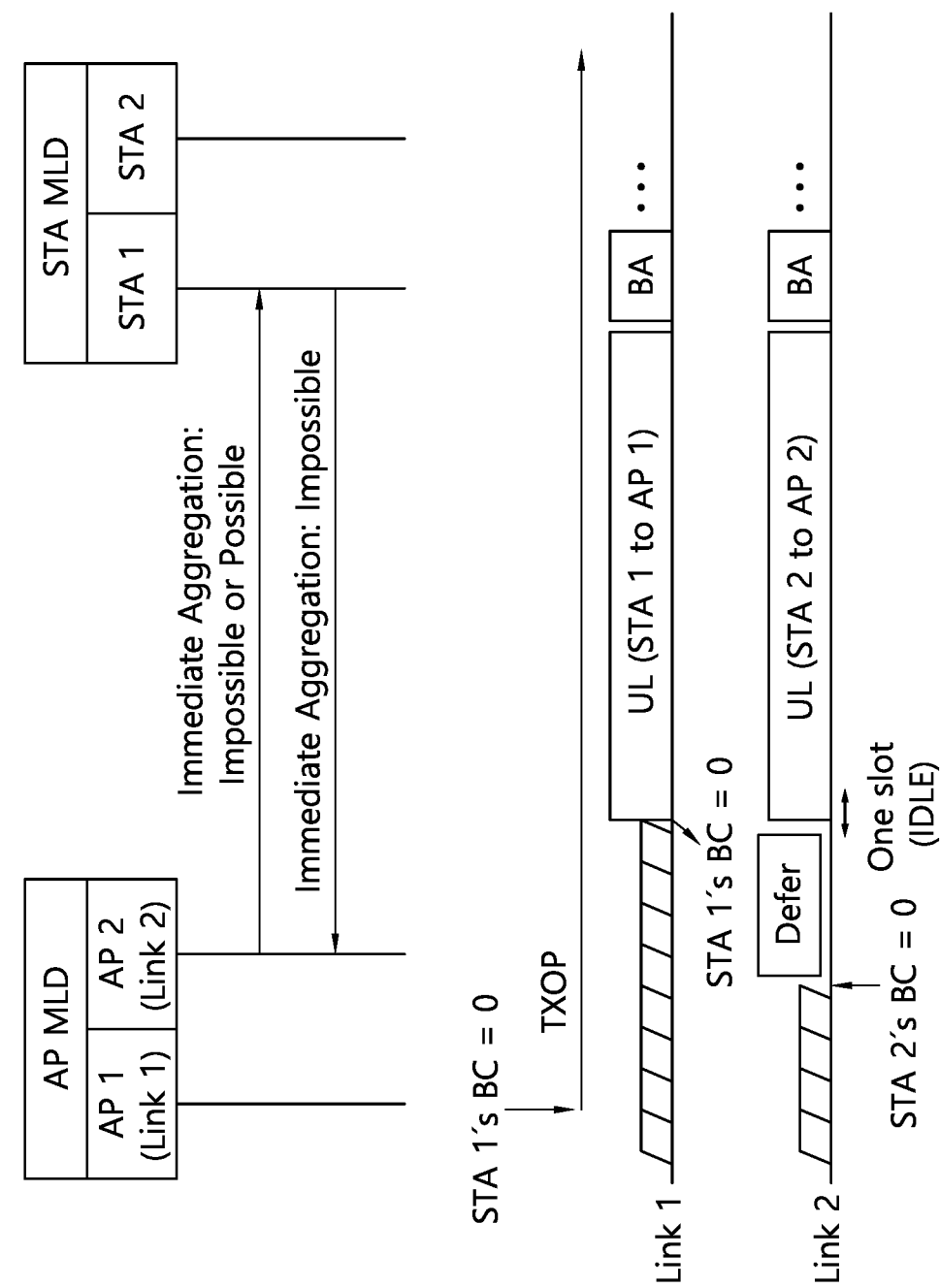

FIG. 39 is a diagram illustrating an embodiment of a multi-link aggregation method.

Referring to FIG. 39, even if the BC of the STA 2 becomes zero first, it is deferred until the BC of the STA 1 reaches zero. In the Link 2 that both STAs defer when BC=0, if it is IDLE during one slot before that, data may be transmitted through link 1 and link 2.

Here, this example is possible when the AP is capable of an immediate response, or when it is not possible.

3. Examples in which Immediate Aggregation is not Possible for Both MLDs

Examples of Using the ML-RTS/ML-CTS

The ML-RTS/ML-CTS contents mentioned above can be used, and some methods are mentioned in the case where immediate aggregation is not possible in both MLDs (e.g., the methods 1-2) and 2-1) in the Section 2, etc.)

A method of transmitting the ML CTS in a link in which the ML RTS is not received (e.g., the Link 2 in FIG. 30) is as follows.

1) The Time when the ML CTS Will be Transmitted May be Predicted by Using the Length of the ML RTS Transmitted in the RTS Link.

Figure 40:
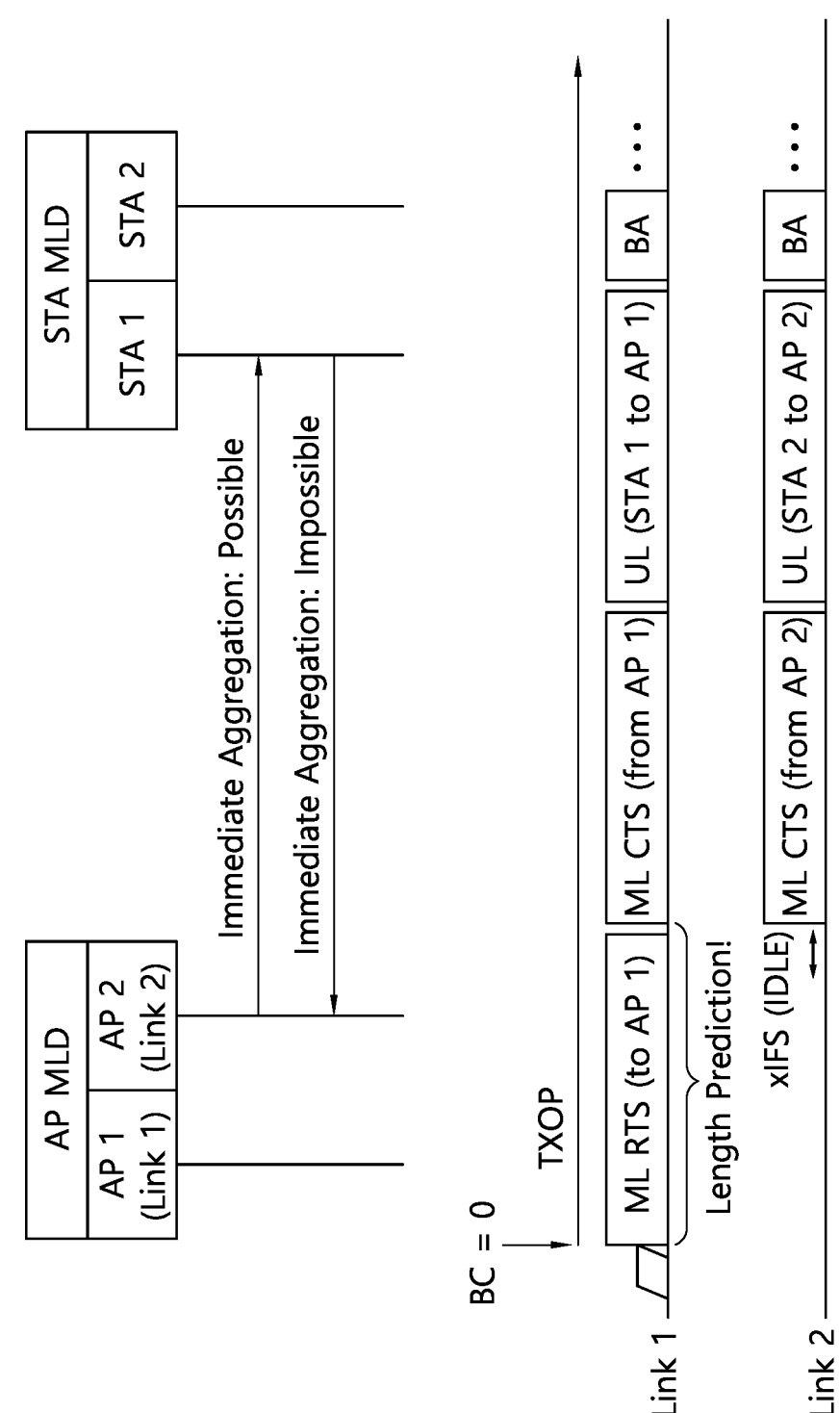

FIG. 40 is a diagram illustrating an embodiment of a multi-link aggregation method.

Referring to FIG. 40, both the DL/UL may not be instantaneously aggregated. In this example, if the STA MLD transmits the ML RTS through the Link 1, and the AP MLD transmits the ML RTS to the STA MLD, if the Link 2 is IDLE based on information in the ML RTS, it may be aggregated and transmitted to the STA MLD. However, since there is no immediate aggregation, it is determined at which point in the link 2 the channel state should be monitored in consideration of the ML-RTS length. For example, if it is determined that the time point after the ML-RTS length and SIFS is obtained, the channel state can be monitored for a certain period before the time point. Therefore, if the AP MLD transmits the ML CTS through the Link 1 and the Link 2, the STA MLD transmits UL data through ML aggregation after SIFS. Here, when the UL data is transmitted, the channel state may or may not be monitored during SIFS. Also, even if the ML RTS is sent, the AP MLD may decide whether to select aggregation.

Although the coordination related to aggregation was mentioned above, the capability of sharing channel state and/or backoff count can be considered by making more general.

Coordination Capability for Channel state and/or back-off count: This is related to whether Immediate channel state/back-off sharing is possible. In addition, conditions for availability may be attached. For example, it is possible to indicate whether it is possible by attaching conditions such as whether it is possible in one slot, whether it is possible in SIFS, or whether it is immediately possible. It can also be expressed in terms of time, not simply whether or not it is possible.

For example, if it is set to '0,' the immediate channel state/back-off sharing is immediately possible, and if it is set to indicate one slot, it indicates that at least one slot is required.

The previous embodiments can be applied through the above generalized capability. For example, information on whether immediate aggregation is possible may be interpreted as information on whether immediate channel state and/or back-off count value sharing is possible.

4. Efficient Aggregation Method

Some aggregation methods may affect single-link terminals. For example, in the method of multi-link aggregation through PIFS, the priority of accessing channels of UEs using AIFS may be low. Therefore, a method to reduce the effect is proposed. One of these methods is also mentioned in the Section 1, 'Examples related to BC control on link(s) where BC is non-zero'. The method mentioned in this section may or may not apply the BC control. If BC control is applied at the same time, a fair method can be applied to single-link terminals.

1) Examples of determining the maximum number of links that can be aggregated (e.g., Max. Aggregation Limit)

The maximum number of links that can be aggregated between each MLD can be determined. Method 1-1): Since the AP can know the status of all channels, the aggregation of the STA can be controlled by determining the maximum number of links that can be directly aggregated. That is, in this case, the STA must follow the determined maximum number of aggregation links. Method 1-2): STA may request a desired value of an aggregation limit.

This method can be applied to other frames as well as the above ML RTS or ML CTS. In addition, this method may be performed in the Setup (Association) step, and even if it is determined in the 'Setup' step, it may be dynamically changed. In the setup stage, it can be included in the Beacon/Association response frame, etc., and when it is dynamically changed, it can be included in the control/data frame in the form of a management frame such as a Beacon or one field.

Figure 41:
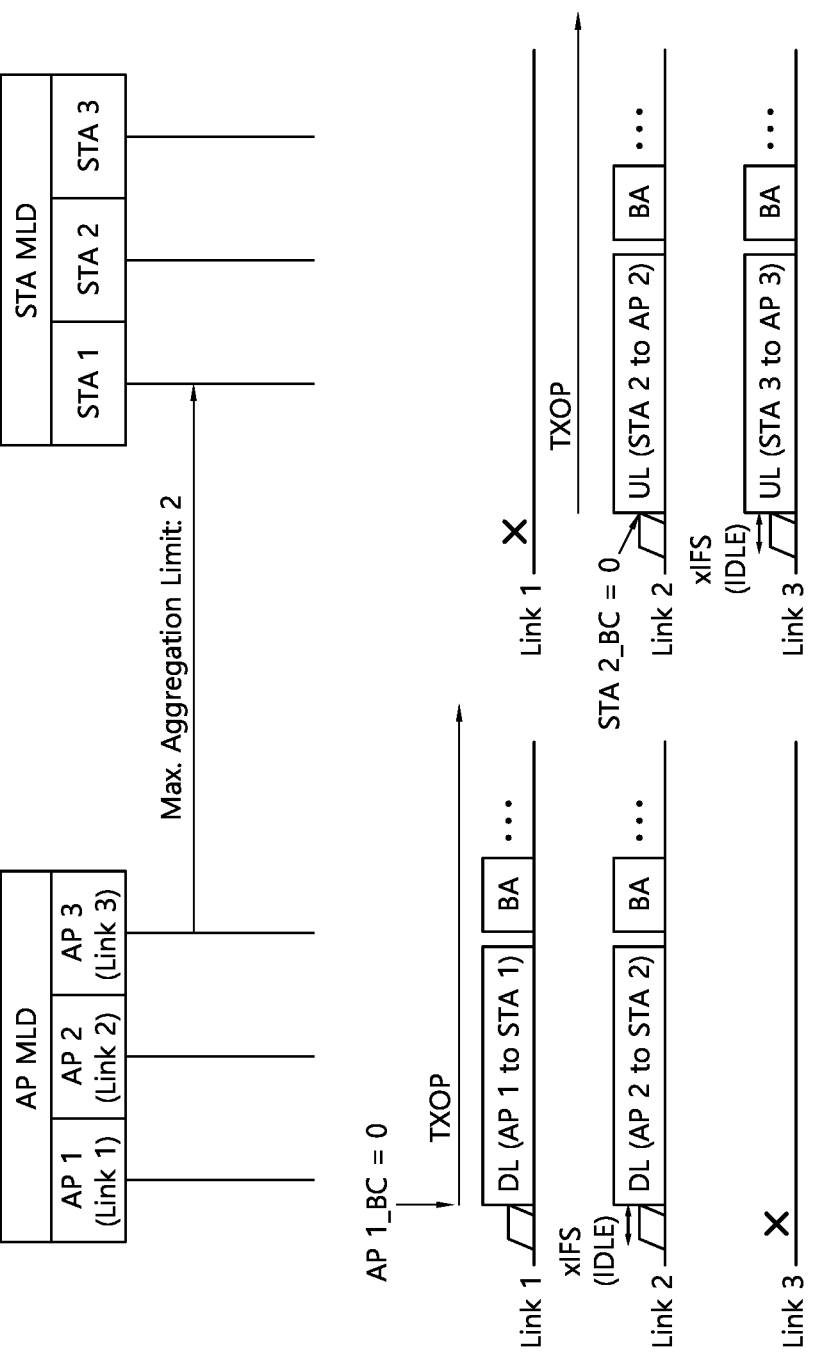

FIG. 41 is a diagram illustrating an embodiment of a multi-link aggregation method.

Referring to FIG. 41, the AP MLD may announce the maximum possible number of aggregation links to two. In this case, in the case of the AP MLD and the STA MLD, when Backoff Count (BC)=0 in one link, only one link may be aggregated. Therefore, when BC=0 in the Link 1, the Link 2 is considered idle during a predetermined period (e.g., PIFS, AIFS, one slot, etc.) before that, and a frame can be transmitted by aggregating the two links. When BC=0 in the link 2, the STA MLD aggregates two links and transmits a frame when the Link 3 is IDLE for a predetermined period (e.g., PIFS, AIFS, one slot, etc.) before that. Here, the MLD may determine the channel state of all or some links, and may select by Max, or may select the link by Max to determine the channel state.

Figure 42:
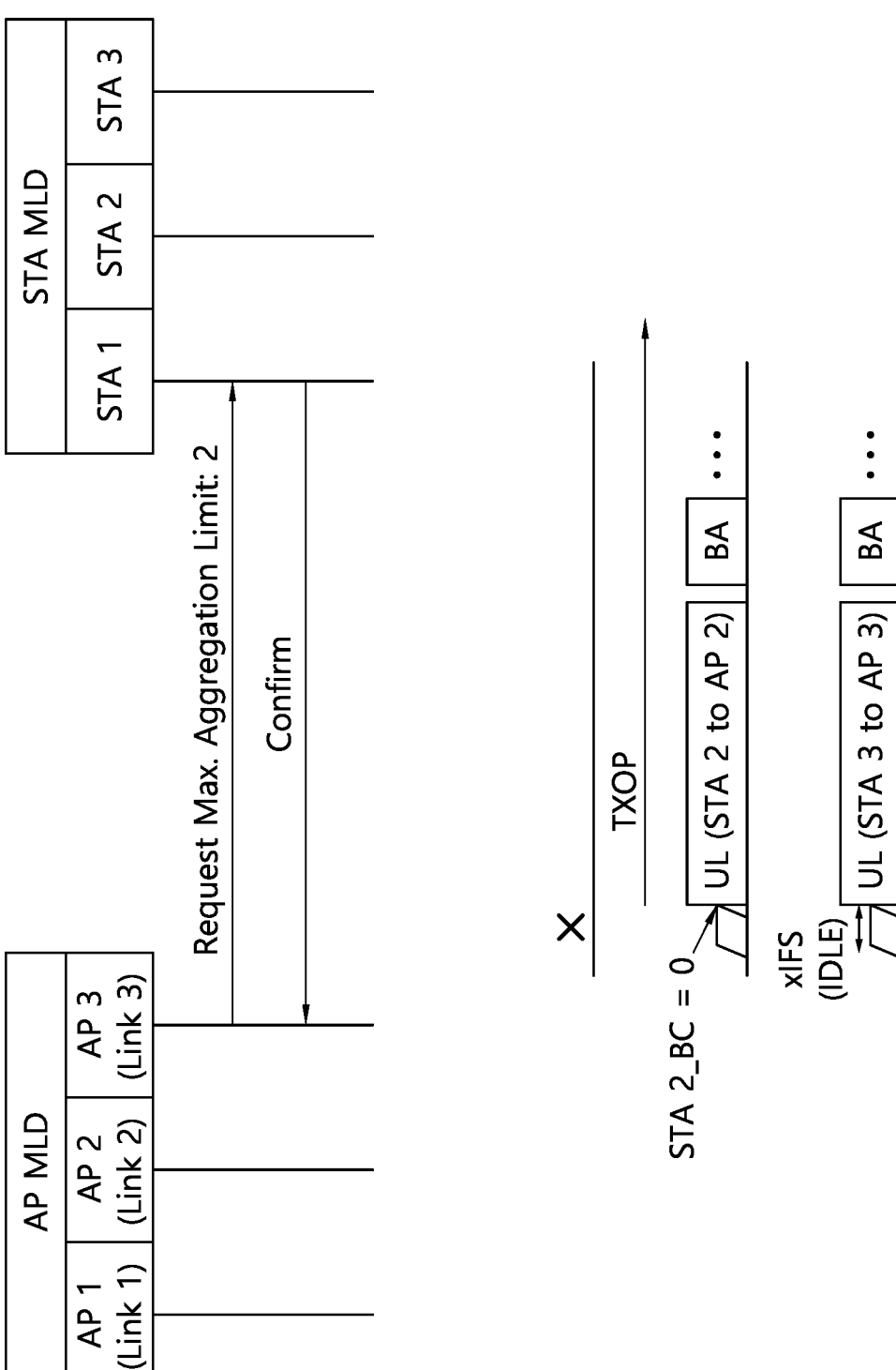

FIG. 42 is a diagram illustrating an embodiment of a multilink aggregation method.

FIG. 42 is an example in which Max. Aggregation limit is set to 2, which is similar to the example of FIG. 41. The difference from FIG. 41 is that the AP MLD does not announce, but the STA MLD requests a limit value of 2 and the AP MLD responds to this request.

2) Examples of determining the link set that can be aggregated (+ Max. Aggregation limit)

A link set capable of aggregation can be negotiated between each MLD. Similar to the method 1), Method 2-1) or Method 2-2) can be defined. Method 2-1): The AP may announce an aggregation link set. Method 2-2): Alternatively, the STA may request a preferred aggregation link set. Furthermore, the MLD may separately designate a link for starting aggregation (i.e., a link on which aggregation is attempted when the BC reaches 0) according to channel conditions.

Here, the MLD may attempt aggregation by selecting only a part of the link set. That is, it is not necessary to attempt aggregation for all link sets.

This method can be applied to other frames as well as the above ML RTS or ML CTS. In addition, this method may be performed in the Setup (Association) step, and even if it is determined in the 'Setup' step, it may be dynamically changed. In the setup stage, it can be included in the Beacon/Association response frame, etc., and when it is dynamically changed, it can be included in the control/data frame in the form of a management frame such as a Beacon or one field.

Figure 43:
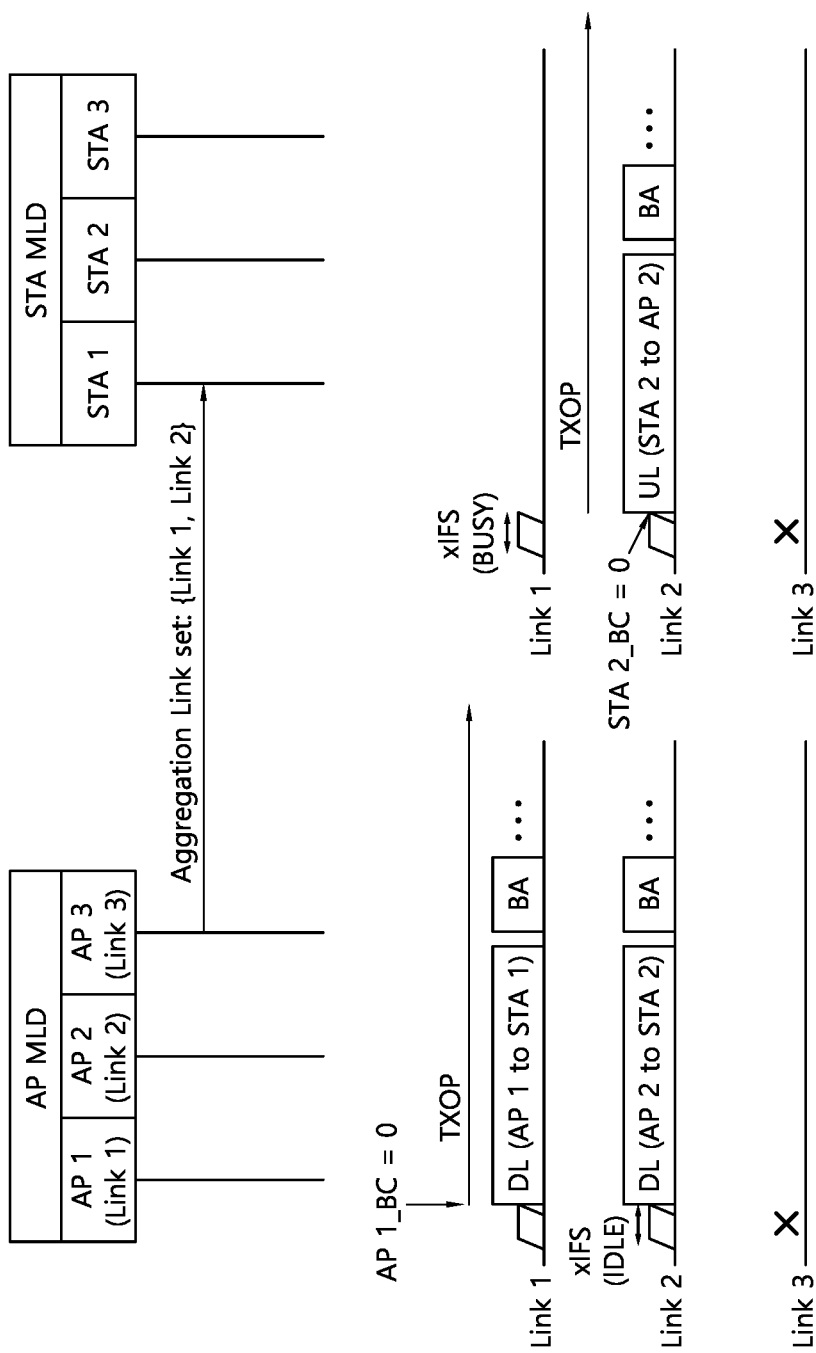

FIG. 43 is a diagram illustrating an embodiment of a multi-link aggregation method.

Referring to FIG. 43, the AP MLD may determine the Link 1 and the Link 2 as an aggregation link. In this case, in the case of the AP MLD and the STA MLD, when Backoff Count (BC)=0 in the link 1 or the link 2, only the Link 2 or the Link 1 may be aggregated, respectively. Therefore, when BC=0 in the link 1, the Link 2 is considered idle during a predetermined period (e.g., PIFS, AIFS, one slot, etc.) before that, and a frame can be transmitted by aggregating the two links. The Link 3 does not check the channel status because it is not included in the aggregation link set. When BC=0 in the Link 2, the Link 1 is considered idle during a predetermined period (e.g., PIFS, AIFS, one slot, etc.) before that, and a frame can be transmitted through the Link 2. Also, since the Link 3 is not included in the aggregation link set, the channel status is not checked.

Figure 44:
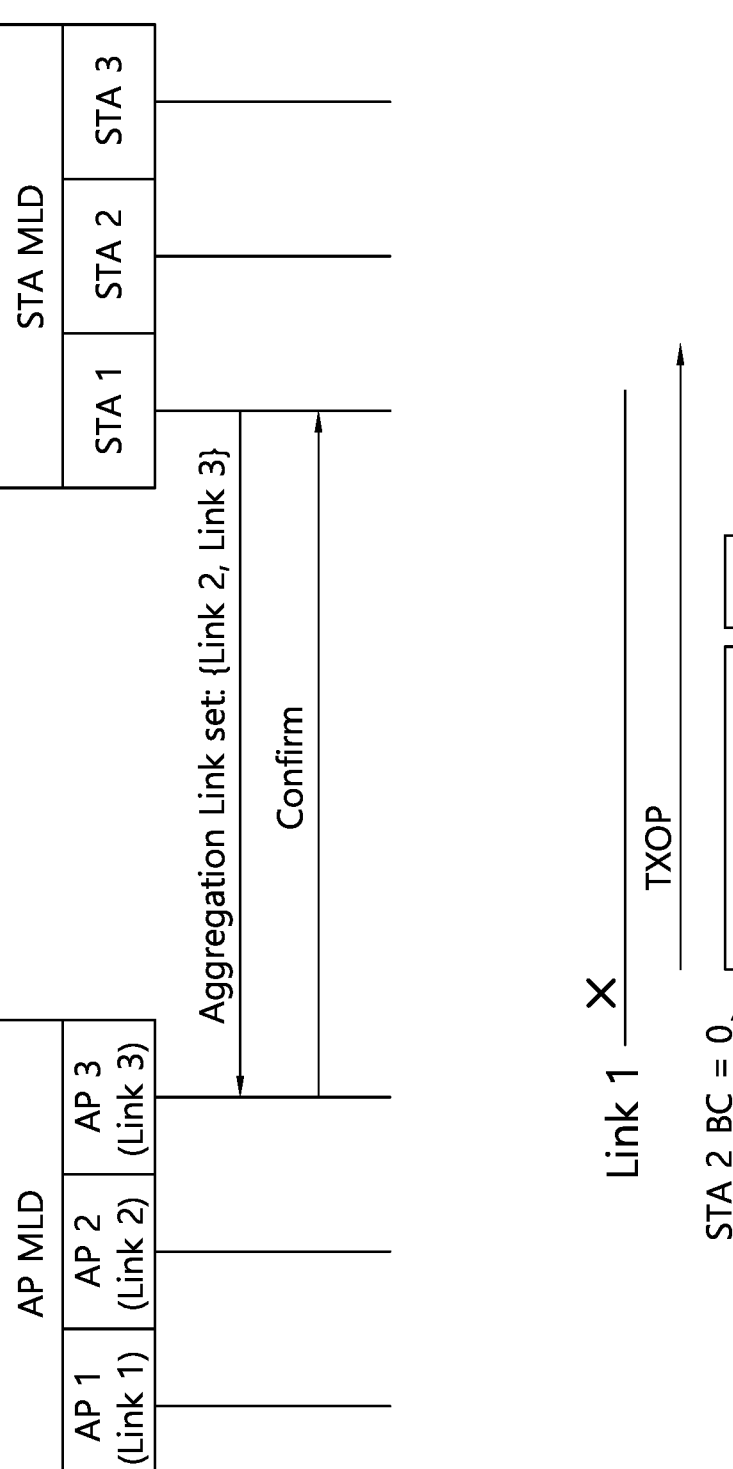

FIG. 44 is a diagram illustrating an embodiment of a multi-link aggregation method.

Referring to FIG. 44, the STA MLD may request the Link 2 and the Link 3 as an aggregation link, and the AP may confirm the request. Therefore, when BC=0 in link 2, since the Link 3 is considered to be IDLE for a predetermined period (e.g., PIFS, AIFS, one slot, etc.) before that, the STA MLD performs transmission only on the Link 2 and the Link 3. Since the Link 1 is not included in the aggregation link set, the channel status is not checked.

3) Examples of increasing the contention window (CW) after aggregation

As in Link 3 in FIG. 44, in case of aggregated when BC=0, transmission is performed while ignoring BC. Accordingly, the Link 3 may have priority compared to other STAs. Therefore, compensation is required for other STAs that have suffered losses.

A BC in the link to be aggregated (BC=0, but the link to be aggregated) may be maintained or selected as a new value when restarting back-off after TXOP. In this case, a method to compensate other STAs is to draw BC again immediately after TXOP or to increase the BC value by expanding the range when selecting the BC again later. That is, there is a method of increasing the CW. The method may vary depending on whether or not the Aggregation transmission is successful.

If the transmission is successful, the CW[AC] value is set to CWmin[AC], so the CW[AC] before aggregation transmission can be maintained or can be set to a value twice as larger as CWmin[AC].

If transmission fails, the CW[AC] value is doubled, so it can be maintained or set to a value twice as large as this value. If it is set to a value twice as large, more fairness can be given to other STAs, but the access delay becomes longer by that much.

43

Figure 45:
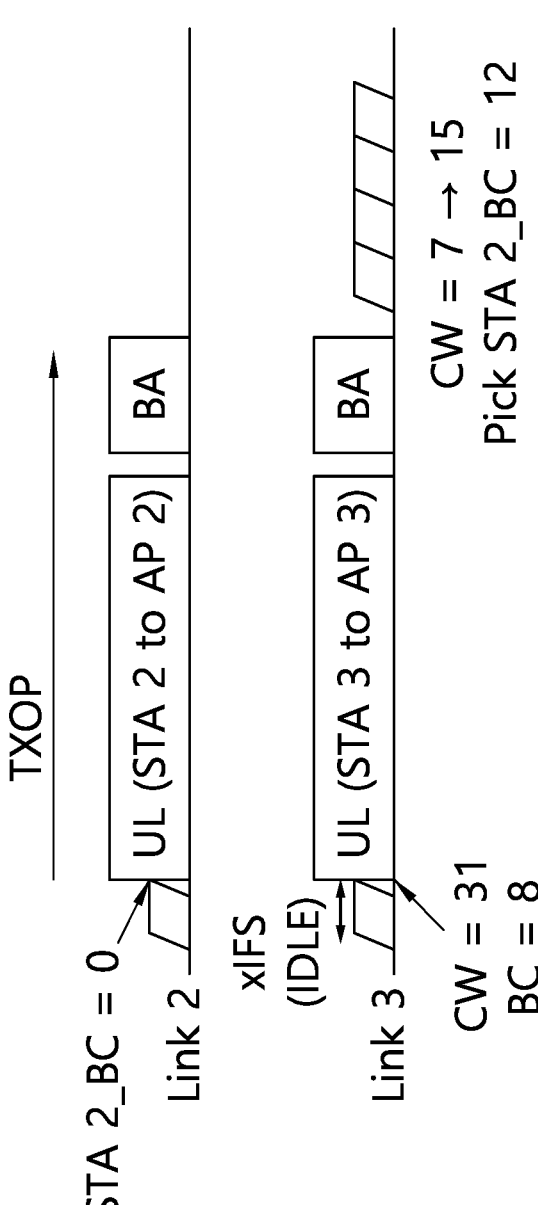

FIG. 45 is a diagram illustrating an embodiment of a multi-link aggregation method.

Referring to FIG. 45, the STA MLD may perform successful transmission by aggregating the Link 2 and the Link 3. Since Link 3 transmission was successful, the CW decreased from 31 to the minimum value of 7. However, in order to reduce the influence on other STAs because the aggregation is performed in the state of BC=8, the STA 2 increases the CW to 15, and re-draws BC within this range.

Examples of Determining Aggregation Link Using the ML RTS/CTS

When the ML RTS is transmitted by aggregating multiple links, the ML CTS may be transmitted by selecting only a link that allows aggregation. That is, in this method, the MLD transmitting the ML CTS may have the right to select an aggregation link, and the corresponding MLD may consider channel conditions from its own point of view.

Figure 46:
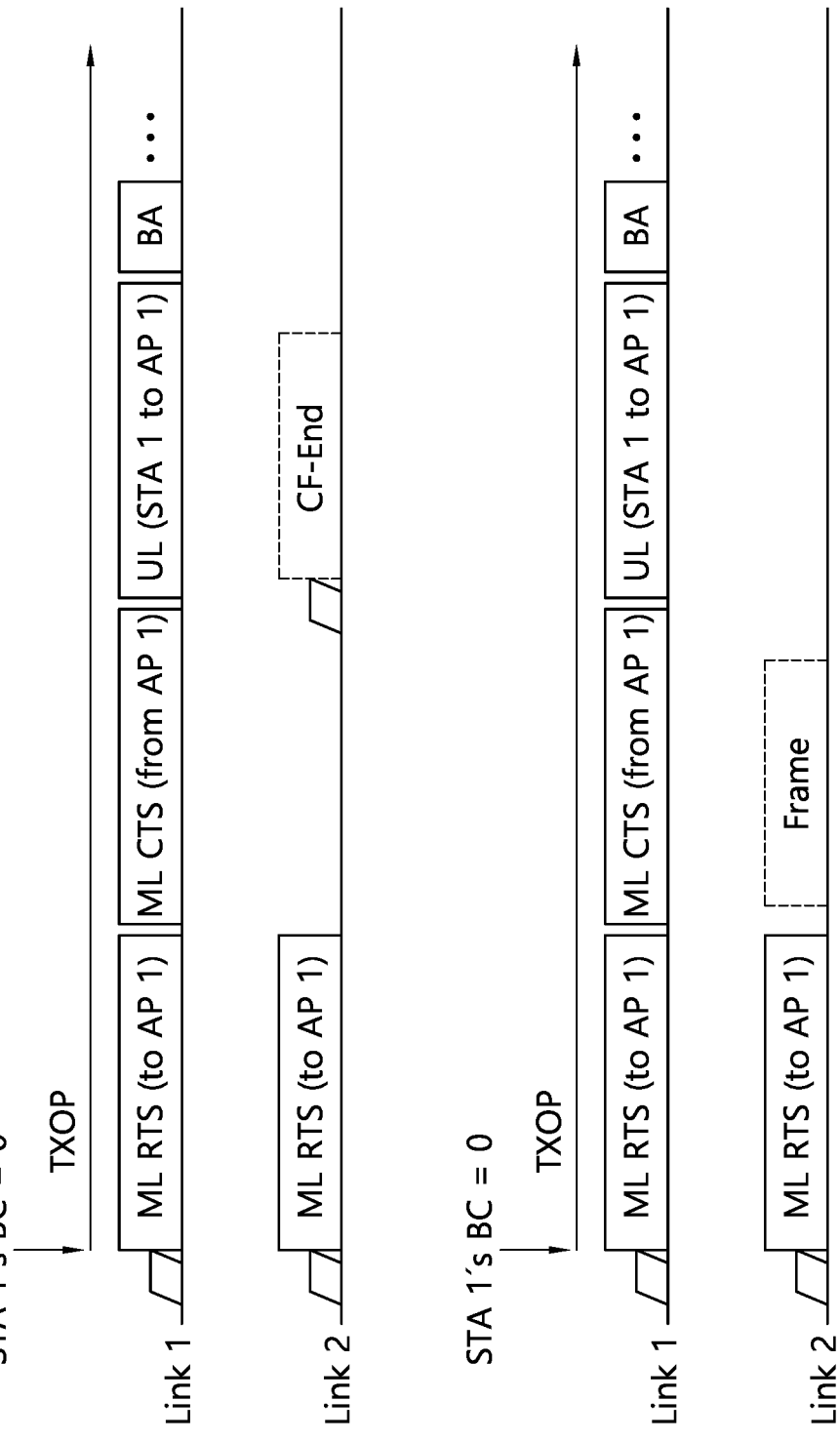

FIG. 46 is a diagram illustrating an embodiment of a multilink aggregation method.

Referring to FIG. 46, the STA MLD may aggregate the Link 1 and the Link 2 to transmit the ML RTS. The AP MLD does not transmit the ML CTS to the Link 2 so as not to allow aggregation in the link 2.

The upper portion of FIG. 46 indicates that data is no longer transmitted by transmitting a frame (e.g., CF-end) capable of removing the NAV because there are STAs that have set the NAV from the ML RTS.

As another example, in the lower portion of FIG. 46, instead of the ML CTS, a frame indicating that aggregation is not allowed is transmitted through this link to prevent UL transmission. This frame uses the ML CTS as it is, but may include contents not to be allowed, or may transmit another newly defined frame.

5) Examples of Limiting TXOP for Aggregation

In case of aggregation, there may be restrictions on TXOP.
A. Aggregation TXOP limit: Only when the TXOP limit is aggregated, this information may be set differently from the existing TXOP limit. For example, by setting the TXOP limit for aggregation to be smaller than the conventional TXOP limit, the channel can be occupied relatively short.

Figure 47:
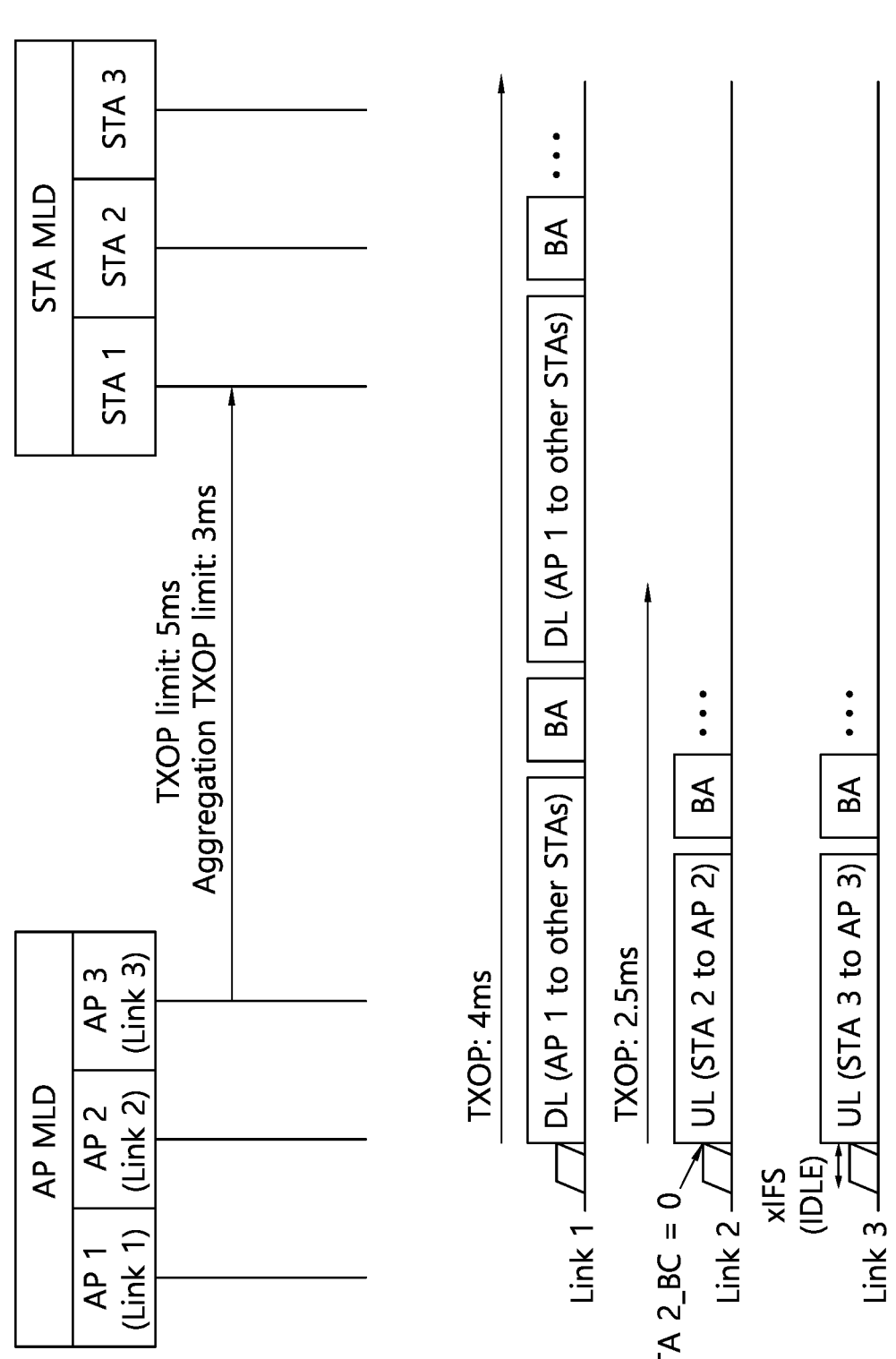

FIG. 47 is a diagram illustrating an embodiment of a multi-link aggregation method.

Referring to FIG. 47, the existing TXOP limit is 5 ms, and the Aggregation TXOP limit is set to 3 ms. Therefore, aggregation transmission using the Link 2 and the Link 3 did not exceed 3 ms and the TXOP was set to 2.5 ms, but the TXOP was set to 4 ms for existing link 1 transmission.
B. Limited number of Aggregation in TXOP: This is related to a limit on the number of times that can be aggregated in TXOP.

Figure 48:
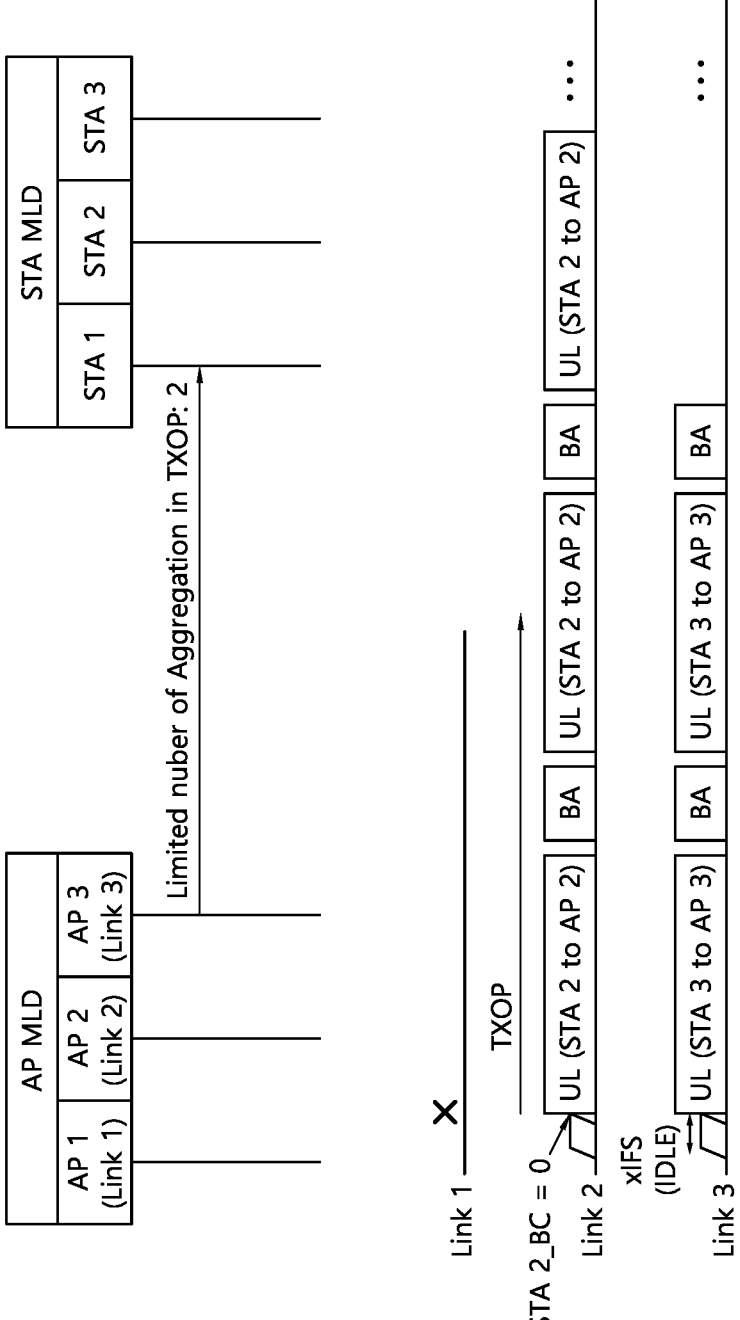

FIG. 48 is a diagram illustrating an embodiment of a multilink aggregation method.

Referring to FIG. 48, the number of transmissions that can be transmitted through maximum aggregation in the TXOP may be limited to two. Therefore, the STA MLD performs transmission based on aggregation up to two times, but only transmits over the Link 2 in the third transmission. Here, if aggregation is no longer possible for the Link 3, the TXOP for the Link 3 may be truncated through the CF-end.

5. Details of Aggregation Enhancement

Figure 49:
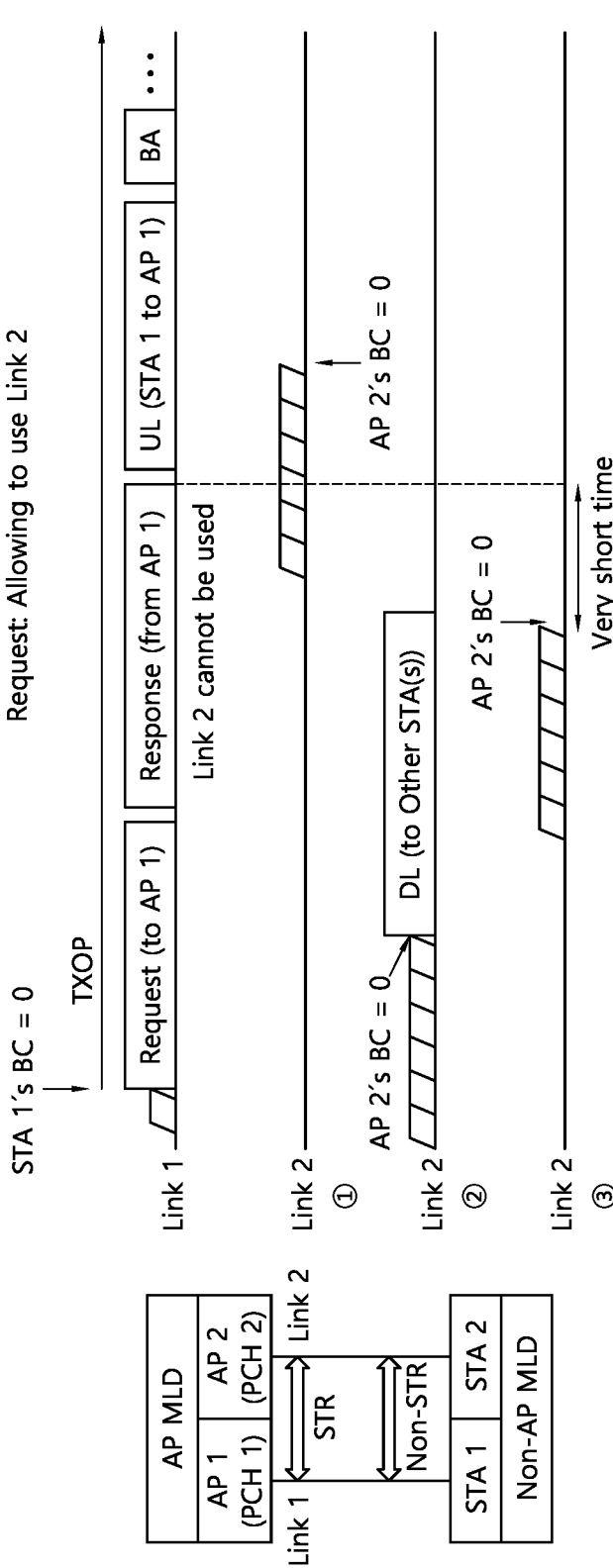

As shown in FIG. 34, it is necessary to consider various situations as shown in FIG. 49 for aggregation using independent back-off of the AP in each link.

49 is a diagram illustrating an embodiment of a multi-link aggregation method.

Referring to FIG. 49, a request can be considered as a request fame used for multiple links like the ML RTS in FIG. 34, and a response can be considered as a response frame for responding to this like the ML CTS.

The Request may request the use of the Link 2, the Response may respond to the use of the Link 2, and if available, the AP 2 must obtain the TXOP so that the STA 2 can transmit a frame. However, there are cases in which it is difficult for the AP 2 to obtain the TXOP due to several circumstances. That is, here, it refers to a case where the AP 2 responds to the STA 1 indicating that it is difficult to use the link 2 because it is difficult to obtain the TXOP after the STA 1's request and before the next STA's frame transmission. For example, the above cases may include (1) a case where the backoff is not finished, (2) a case where TX is performed to another STA, (3) a case where only a very short time remains for transmitting according to the ending frame of the Response frame of the Link 1.

For the case (3), the following method can be defined by pre-defining the time (herein, called "T_Rep") to set up a criterion. As an example, "T_Rep" may be a time that can include a minimum MAC header, a length of a QoS Null frame or an NDP frame, and the like.

Method #1: If this time is exceeded, the response frame can be transmitted; otherwise, the response frame is not transmitted.

Here, the response frame may be a QoS data frame including data, but if it is not enough to insert data, a QoS Null frame, NDP frame, etc. may be transmitted. Also, padding to the above frame is possible if there is enough time left.

Method #2: If "T_Rep" is not exceeded, another STA recognizes the channel as BUSY through an arbitrary signal (or sequence).

Here, the response frame type can be newly defined. For example, a response frame type that includes available information for all links and a response frame type that does not include information on links due to a limited frame length can be defined.

In order to solve the above case, it is not necessary to make a request in the first frame exchange. That is, in the next frame exchange under TXOP, the STA may request (trigger) the use of another link again.

The request method can use 1) the frame mentioned above, and 2) the control field of the MAC header (like the A-control field of 11ax). Based on the above methods, the following various embodiments can be implemented.

Figure 50:
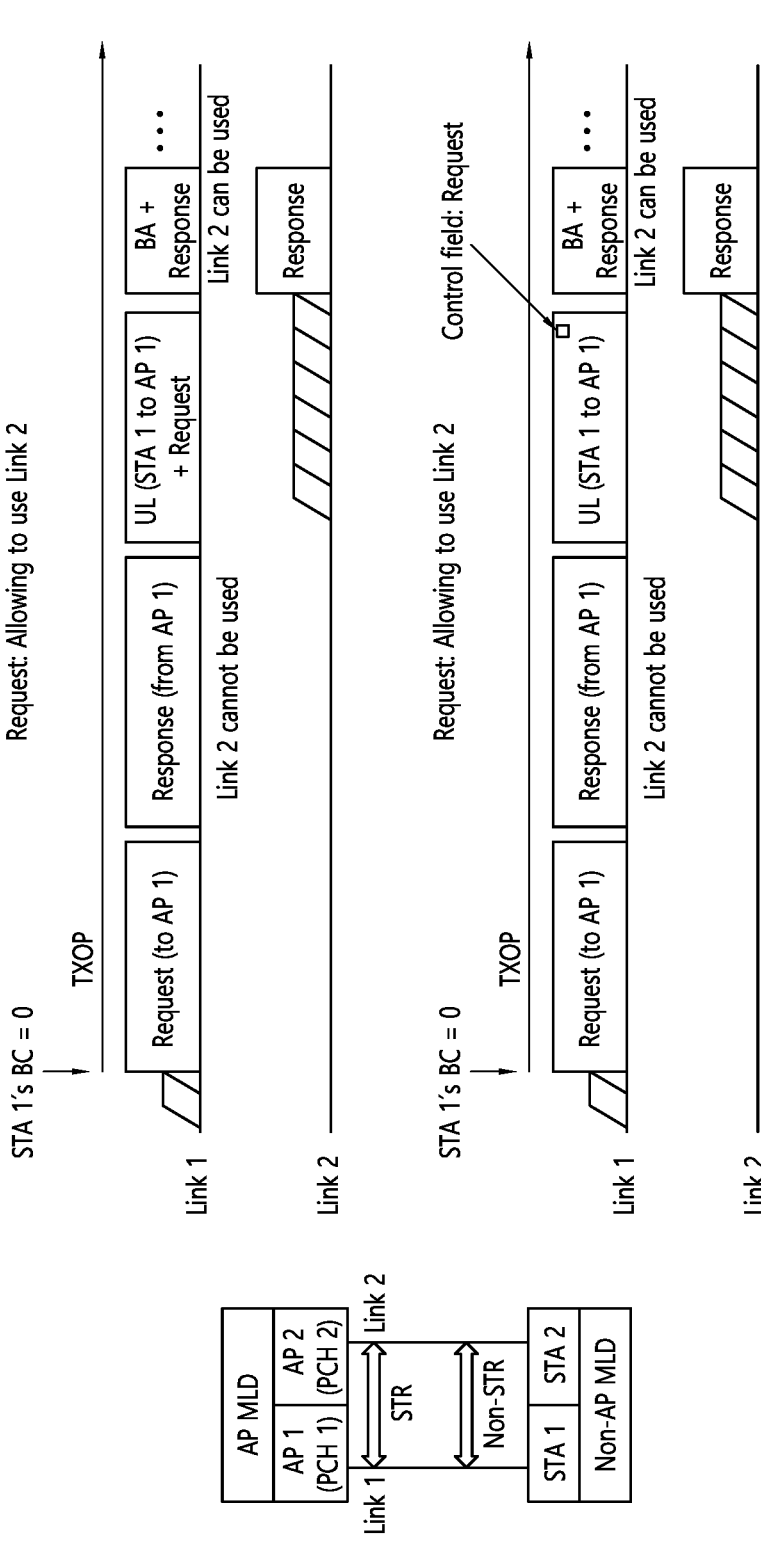

FIG. 50 is a diagram illustrating an embodiment of a multi-link aggregation method.

FIG. 50 is an example in which the non-AP MLD re-requests because the Link 2 is not available in the first response. In the Link 1, since the TXOP is obtained, the request frame is transmitted along with the UL transmission, or the request information is included in the MAC header. Therefore, the AP MLD responds that the Link 2 is available through the Link 1, and responds through the Link 2 for transmission to the non-AP MLD.

Figure 51:
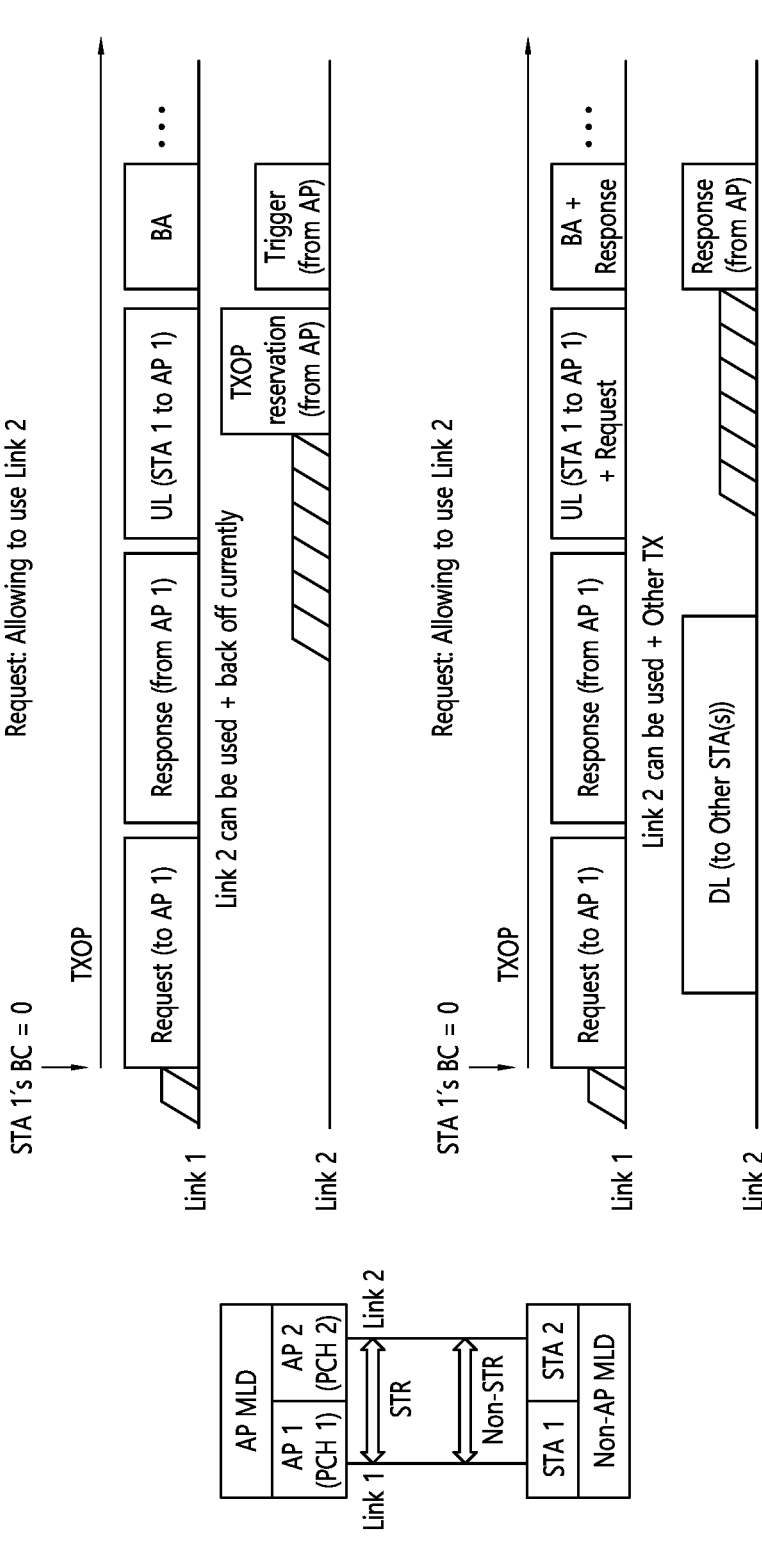

FIG. 51 is a diagram illustrating an embodiment of a multilink aggregation method.

Referring to FIG. 51, the link 2 may be used in the first response, but it may not be possible to directly respond to the STA 2 in the Link 2 unlike the Link 1. In this case, the AP may inform information such as during back-off as in the first case or while performing another TX as in the second case.

Case 1): If back-off is in progress, a frame to reserve the TXOP is transmitted so that third parties can configure a NAV in line with UL transmission of the STA 1 so that the STA 2 can transmit a frame on the Link 2. Since the STA 2 cannot recognize this frame, when responding to the STA 1, the AP MLD transmits a response/trigger frame on the Link 2 so that the STA 2 can transmit the frame on the Link 2. Here, the AP 1 does not necessarily inform the fact of back-off transmission of the AP 2. For example, if the STA 2 shares information that the NAV is not configured from the AP 2 to the STA 1, it can be implicitly known that the AP 2 is performing back-off.

Case 2): In the case of Other TX, since the AP 2 is currently transmitting to another STA, the STA 1 may request again in transmission of the following frames. Here, the AP 1 may inform time information related to the TXOP of the AP 2 for the re-request time. Here, if the STA 1 is aware of the transmission of the AP 2 on the Link 2, it is not necessarily necessary to inform this information. Also, before that, the STA 1 may not make a request to use the Link 2 itself because the Link 2 cannot be used at that time. That is, if it is recognized, it holds the TXOP and transmits a frame on the Link 1 without a request, and because it knows the TXOP information over the Link 2, it can request the use of the Link 2 in the TXOP accordingly.

Figure 52:
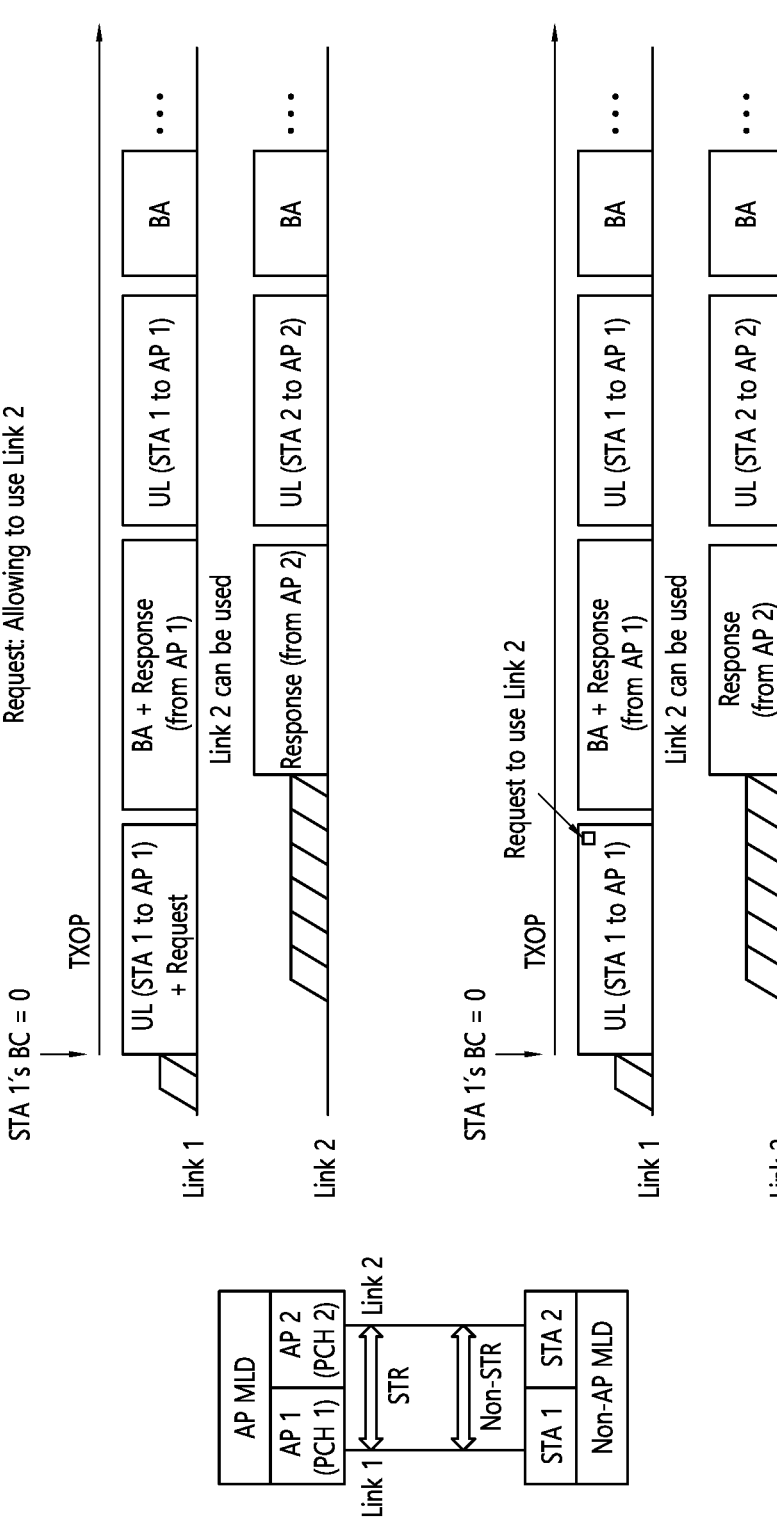

FIG. 52 is a diagram illustrating an embodiment of a multilink aggregation method.

Referring to FIG. 52, when the TXOP is obtained in the Link 1, use of the Link 2 may be requested at the same time as data transmission. The first is an example of transmitting a request frame together, and the second is an example of transmitting with request information included in the MAC header. Therefore, in response to this, the AP MLD transmits a BA for data and a response to the request.

TXOP Considerations

In the above examples, since the TXOP starts from the AP's response in the Link 2, the AP 2 becomes a TXOP holder of the Link 2. Here, since an entity that transmits data may be the STA 2, 1) a method of determining a TXOP and 2) a method of truncating the TXOP may be considered.

1) A method of determining by the AP 2 an expected TXOP of the STA 2

The AP 2 becomes a TXOP holder, but the AP 2 needs to know the TXOP desired by the STA 2 because the AP 2 is actually helping the STA 2 for UL transmission. Therefore, there may be a method as follows, but the present specification is not limited thereto.

1-1) Explicit method

The STA 1 indicates a desired TXOP for the STA 2 when transmitting a request.

1-2) Implicit method

The AP 2 holds the TXOP in the Link 1 according to the TXOP end time held/maintained by the STA 1.

Figure 53:
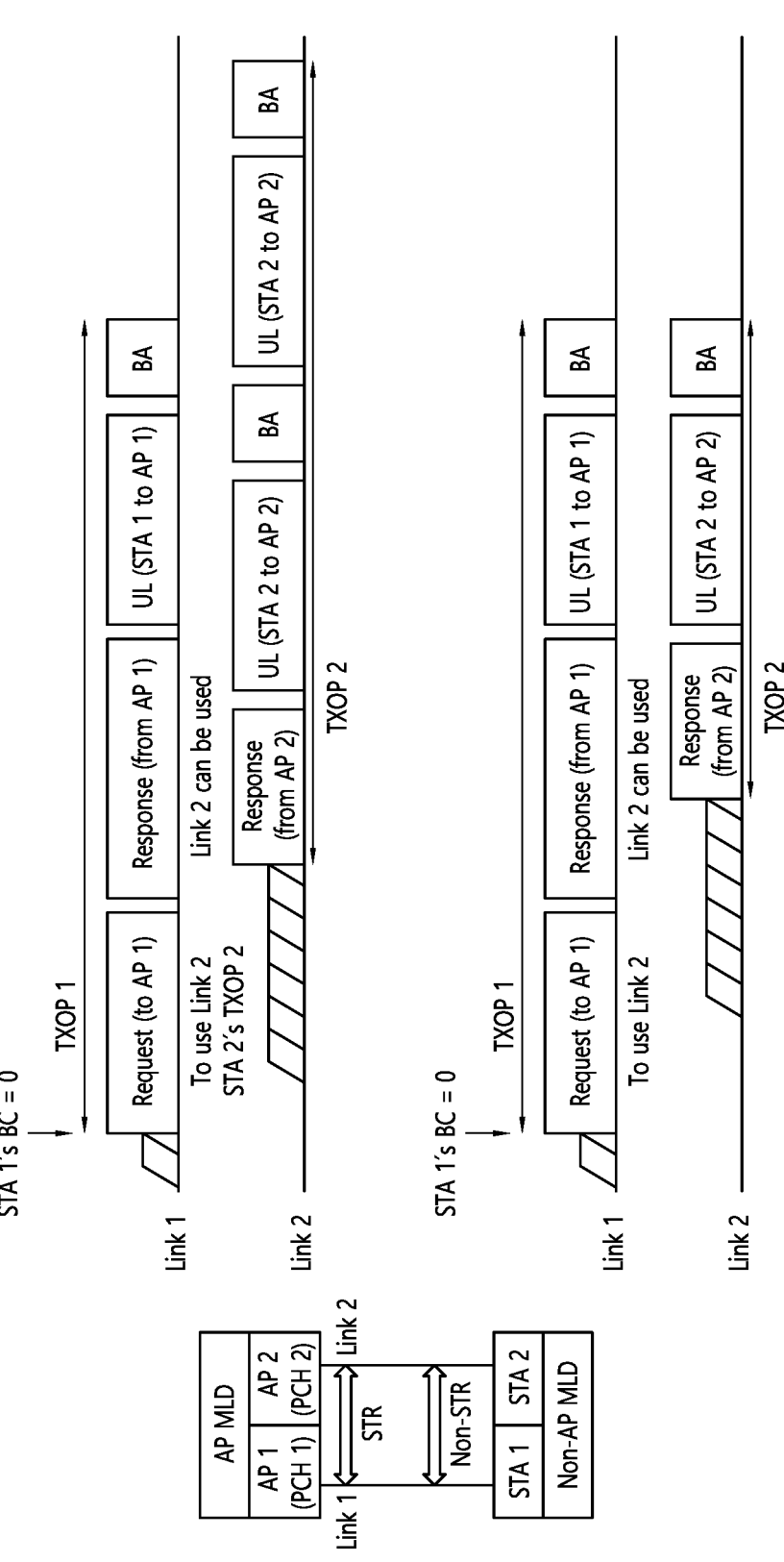

FIG. 53 is a diagram illustrating an embodiment of a multi-link aggregation method.

Referring to FIG. 53, the above embodiment is an explicit method for indicating the TXOP, and the following embodiment is an implicit method for indicating the TXOP.

In the upper side (explicit method), the STA 1 requests the TXOP 2 desired by the STA 2 from the AP MLD. In accordance with this, the AP 2 sets the TXOP 2 to respond in the Link 2.

In the lower side (Implicit method), the AP 2 recognizes the TXOP 1 of the STA 1, and sets the TXOP 2 at the end of the TXOP 1 to respond.

2) A method of truncating the TXOP by the STA 2

Even if the STA 2 explicitly requests and sets the desired TXOP, truncation may be performed if sufficient TXOP length remains. Therefore, there may be a method as follows, but the present specification is not limited thereto.

1) Examples of transmitting truncation directly by the STA 2

Figure 54:
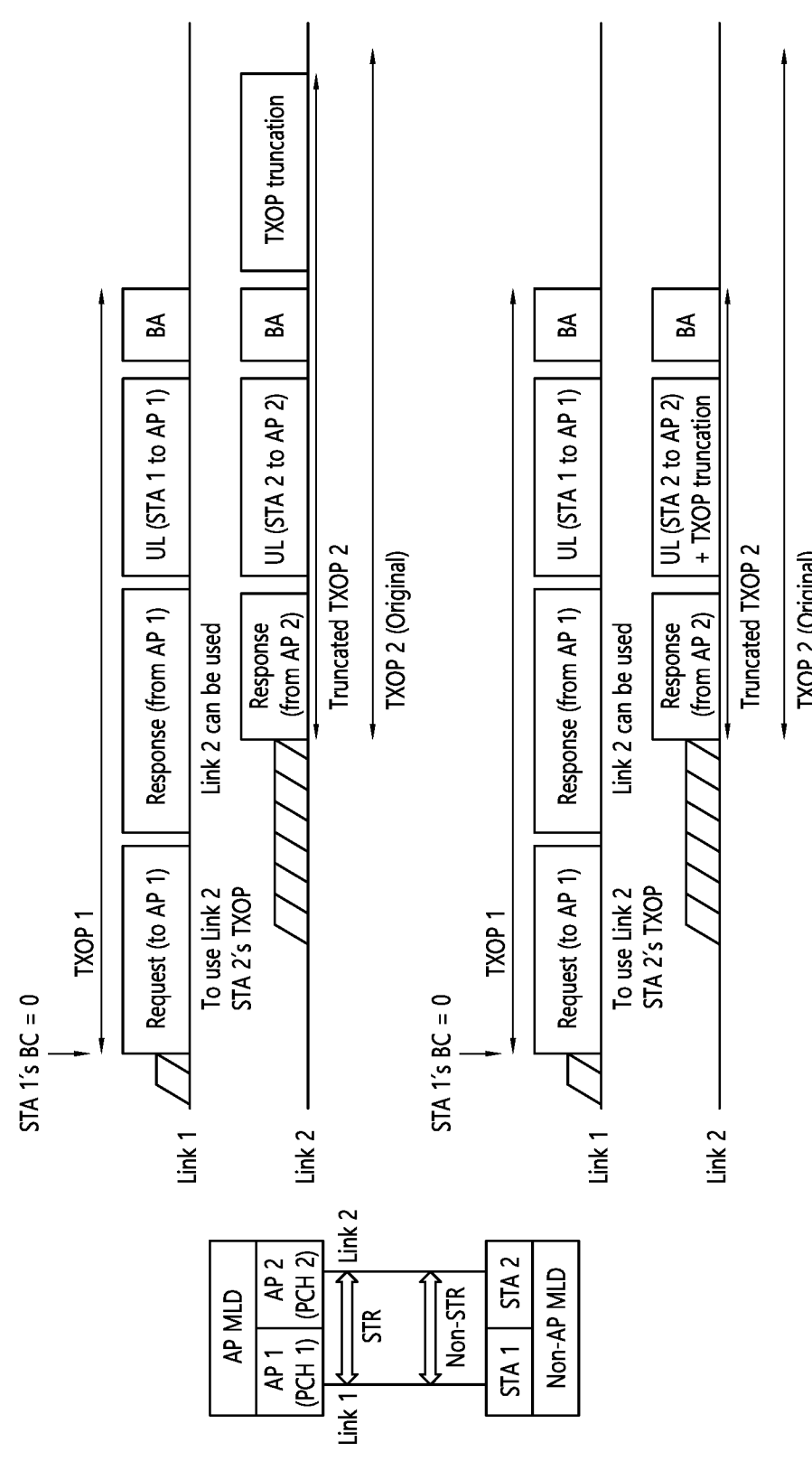

FIG. 54 is a diagram illustrating an embodiment of a multi-link aggregation method.

Referring to the upper embodiment of FIG. 54, the STA MLD may truncate the TXOP by transmitting a frame (e.g., CF-end) capable of TXOP truncation after transmitting a desired frame. However, since the TXOP holder is the AP 2, the STA 2, which is a TXOP responder transmitting this frame, needs to indicate this information. For example, it may indicate that "it is a TXOP responder, but it also truncates the TXOP by sending a CF-end". The information may be indicated, but a corresponding rule for Non-STR operation may be newly defined.

Referring to the lower embodiment of FIG. 54, the STA MLD may transmit TXOP truncation information when transmitting a UL frame. Here, this information may be transmitted together with the same frame as the CF-end, or may be transmitted together in the form of a field in the MAC header. This figure is an example of transmitting a frame together. The AP 2 responds to this and reduces the TXOP according to the information and operates.

Consideration of Third Parties from TXOP Holders

In the above example, the TXOP holder does not transmit any TXOP truncation information. In this case, the TXOP responder and the hidden STA may maintain an unnecessary NAV because they did not receive such information from the TXOP holder. Therefore, a method of announcing the TXOP truncation information of the TXOP responder in the TXOP holder may be additionally required as if the TXOP holder previously transmitted the CF-end frame.

In summary, when the TXOP truncation information is received from the STA 2, the TXOP holder announces the TXOP truncation information using it.

Figure 55:
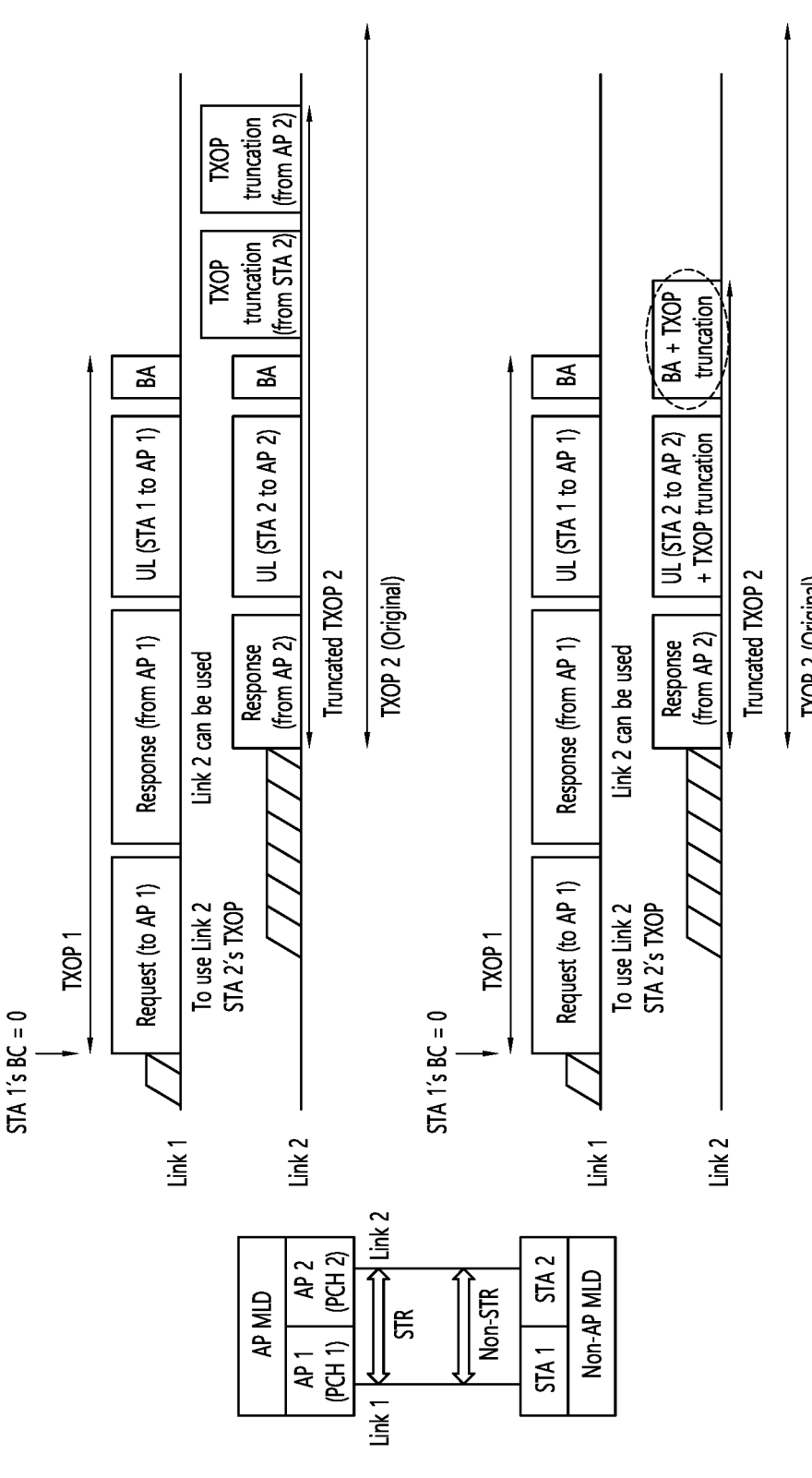

FIG. 55 is a diagram illustrating an embodiment of a multi-link aggregation method.

Referring to the upper embodiment of FIG. 55, the STA 2, which is a TXOP responder, may first transmit the TXOP truncation information, and then the AP 2 may transmit the corresponding information. That is, the AP 2 first receives corresponding TXOP truncation information from the STA 2, and the AP 2 announces this information again.

Referring to the lower embodiment of FIG. 55, the STA 2, which is a TXOP responder, transmits the TXOP truncation information together when transmitting the last UL frame, and after receiving this information, the AP 2 announces the information simultaneously with the response to this frame. Here, the TXOP truncation information of the STA 2 may be combined with a UL frame in the form of a frame, or information may be transmitted in the form of a field in the MAC header. In addition, the TXOP truncation information of the AP 2 may also be combined with a response frame and a frame in the form of a SIFS interval, may be transmitted separately or may be included in the MAC header of the response.

Figure 56:
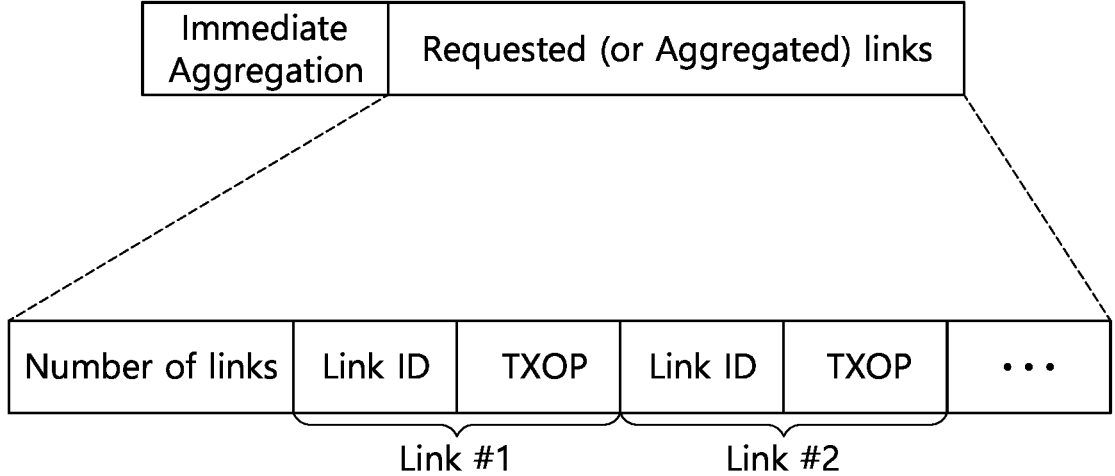
FIG. 56 is a diagram illustrating an embodiment of an aggregation control field.

The contents that can be included in the above-mentioned Request frame (e.g., ML-RTS) and Response frame (e.g., ML-CTS) may be organized into an Aggregation Control field as shown in FIG. 56. As mentioned above, this field may be included as a body of a control frame such as the RTS/CTS or as a control field of a QoS Data/Null frame.

FIG. 56 is a diagram illustrating an embodiment of an aggregation control field.

The Immediate Aggregation subfield is a subfield for requesting immediate aggregation.

Even if the requesting STA requests immediate aggregation, the responding STA does not necessarily perform immediate aggregation.

Requested (or Aggregated) links: In the Request frame, the requested links are included, and in the Response frame, the response includes the aggregated links being aggregated. Since the requested links cannot always be aggregated according to channel conditions or EDCA parameters, the number of links between requested links and aggregated links may be different. Basically, as many tuples as the number of links, there can be as many tuples as the link ID to be requested (to be aggregated) and the desired (taken) TXOP from the link. Even if the requesting STA requests a desired TXOP in another link, the responding STA may change the requested TXOP length according to channel conditions.

In addition to the signaling method of FIG. 56, the requested (or aggregated) links may be requested using as many bitmaps as the number of setup links, and then the TXOP may be signaled in the order of link IDs.

Figure 57:
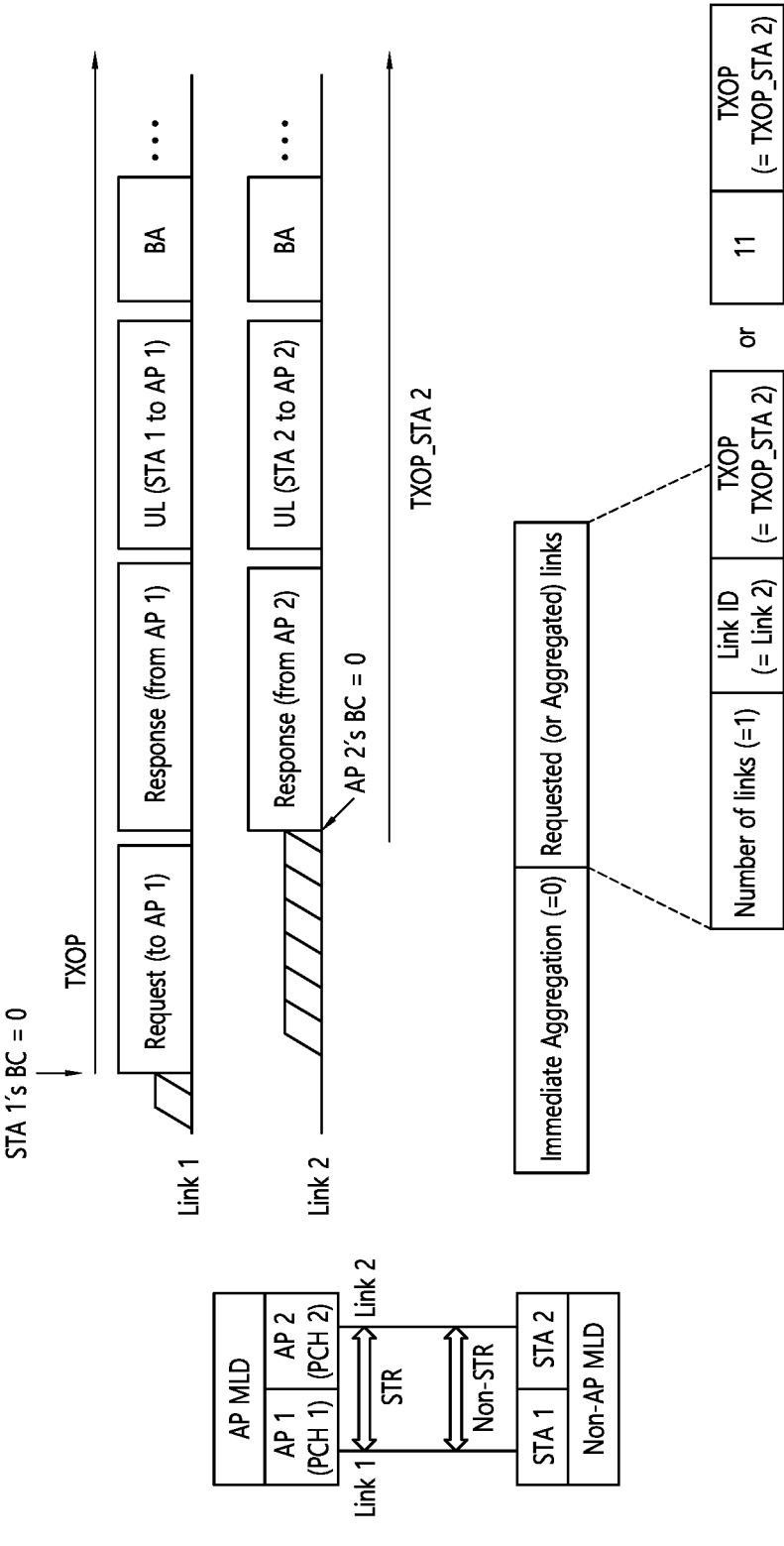
FIG. 57 to FIG. 60 are diagrams illustrating an embodiment of a multi-link aggregation method.

FIG. 57 is a diagram illustrating an embodiment of a multi-link aggregation method.

Referring to FIG. 57, the STA MLD may not request immediate aggregation. In this example, the AP MLD operates as STR, the non-AP MLD operates as non-STR, and the STA 1 requests aggregation for the Link 2. Since immediate aggregation is not required, the STA 1 sets immediate aggregation=0, and requests an ID of the Link 2 and a desired TXOP (i.e., TXOP_STA 2). The AP 1 is capable of aggregation in the Link 2, and if it accepts the requested TXOP, the same values are indicated in the response frame. On the other hand, as another signaling method of Requested links, there are two total setup links as in the example, and since aggregation is requested/responded using the Link 1 and the Link 2, the TXOP (i.e., TXOP_STA2) for bitmap 11 and the Link 2 may be indicated.

Figure 58:
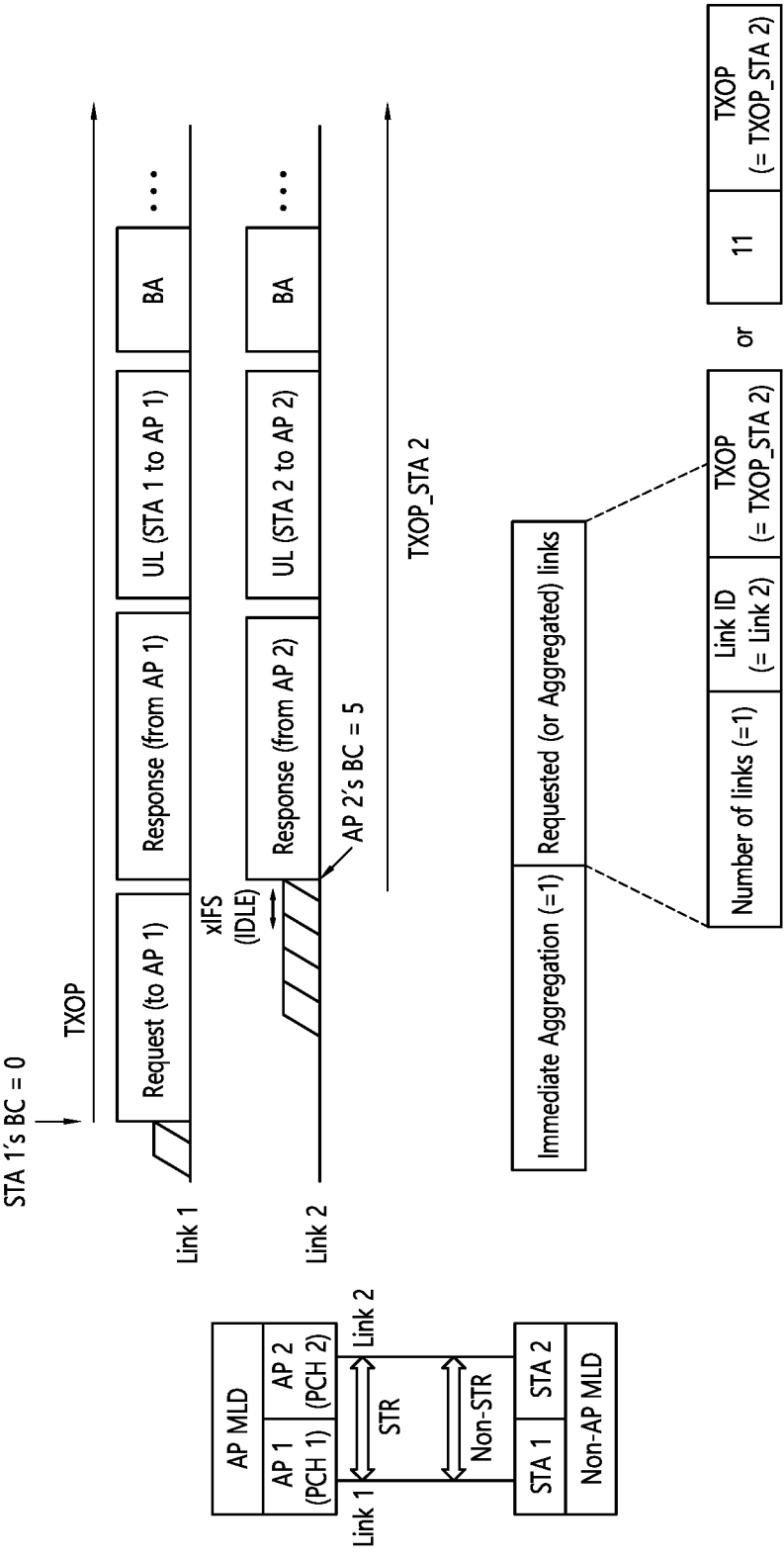

FIG. 58 is a diagram illustrating an embodiment of a multi-link aggregation method.

Referring to FIG. 58, the STA MLD may request immediate aggregation. In this example, the AP MLD operates as STR, the non-AP MLD operates as non-STR, and the STA 1 requests immediate aggregation for the Link 2. Therefore, immediate aggregation=1 is set, and the ID of the link 2 and the desired TXOP (i.e., TXOP_STA 2) are requested. The AP 1 is capable of immediate aggregation in the Link 2, and if it accepts the requested TXOP, the same values are indicated in the response frame. Since the AP MLD performs immediate aggregation, even if BC=0 in the Link 2, as described in this disclosure, if it is considered IDLE for a predetermined period (e.g., PIFS, AIFS, one slot, etc.) before that, it aggregates with the Link 1 and transmits the frame.

Figure 59:
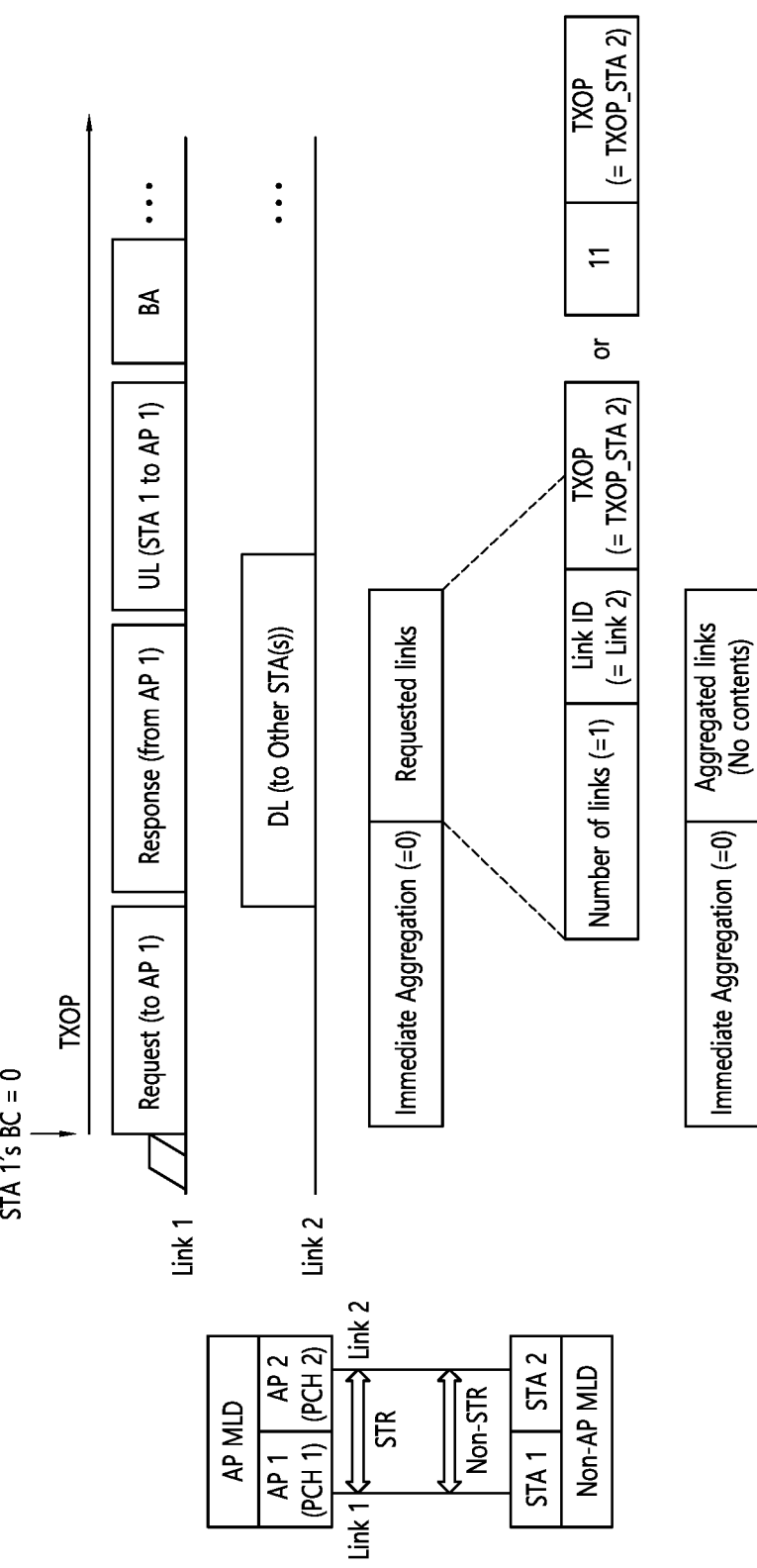

FIG. 59 is a diagram illustrating an embodiment of a multi-link aggregation method.

Referring to FIG. 59, the STA MLD may request immediate aggregation. The AP MLD operates as STR, the non-AP MLD operates as non-STR, and the STA 1 requests aggregation rather than immediate aggregation for the Link 2. Therefore, immediate aggregation=1 is set, and the ID of the Link 2 and the desired TXOP (i.e., TXOP_STA 2) are requested. However, since the AP 2 is already transmitting a frame to another STA in the Link 2, it is not possible to send a response frame. Therefore, the AP 1 does not separately indicate links because there are no aggregated links.

Failure Considerations

In the above methods/examples, failure cases are not considered. If the request frame fails, back-off will be performed again. However, a different situation may occur with respect to the response frame. That is, there may be a case where the response frame failed in the link that sent the request, but succeeded in the Link 2. The action for this situation is as follows.

1) In the Link 1, restart back-off as before or use PIFS recovery, and in the Link 2, frame exchange proceeds as is.

In the Link 2, since it is the TXOP of the AP, not the STA, the STA 2 recognizes that it is the response of the AP 2, and proceeds with the frame exchange in the Link 2 as it is. However, since the response of the Link 2 may not contain enough information because of the frame length, that is, only because the TXOP holder of the response knows that the AP 2 is, an additional exception rule may be needed. For example, even if the STA 1 fails in the Link 1, which has obtained the TXOP, when it finds out that the AP 2, which has obtained TXOP in the Link 2, transmits, frame exchange is performed on this link.

It is more efficient than the second method, but the rule for the TXOP holder/responder should be set.

2) The UL frame is not transmitted in all links except the Link 1.

That is, the UL frame is not transmitted in all other links because failure has occurred in relation to the STA that has caught the TXOP in the Link 1.

Figure 60:
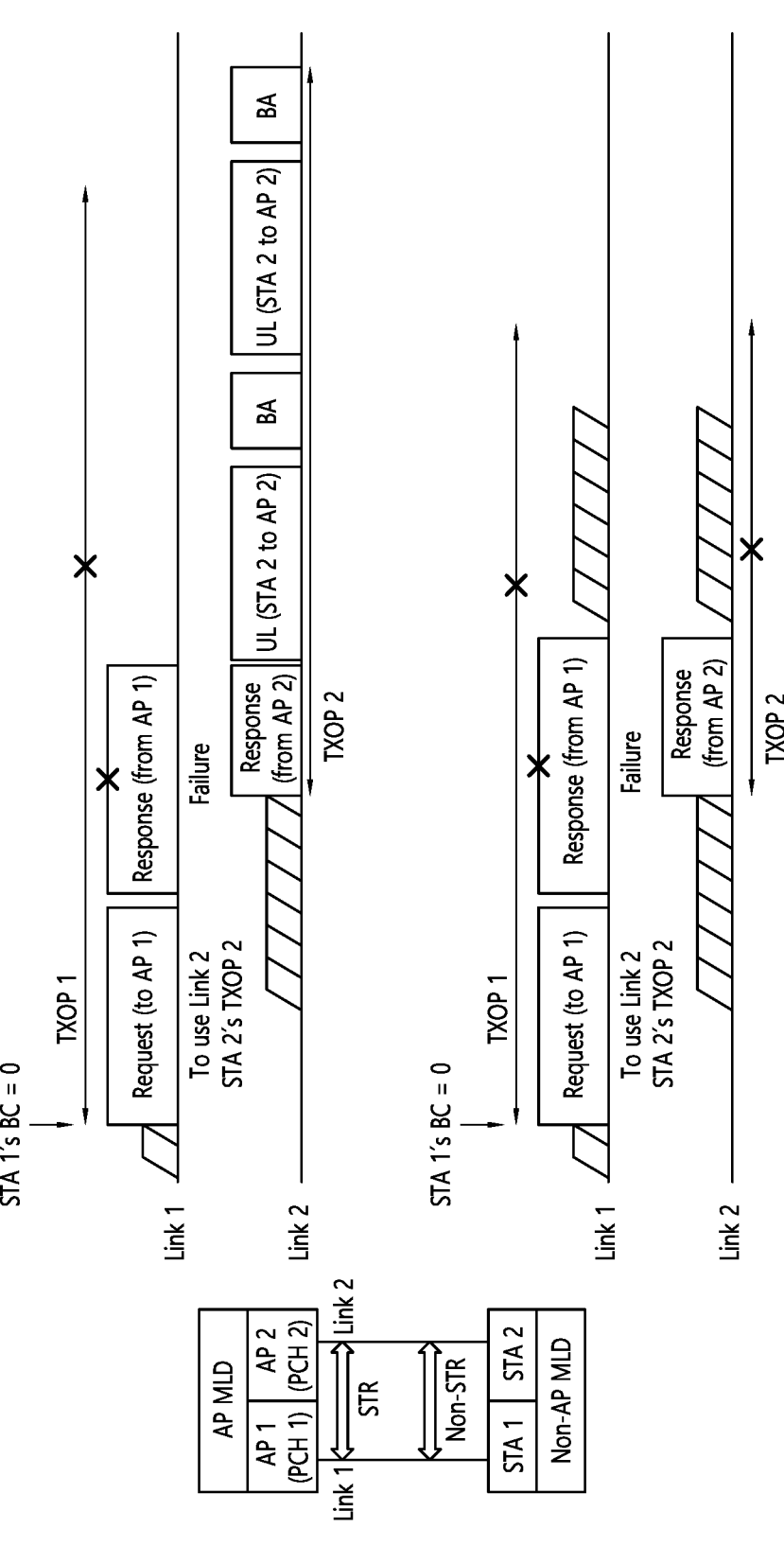

FIG. 60 is a diagram illustrating an embodiment of a multi-link aggregation method.

The upper embodiment of FIG. 60 is related to the example 1), and even if the Link 1 fails, when a response is received from the Link 2, a UL frame is transmitted.

The lower embodiment of FIG. 60 is related to the example 2), and if the Link 1 fails, UL is not transmitted in all links.

Figure 61:
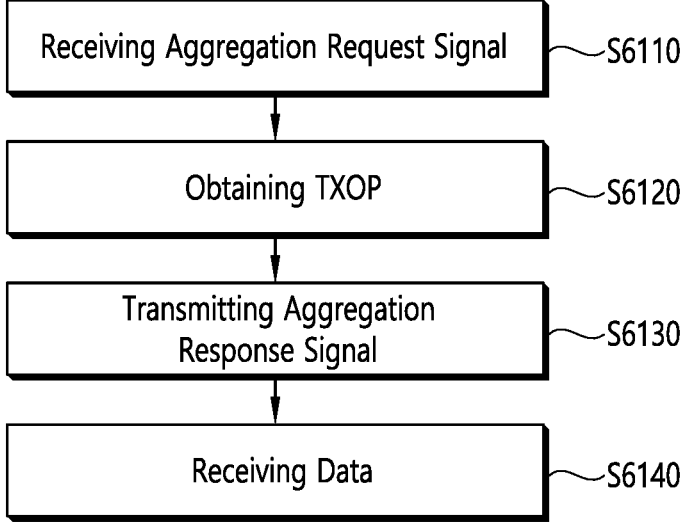
FIG. 61 is a diagram illustrating an embodiment of an AP MLD operation method.

FIG. 61 is a diagram illustrating an embodiment of an AP MLD operation method.

Referring to FIG. 61, the AP MLD may receive an aggregation request signal (S6110). For example, the AP MLD may receive a multi-link aggregation request signal from a non-simultaneous transmit and receive (Non-STR) station (STA) MLD through a first link. For example, the multilink aggregation request signal may include first information related to a second link for which aggregation is requested and second information related to a transmission opportunity (TXOP) to be established in the second link.

For example, the second information may be information related to the length of the TXOP determined by the non-STR STA MLD.

For example, the first information may be the following information.

Set of Selected links: this indicates the link to be aggregated

Ex 1) List Number of Link+Link ID

Ex 2) Examples of using Link bitmap: this is set to 1 for a selected link, is set to 0 for an unselected link, and is set to 11 for the above example (Link 1, Link 2)

For example, the second information may be the following information.

TXOP Considerations

In the above examples, since the TXOP starts from the AP's response in the Link 2, the AP 2 becomes a TXOP holder of the Link 2. Here, since an entity that transmits data may be the STA 2, 1) a method of determining a TXOP and 2) a method of truncating the TXOP may be considered.

1) A method of determining by the AP 2 an expected TXOP of the STA 2

The AP 2 becomes a TXOP holder, but the AP 2 needs to know the TXOP desired by the STA 2 because the AP 2 is actually helping the STA 2 for UL transmission. Therefore, there may be a method as follows, but the present specification is not limited thereto.

1-1) Explicit method

The STA 1 indicates a desired TXOP for the STA 2 when transmitting a request.

1-2) Implicit method

The AP 2 holds the TXOP in the Link 1 according to the TXOP end time held/maintained by the STA 1.

In the explicit method, the STA 1 the requests the TXOP 2 desired by the STA 2 from the AP MLD. In accordance with this, the AP 2 sets the TXOP 2 to respond in the Link 2.

In the implicit method, the AP 2 recognizes the TXOP 1 of the STA 1, sets the TXOP 2 at the end of the TXOP 1, and responds.

The AP MLD may obtain a TXOP (S6120). For example, the AP MLD may obtain the TXOP based on the second information in the second link. For example, the AP MLD may obtain the TXOP regardless of the remaining BC, which is a backoff count (BC) remaining in the second link.

Although the STA MLD intends to transmit data, since the STA MLD operates as a non-STR, it is difficult to perform channel access on another link when the UL operation is performed on one link among a plurality of links. Accordingly, the AP MLD may obtain the TXOP instead of the STA MLD based on the aggregation request signal received from the non-STR STA MLD.

The AP MLD may transmit an aggregation response signal (S6130). For example, the AP MLD may transmit a multilink first aggregation response signal through the first link and a second aggregation response signal through the second link to the non-STR STA MLD. For example, the end time of the first aggregation response signal and the second aggregation response signal may be the same.

That is, the AP MLD may obtain a TXOP in the second link and transmit a second aggregation response signal through the second link. Since the first link has already obtained the TXOP and transmission/reception is in progress, the transmission of the first aggregation response signal may be performed directly from reception of the aggregation request signal. However, the second aggregation response signal may not be transmitted simultaneously with the first aggregation response signal because there is a time required to obtain the TXOP in the second link. However, the end time of the first aggregation response signal and the second aggregation response signal may be the same.

The AP MLD may receive data (S6140). For example, the AP MLD may receive first data in the first link and second data in the second link from the non-STR STA MLD.

Since TXOP can be obtained even if BC is not 0 in the link on which the aggregation is performed, a fairness problem may occur, and various methods may be considered to solve the problem.

For example, in the second link, the BC initially set in channel access operation performed by the AP MLD after the TXOP is finished may be determined as the sum of the BC selected within a contention window (CW) and the remaining BC.

For example, the BC initially set in the channel access operation performed by the AP MLD after the TXOP in the second link can be determined as the sum of the selected BC and the remaining BC within twice the minimum contention window (CW).

For example, when the previous TXOP is obtained in a state in which BC remains, multilink aggregation is not performed during the next N transmissions, but N may be an integer of 1 or more.

For both DL/UL cases, when Backoff Count (BC)=0 in one link, if the other link (whose BC may be non-zero) has been IDLE for a certain period (e.g., PIFS, AIFS, one slot, etc.) before that, a frame can be transmitted by aggregating the two links. The IDLE of one slot may mean that a back-off count is decreased because it is IDLE during one slot. This can be applied even when the slot boundaries of two links do not match. That is, for the case in which AIFS sensing (described below) is not applied, since the channel is IDLE in the previous slot, even if the moment BC=0 is in the middle of the slot, aggregation is possible if it is IDLE during the previous one slot length duration (or time point when BC=0 from the previous slot boundary). However, if the efficiency is reduced and the rule is simply applied in this case, aggregation may not be performed.

Examples Related to AIFS Sensing or EIFS Sensing in Link(s) where BC is Non-Zero In this case, in AIFS or EIFS (here, the EIFS can be the interval EIFS−DIFS+AIFSN[AC]×aSlotTime+aSIFSTime−aRxTxTurnaroundTime defined in the standard specification), the operation may vary depending on a time point in which BC=0 (in a link where BC=0) and a certain duration for determining IDLE.

1) In order to simply reduce the complexity of the rule, the link may not be aggregated. It can be simply applied without applying any special constraint to the existing rule, but if the duration was IDLE, the transmission opportunity may be missed.

2) To increase efficiency, regardless of the AIFS, if it is idle for a certain duration (e.g., PIFS, AIFS, one slot, etc.) as in the above method, two links can be aggregated to transmit frames. Since this method does not take into account when BC=0 in the sensing duration and the channel medium may be BUSY before AIFS or EIFS, and thus there is a possibility that it will become BUSY depending on where BC=0.

3) order to increase efficiency, if it has been IDLE until BC=0 in the sensing duration, the two links can be aggregated to transmit the frame. This method can increase the efficiency in some cases compared to the method 2), but it is necessary to change the existing rule in which it should be IDLE during AIFSN[AC]×aSlotTime−aRxTxTurnaroundTime.

Examples Related to BC Control on Link(s) where BC is Non-Zero

Here, a BC of the other link may not be zero. In this case, the current BC is non-zero by may be ignored and transmission is allowed. Accordingly, fairness problems may arise for STAs operating in the corresponding link (hereinafter referred to as non-zero BC link). Therefore, it is necessary to control the current BC for fairness. The BC control method may have the following methods.

1) Examples of applying the rule for CW as it is, and controlling only BC

That is, the existing rule in which the CW is doubled when transmission succeeds and the CW goes to CWmin when transmission fails is maintained, and only the BC can be controlled.

When aggregation is performed in a non-zero state of BC, the currently remaining BC can be used during the next back-off operation.

FIG. 24 is a diagram illustrating an embodiment of the BC control method.

Referring to FIG. 24, the current remaining BC is 5, and the re-picked (or re-drawn) BC is 8 during the next back-off operation. The CW range does not change because the previous CW was a min value, and the final BC becomes 13 (=8+5).

1-1) In case of failure, at least twice the remaining BC can be added.

The remaining BC was ignored for transmission, and if transmission fails due to this, additional penalties may be required. Therefore, in case of failure, more penalties may be given by adding more than twice the remaining BC to the next re-picked (re-drawn) BC.

FIG. 25 is a diagram illustrating an embodiment of a BC control method.

Referring to FIG. 25, the current remaining BC is 5, and a re-picked/re-drawn BC can be 10 in the next back-off operation. The CW range is doubled due to the failure, and the remaining BC is doubled and will be added as a penalty for the failure. Therefore, the final BC becomes 20 (=10+ 5*2).

2) Examples of controlling the CW and re-picking a BC in the CW

In the existing wireless LAN, if packet transmission is successful, the CW is set to CWmin, and if transmission fails, the CW is increased as long as it does not exceed CWmax. Therefore, the BC control method may vary depending on success/failure. That is, the method can be different depending on which case is given more penalty. Basically, when aggregation is performed in a state where BC is not 0, the current remaining BC is used for the next back-off operation. That is, the BC can be re-picked/re-drawn during the next back-off operation, or after re-pick, the remaining BC can be added as in the '1) example'. In the following embodiment, only the case of adding BC after re-pick is shown.

2-1) In case of success, the CW does not go to CWmin (e.g., maintaining the existing value, ½ decrease, or 2× increase, etc.). In case of failure, the CW is doubled based on the conventional method and the BC is re-picked.

In this case, more penalty is given in the case of success compared to the '1) example'.

FIG. 26 is a diagram illustrating a BC control method in the 2-1) examples.

Referring to FIG. 26, the current remaining BC=5 and CW may be 31. In this method, even if it succeeds, the CW is maintained without decreasing the min value in order to give a penalty. Therefore, it shows the case of BC=16, which is re-drawn again in the next back-off operation while the CW is maintained at 31. The final BC is 16+5=21.

2-2) In case of success, the CW goes to CWmin as in the conventional method, and in case of failure, the CW is increased to more than 2 times (e.g., 4 times) and then BC is re-picked.

In this case, a more penalty is given in case of failure compared to the '1) example'.

FIG. 27 is a diagram illustrating a BC control method as shown in the 2-2) examples.

Referring to FIG. 27, currently remaining BC is 5 and the CW may be 15. In this method, the CW is increased by 4 times instead of 2 times to give more penalty even if there is failure. Therefore, the CW becomes 63, showing the case where a re-picked BC is 50 in the next back-off operation. In the case, the final BC can be 55(=50+5).

2-3) In case of success, the CW is not set to CWmin (e.g., maintaining the existing value, ½ decrease, or 2× increase, etc.) In case of failure, the CW is increased to more than 2 times (e.g., 4 times) and then the BC is re-picked.

In this case, a penalty is given for both success and failure. That is, if this method is applied, the MLD will attempt aggregation only when absolutely necessary.

Examples related to the '2-3) example' can be described as a combination of FIG. 26 (success case) and FIG. 27 (failure case).

The '2) example' only changes the CW rule, as compared to the '1) example', and follow the rule of picking the existing BC. However, since the BC has randomness, if a low BC is picked/drawn, the fairness performance may be lowered. Also, the '1) example' should store the previous back-off count value.

When the above rules are applied, the CW increase can be applied up to CWmax, but in the case of the method of adding the remaining BC, there are cases where it can exceed CWmax. The method to prevent this can be shown as follows.

Examples of not Exceeding CWmax

1) When a BC in a non-zero BC link is ignored and transmission is performed, aggregation may be not performed until BC=0 during the back-off of the next round. That is, once aggregation is performed, it means that the aggregation that ignores the BC is not performed in the next back-off operation.

In particular, the above '1) example' can be extended to N rounds, and BC-ignoring aggregation is not performed during the back-off of the next N rounds.

FIG. 28 is a diagram illustrating an embodiment of a CW adjustment method.

Assuming that N rounds are performed, N can be set to 1. Referring to FIG. 28, the currently remaining BC is 5 in the link 2, a re-drawn BC in the next back-off operation is 8. The CW range does not change because the previous CW was a min value, and the final BC becomes 13 (=8+5). Here, in order for the STA 2 to obtain the next TXOP in the link 2, the STA 2 cannot aggregate with link 1 in the middle and should wait until BC=0.

If CWmax is exceeded, there may be the following examples.

1) The BC value can be adjusted to CWmax. Similar to the conventional methods, the BC value does not exceed the CWmax. However if the re-picked BC becomes the CWmax, the remaining BC will be ignored, which may be unfair.

2) Exceptionally, a BC value exceeding CWmax can be determined. Compared to the '1) example', it can increase fairness, but additional implementation for excess BC is required.

Examples of Maintaining AIFS[AC] on a Link where BC is Non-Zero

When the remaining BCs are added as in methods 1) and 2) described above, the remaining BCs can be used for higher priority traffic in the next back-off round. Therefore, it may be unfair to a STA that does not use this because it waits until BC=0 for lower priority traffic. Accordingly, even if the AC priority is higher in the next back-off round, fairness can be increased by performing back-off by maintaining the existing AC.

FIG. 29 is a diagram illustrating an embodiment of a method for maintaining AIFS[AC].

Referring to FIG. 29, if the AC of link 2 traffic at the time of aggregation is BE, even if the AC of the next round has a higher priority (e.g., VO), when AIFS sensing, AIFS [AC=BE] can be used to enhance fairness.

In the case of applying the above rule, if back-off is performed for a long time due to channel congestion, etc., it may eventually become a meaningless rule compared to the existing rule. That is, as the time increases, unfairness toward all STAs may be eliminated. In this case, the MLD may additionally announce MaxTime (e.g., PPDUMaxDuration, TXOP Maxduration, Beacon Interval, etc.) to which the above rule is applied. That is, if back-off is performed after the MaxTime, it can return to the existing rule. Also, for example, this time may not be separately defined as MaxTime=0 or the like.

Figure 62:
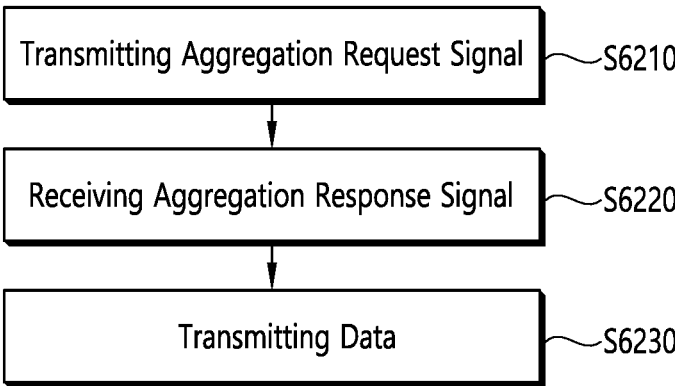
FIG. 62 is a diagram illustrating an embodiment of a method of operating an STA MLD.

FIG. 62 is a diagram illustrating an embodiment of a method of operating an STA MLD.

Referring to FIG. 62, the STA MLD may transmit an aggregation request signal (S6210). For example, a non-simultaneous transmit and receive (non-STR) station (STA) MLD may transmit a multi-link aggregation request signal to an AP MLD through a first link. For example, the multilink aggregation request signal may include first information related to a second link for which aggregation is requested and second information related to a transmission opportunity (TXOP) to be established in the second link.

For example, the second information may be information related to the length of the TXOP determined by the non-STR STA MLD.

For example, the first information may be the following information.

Set of Selected links: this indicates the link to be aggregated
  Ex 1) List Number of Link+Link ID
  Ex 2) Examples of using Link bitmap: this is set to 1 for a selected link, is set to 0 for an unselected link, and is set to 11 for the above example (Link 1, Link 2)

For example, the second information may be the following information.
TXOP Considerations In the above examples, since the TXOP starts from the AP's response in the Link 2, the AP 2 becomes a TXOP holder of the Link 2. Here, since an entity that transmits data may be the STA 2, 1) a method of determining a TXOP and 2) a method of truncating the TXOP may be considered.

1) A method of determining by the AP 2 an expected TXOP of the STA 2
    The AP 2 becomes a TXOP holder, but the AP 2 needs to know the TXOP desired by the STA 2 because the AP 2 is actually helping the STA 2 for UL transmission. Therefore, there may be a method as follows, but the present specification is not limited thereto.
  1-1) Explicit method
  The STA 1 indicates a desired TXOP for the STA 2 when transmitting a request.
  1-2) Implicit method
  The AP 2 holds the TXOP in the Link 1 according to the TXOP end time held/maintained by the STA 1.

In the explicit method, the STA 1 the requests the TXOP 2 desired by the STA 2 from the AP MLD. In accordance with this, the AP 2 sets the TXOP 2 to respond in the Link 2.

In the implicit method, the AP 2 recognizes the TXOP 1 of the STA 1, sets the TXOP 2 at the end of the TXOP 1, and responds.

The AP MLD may obtain a TXOP. For example, the AP MLD may obtain the TXOP based on the second information in the second link. For example, the AP MLD may obtain the TXOP regardless of the remaining BC, which is a backoff count (BC) remaining in the second link.

Although the STA MLD intends to transmit data, since the STA MLD operates as a non-STR, it is difficult to perform channel access on another link when the UL operation is performed on one link among a plurality of links. Accordingly, the AP MLD may obtain the TXOP instead of the STA MLD based on the aggregation request signal received from the non-STR STA MLD.

The non-STR STA MLD may receive an aggregation response signal (S6130). For example, the non-STR STA MLD may receive a multilink first aggregation response signal through the first link and a second aggregation response signal through the second link to the non-STR STA MLD. For example, the end time of the first aggregation response signal and the second aggregation response signal may be the same.

That is, the AP MLD may obtain a TXOP in the second link and transmit a second aggregation response signal through the second link. Since the first link has already obtained the TXOP and transmission/reception is in progress, the transmission of the first aggregation response signal may be performed directly from reception of the aggregation request signal. However, the second aggregation response signal may not be transmitted simultaneously with the first aggregation response signal because there is a time required to obtain the TXOP in the second link. However, the end time of the first aggregation response signal and the second aggregation response signal may be the same.

The non-STR STA MLD may transmit data (S6230). For example, the non-STR STA MLD may transmit first data in the first link and second data in the second link from the non-STR STA MLD.

Since TXOP can be obtained even if BC is not 0 in the link on which the aggregation is performed, a fairness problem may occur, and various methods may be considered to solve the problem.

For example, in the second link, the BC initially set in the channel access operation performed by the AP MLD after the TXOP is finished may be determined as the sum of the BC selected within a contention window (CW) and the remaining BC.

For example, the BC initially set in the channel access operation performed by the AP MLD after the TXOP in the second link can be determined as the sum of the selected BC and the remaining BC within twice the minimum contention window (CW).

For example, when the previous TXOP is obtained in a state in which BC remains, multilink aggregation is not performed during the next N transmissions, but N may be an integer of 1 or more.

For both DL/UL cases, when Backoff Count (BC)=0 in one link, if the other link (whose BC may be non-zero) has been IDLE for a certain period (e.g., PIFS, AIFS, one slot, etc.) before that, a frame can be transmitted by aggregating the two links. The IDLE of one slot may mean that a back-off count is decreased because it is IDLE during one slot. This can be applied even when the slot boundaries of two links do not match. That is, for the case in which AIFS sensing (described below) is not applied, since the channel is IDLE in the previous slot, even if the moment BC=0 is in the middle of the slot, aggregation is possible if it is IDLE during the previous one slot length duration (or time point when BC=0 from the previous slot boundary). However, if the efficiency is reduced and the rule is simply applied in this case, aggregation may not be performed.

Examples Related to AIFS Sensing or EIFS Sensing in Link(s) where BC is Non-Zero In this case, in AIFS or EIFS (here, the EIFS can be the interval EIFS−DIFS+AIFSN[AC]×aSlotTime+aSIFSTime−aRxTxTurnaroundTime defined in the standard specification), the operation may vary depending on a time point in which BC=0 (in a link where BC=0) and a certain duration for determining IDLE.

1) In order to simply reduce the complexity of the rule, the link may not be aggregated. It can be simply applied without applying any special constraint to the existing rule, but if the duration was IDLE, the transmission opportunity may be missed.

2) To increase efficiency, regardless of the AIFS, if it is idle for a certain duration (e.g., PIFS, AIFS, one slot, etc.) as in the above method, two links can be aggregated to transmit frames. Since this method does not take into account when BC=0 in the sensing duration and the channel medium may be BUSY before AIFS or EIFS, and thus there is a possibility that it will become BUSY depending on where BC=0.

3) In order to increase efficiency, if it has been IDLE until BC=0 in the sensing duration, the two links can be aggregated to transmit the frame. This method can increase the efficiency in some cases compared to the method 2), but it is necessary to change the existing rule in which it should be IDLE during AIFSN[AC]× aSlotTime−aRxTxTurnaroundTime.

Examples Related to BC Control on Link(s) where BC is Non-Zero

Here, a BC of the other link may not be zero. In this case, the current BC is non-zero by may be ignored and transmission is allowed. Accordingly, fairness problems may arise for STAs operating in the corresponding link (hereinafter referred to as non-zero BC link). Therefore, it is necessary to control the current BC for fairness. The BC control method may have the following methods.

1) Examples of applying the rule for CW as it is, and controlling only BC

That is, the existing rule in which the CW is doubled when transmission succeeds and the CW goes to CWmin when transmission fails is maintained, and only the BC can be controlled.

When aggregation is performed in a non-zero state of BC, the currently remaining BC can be used during the next back-off operation.

FIG. 24 is a diagram illustrating an embodiment of the BC control method.

Referring to FIG. 24, the current remaining BC is 5, and the re-picked (or re-drawn) BC is 8 during the next back-off operation. The CW range does not change because the previous CW was a min value, and the final BC becomes 13 (=8+5).

1-1) In case of failure, at least twice the remaining BC can be added.

The remaining BC was ignored for transmission, and if transmission fails due to this, additional penalties may be required. Therefore, in case of failure, more penalties may be given by adding more than twice the remaining BC to the next re-picked (re-drawn) BC.

FIG. 25 is a diagram illustrating an embodiment of a BC control method.

Referring to FIG. 25, the current remaining BC is 5, and a re-picked/re-drawn BC can be 10 in the next back-off operation. The CW range is doubled due to the failure, and the remaining BC is doubled and will be added as a penalty for the failure. Therefore, the final BC becomes 20 (=10+ 5*2).

2) Examples of controlling the CW and re-picking a BC in the CW

In the existing wireless LAN, if packet transmission is successful, the CW is set to CWmin, and if transmission fails, the CW is increased as long as it does not exceed CWmax. Therefore, the BC control method may vary depending on success/failure. That is, the method can be different depending on which case is given more penalty. Basically, when aggregation is performed in a state where BC is not 0, the current remaining BC is used for the next back-off operation. That is, the BC can be re-picked/re-drawn during the next back-off operation, or after re-pick, the remaining BC can be added as in the '1) example'. In the following embodiment, only the case of adding BC after re-pick is shown.

2-1) In case of success, the CW does not go to CWmin (e.g., maintaining the existing value, ½ decrease, or 2× increase, etc.). In case of failure, the CW is doubled based on the conventional method and the BC is re-picked.

In this case, more penalty is given in the case of success compared to the '1) example'.

FIG. 26 is a diagram illustrating a BC control method in the 2-1) examples.

Referring to FIG. 26, the current remaining BC=5 and CW may be 31. In this method, even if it succeeds, the CW is maintained without decreasing the min value in order to give a penalty. Therefore, it shows the case of BC=16, which is re-drawn again in the next back-off operation while the CW is maintained at 31. The final BC is 16+5=21.

2-2) In case of success, the CW goes to CWmin as in the conventional method, and in case of failure, the CW is increased to more than 2 times (e.g., 4 times) and then BC is re-picked.

In this case, a more penalty is given in case of failure compared to the '1) example'.

FIG. 27 is a diagram illustrating a BC control method as shown in the 2-2) examples.

Referring to FIG. 27, currently remaining BC is 5 and the CW may be 15. In this method, the CW is increased by 4 times instead of 2 times to give more penalty even if there is failure. Therefore, the CW becomes 63, showing the case where a re-picked BC is 50 in the next back-off operation. In the case, the final BC can be 55(=50+5).

2-3) In case of success, the CW is not set to CWmin (e.g., maintaining the existing value, ½ decrease, or 2× increase, etc.) In case of failure, the CW is increased to more than 2 times (e.g., 4 times) and then the BC is re-picked.

In this case, a penalty is given for both success and failure. That is, if this method is applied, the MLD will attempt aggregation only when absolutely necessary.

Examples related to the '2-3) example' can be described as a combination of FIG. 26 (success case) and FIG. 27 (failure case).

The '2) example' only changes the CW rule, as compared to the '1) example', and follow the rule of picking the existing BC. However, since the BC has randomness, if a low BC is picked/drawn, the fairness performance may be lowered. Also, the '1) example' should store the previous back-off count value.

When the above rules are applied, the CW increase can be applied up to CWmax, but in the case of the method of adding the remaining BC, there are cases where it can exceed CWmax. The method to prevent this can be shown as follows.

Examples of not Exceeding CWmax

When a BC in a non-zero BC link is ignored and transmission is performed, aggregation may be not performed until BC=0 during the back-off of the next round. That is, once aggregation is performed, it means that the aggregation that ignores the BC is not performed in the next back-off operation.

In particular, the above '1) example' can be extended to N rounds, and BC-ignoring aggregation is not performed during the back-off of the next N rounds.

FIG. 28 is a diagram illustrating an embodiment of a CW adjustment method.

Assuming that N rounds are performed, N can be set to 1. Referring to FIG. 28, the currently remaining BC is 5 in the link 2, a re-drawn BC in the next back-off operation is 8. The CW range does not change because the previous CW was a min value, and the final BC becomes 13 (=8+5). Here, in order for the STA 2 to obtain the next TXOP in the link 2, the STA 2 cannot aggregate with link 1 in the middle and should wait until BC=0.

If CWmax is exceeded, there may be the following examples.

1) The BC value can be adjusted to CWmax. Similar to the conventional methods, the BC value does not exceed the CWmax. However if the re-picked BC becomes the CWmax, the remaining BC will be ignored, which may be unfair.

2) Exceptionally, a BC value exceeding CWmax can be determined. Compared to the '1) example', it can increase fairness, but additional implementation for excess BC is required.

Examples of Maintaining AIFS[AC] on a Link where BC is Non-Zero

When the remaining BCs are added as in methods 1) and 2) described above, the remaining BCs can be used for higher priority traffic in the next back-off round. Therefore, it may be unfair to a STA that does not use this because it waits until BC=0 for lower priority traffic. Accordingly, even if the AC priority is higher in the next back-off round, fairness can be increased by performing back-off by maintaining the existing AC.

FIG. 29 is a diagram illustrating an embodiment of a method for maintaining AIFS[AC].

Referring to FIG. 29, if the AC of link 2 traffic at the time of aggregation is BE, even if the AC of the next round has a higher priority (e.g., VO), when AIFS sensing, AIFS [AC=BE] can be used to enhance fairness.

In the case of applying the above rule, if back-off is performed for a long time due to channel congestion, etc., it may eventually become a meaningless rule compared to the existing rule. That is, as the time increases, unfairness toward all STAs may be eliminated. In this case, the MLD may additionally announce MaxTime (e.g., PPDUMaxDuration, TXOP Maxduration, Beacon Interval, etc.) to which the above rule is applied. That is, if back-off is performed after the MaxTime, it can return to the existing rule. Also, for example, this time may not be separately defined as MaxTime=0 or the like.

Some of the detailed steps shown in the examples of FIGS. 61 and 62 may not be essential steps and may be omitted. In addition to the steps shown in FIGS. 61 and 62, other steps may be added, and the order of the steps may vary. Some of the above steps may have their own technical meaning.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or may be implemented based on the processor 610 and the memory 620 of FIG. 19. For example, the apparatus of the present specification is configured to: receive, from a non-simultaneous transmit and receive (Non-STR) station (STA) MLD, a multilink aggregation request signal through a first link, wherein the multilink aggregation request signal includes first information related to a second link for which aggregation is requested and second information related to a transmission opportunity (TXOP) to be set in the second link; obtain the TXOP based on the second information in the second link; transmit, to the Non-STR STA MLD, a first multilink aggregation response signal through the first link and a second multilink aggregation response signal through the second link; and receive, from the Non-STR STA MLD, first data through the first link and second data through the second link.

The technical features of the present specification may be implemented based on a computer readable medium (CRM). For example, the CRM proposed by the present specification stores instructions that, based on being executed by at least one processor of an access point (AP) multi-link device (MLD) in a wireless local area network (LAN) system, perform operations comprising: receiving, from a non-simultaneous transmit and receive (Non-STR) station (STA) MLD, a multilink aggregation request signal through a first link, wherein the multilink aggregation request signal includes first information related to a second link for which aggregation is requested and second information related to a transmission opportunity (TXOP) to be set in the second link; obtaining the TXOP based on the second information in the second link; transmitting, to the Non-STR STA MLD, a first multilink aggregation response signal through the first link and a second multilink aggregation response signal through the second link; and receiving, from the Non-STR STA MLD, first data through the first link and second data through the second link.

The instructions stored in the CRM of the present disclosure may be executed by at least one processor. At least one processor related to CRM in the present disclosure may be the processors 111 and 121 or the processing chips 114 and 124 of FIG. 1, or the processor 610 of FIG. 19. Meanwhile, the CRM of the present disclosure may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by an access point (AP) multilink device (MLD) in a wireless local area network (WLAN) system, comprising:

receiving, by a first AP affiliated with the AP MLD, a management frame including a multilink aggregation request signal through a first link from a first non-access point (non-AP) station (STA) affiliated with a non-AP MLD, wherein the first AP operates in the first link, a second AP is further affiliated with the AP MLD, the second AP operates in a second link, and the first non-AP STA operates in the first link, wherein the multilink aggregation request signal includes first information related to the second link for which aggregation is requested and second information related to a transmission opportunity (TXOP) to be set in the second link, wherein the management frame further includes non-simultaneous transmission and reception (NSTR) information related to whether the first link and the second link form an NSTR link pair in the non-AP MLD, and wherein the management frame further includes link information related to a maximum number of links to be supported by the non-AP MLD;

obtaining, by the first AP affiliated with the AP MLD, the TXOP based on the second information;

transmitting, by the first AP affiliated with the AP MLD, a first multilink aggregation response signal through the first link; and receiving, by the first AP affiliated with the AP MLD, a first physical protocol data unit (PPDU) including first data through the first link.

2. The method of claim 1, wherein the obtaining the TXOP comprises:

obtaining the TXOP regardless of the remaining backoff count BC, which is a BC remaining in the second link.

3. The method of claim 2, wherein a BC initially set in a channel access operation performed by the AP MLD after in the second link after the TXOP has elapsed is determined as a sum of a selected BC within a contention window (CW) and the remaining BC.

4. The method of claim 2, wherein a BC initially set in a channel access operation performed by the AP MLD after in the second link after the TXOP has elapsed is determined as a sum of a selected BC within twice a minimum contention window (CW) and the remaining BC.

5. The method of claim 1, wherein the first PPDU includes a legacy signal (L-SIG) field, a repeated L-SIG (RL-SIG) field being contiguous to the L-SIG field, and a first signal field being contiguous to the RL-SIG field, wherein the L-SIG field includes a length field, and a value of the length field is set to satisfy a condition that a remainder is zero (0) when the value of the length field is divided by three (3), and wherein the first SIG field includes first bit information related to a PPDU type, second bit information related to an identifier of a basic service set (BSS), third bit information indicating duration information related to a transmission opportunity (TXOP), fourth bit information related to whether the first PPDU is sent in uplink (UL) or in downlink (DL), fifth bit information related to a bandwidth, and sixth bit information having a length of 3 bits and indicating a physical (PHY) version of the first PPDU.

6. An access point (AP) multi-link device (MLD) in a wireless local area network (WLAN) system, comprising:

a transceiver configured to transmit and/or receive a wireless signal; and a processor coupled to the transceiver, wherein the processor is configured to:

receive, by a first AP affiliated with the AP MLD, a management frame including a multilink aggregation request signal through a first link from a first non-access point (non-AP) station (STA) affiliated with a non-AP MLD, wherein the first AP operates in the first link, a second AP is further affiliated with the AP MLD, the second AP operates in a second link, and the first non-AP STA operates in the first link, wherein the multilink aggregation request signal includes first information related to the second link for which aggregation is requested and second information related to a transmission opportunity (TXOP) to be set in the second link, wherein the management frame further includes non-simultaneous transmission and reception (NSTR) information related to whether the first link and the second link form an NSTR link pair in the non-AP MLD, and wherein the management frame further includes link information related to a maximum number of links to be supported by the non-AP MLD;

obtain, by the first AP affiliated with the AP MLD, the TXOP based on the second information;

transmit, by the first AP affiliated with the AP MLD, a first multilink aggregation response signal through the first link; and receive, by the first AP affiliated with the AP MLD, a first physical protocol data unit (PPDU) including first data through the first link.

7. The AP MLD of claim 6, wherein the TXOP is obtained regardless of the remaining backoff count BC, which is a BC remaining in the second link.

8. The AP MLD of claim 7, wherein a BC initially set in a channel access operation performed by the AP MLD after in the second link after the TXOP has elapsed is determined as a sum of a selected BC within a contention window (CW) and the remaining BC.

9. The AP MLD of claim 7, wherein a BC initially set in a channel access operation performed by the AP MLD after in the second link after the TXOP has elapsed is determined as a sum of a selected BC within twice a minimum contention window (CW) and the remaining BC.

10. The AP MLD of claim 6, wherein the first PPDU includes a legacy signal (L-SIG) field, a repeated L-SIG (RL-SIG) field being contiguous to the L-SIG field, and a first signal field being contiguous to the RL-SIG field, wherein the L-SIG field includes a length field, and a value of the length field is set to satisfy a condition that a remainder is zero (0) when the value of the length field is divided by three (3), and wherein the first SIG field includes first bit information related to a PPDU type, second bit information related to an identifier of a basic service set (BSS), third bit information indicating duration information related to a transmission opportunity (TXOP), fourth bit information related to whether the first PPDU is sent in uplink (UL) or in downlink (DL), fifth bit information related to a bandwidth, and sixth bit information having a length of 3 bits and indicating a physical (PHY) version of the first PPDU.

11. A method performed by a non-access point (non-AP) multilink device (MLD) in a wireless local area network (WLAN) system, comprising:

transmitting, by a first non-AP station (STA) affiliated with the non-AP MLD, a management frame including a multilink aggregation request signal through a first link to a first access point (AP) affiliated with an AP MLD, wherein the first non-AP STA operates in the first link, a second non-AP STA is further affiliated with the non-AP MLD, the second non-AP STA operates in a second link, and the first AP operates in the first link, wherein the multilink aggregation request signal includes first information related to the second link for which aggregation is requested and second information related to a transmission opportunity (TXOP) to be set in the second link, wherein the management frame further includes non-simultaneous transmission and reception (NSTR) information related to whether the first link and the second link form an NSTR link pair in the non-AP MLD, and wherein the management frame further includes link information related to a maximum number of links to be supported by the non-AP MLD;

receiving, by the first non-AP STA affiliated with the non-AP MLD, a first multilink aggregation response signal through the first link; and transmitting, by the first non-AP STA affiliated with the non-AP MLD, a first physical protocol data unit (PPDU) including first data through the first link.

12. The method of claim 11, wherein the first PPDU includes a legacy signal (L-SIG) field, a repeated L-SIG (RL-SIG) field being contiguous to the L-SIG field, and a first signal field being contiguous to the RL-SIG field, wherein the L-SIG field includes a length field, and a value of the length field is set to satisfy a condition that a remainder is zero (0) when the value of the length field is divided by three (3), and wherein the first SIG field includes first bit information related to a PPDU type, second bit information related to an identifier of a basic service set (BSS), third bit information indicating duration information related to a transmission opportunity (TXOP), fourth bit information related to whether the first PPDU is sent in uplink (UL) or in downlink (DL), fifth bit information related to a bandwidth, and sixth bit information having a length of 3 bits and indicating a physical (PHY) version of the first PPDU.

* * * * *